US012256282B2

(12) United States Patent
Pulitzer

(10) Patent No.: US 12,256,282 B2
(45) Date of Patent: Mar. 18, 2025

(54) SYSTEM AND METHOD FOR USING A MOBILE DEVICE AS AN INPUT DEVICE FOR SURVEYS AT A LIVE EVENT

(71) Applicant: Tesla Laboratories, LLC, Jackson, WY (US)

(72) Inventor: Jovan Hutton Pulitzer, Frisco, TX (US)

(73) Assignee: Tesla Laboratories, LLC, Jackson, WY (US)

( * ) Notice: Subject to any disclaimer, the term of this patent is extended or adjusted under 35 U.S.C. 154(b) by 362 days.

(21) Appl. No.: 17/139,114

(22) Filed: Dec. 31, 2020

(65) Prior Publication Data
US 2021/0235218 A1 Jul. 29, 2021

Related U.S. Application Data

(63) Continuation of application No. 16/186,293, filed on Nov. 9, 2018, now Pat. No. 10,924,883, which is a
(Continued)

(51) Int. Cl.
H04W 4/021 (2018.01)
G06F 16/955 (2019.01)
(Continued)

(52) U.S. Cl.
CPC ........ H04W 4/021 (2013.01); G06F 16/9554 (2019.01); G06Q 10/02 (2013.01);
(Continued)

(58) Field of Classification Search
CPC ... G06Q 10/02; G06F 16/9554; G06F 16/955; H04L 67/306; H04W 4/021; H04N 21/4758
See application file for complete search history.

(56) References Cited

U.S. PATENT DOCUMENTS 6,650,903 B2 11/2003 Inselberg
8,417,221 B2 4/2013 Shaw
(Continued)

OTHER PUBLICATIONS

Anonymous: "Does an app exist to auto-launch an app when . . . | Android Development and Hacking", Jun. 5, 2017 (Jun. 5, 2017), pp. 1-4, XP055652647, Retrieved from the Internet: URL: https://forum.xda-developers.com/showthread.php?t=1602650 [retrieved on Dec. 13, 2019].
(Continued)

Primary Examiner — Christopher Stanford

(57) ABSTRACT

A method is provided for interacting with audience members in an event, each of the potential attendees having available thereto a unique identifier. The method comprises creating, for an attendee, a unique ID (UID) on a mobile wireless device (MWD) by the steps of inputting to the MWD one of the unique identifiers, combining the obtained unique identifier with a UID time stamp at the time of creation of the UID; receiving with a server on a first wireless channel communications from the MWD; registering the UID at the physical location of the event; generating a visual query; displaying on the MWD response indicators; receiving at the server from the registered attendee a response, to the query over the first wireless channel; and storing in a database on the server the received response in association with the displayed query.

14 Claims, 41 Drawing Sheets

Related U.S. Application Data continuation of application No. 15/402,738, filed on Jan. 10, 2017, now abandoned, which is a continuation of application No. 15/360,697, filed on Nov. 23, 2016, now abandoned, which is a continuation-in-part of application No. 15/146,464, filed on May 4, 2016, now Pat. No. 9,959,689.

(60) Provisional application No. 62/258,990, filed on Nov. 23, 2015, provisional application No. 62/258,983, filed on Nov. 23, 2015, provisional application No. 62/258,988, filed on Nov. 23, 2015, provisional application No. 62/258,982, filed on Nov. 23, 2015, provisional application No. 62/258,985, filed on Nov. 23, 2015, provisional application No. 62/258,994, filed on Nov. 23, 2015, provisional application No. 62/258,987, filed on Nov. 23, 2015, provisional application No. 62/258,989, filed on Nov. 23, 2015, provisional application No. 62/258,996, filed on Nov. 23, 2015.

(51) Int. Cl.
*G06Q 10/02* (2012.01)
*G06Q 30/0201* (2023.01)
*G06Q 30/0241* (2023.01)
*H04W 4/21* (2018.01)
*H04W 4/33* (2018.01)
H04L 67/306 (2022.01)
H04L 67/52 (2022.01)
H04M 3/42 (2006.01)

(52) U.S. Cl.
CPC ..... *G06Q 30/0201* (2013.01); *G06Q 30/0241* (2013.01); *H04W 4/21* (2018.02); *H04W 4/33* (2018.02); H04L 67/306 (2013.01); H04L 67/52 (2022.05); H04M 3/42357 (2013.01)

(56) References Cited

U.S. PATENT DOCUMENTS

| | | | |
|---|---|---|---|
| 8,520,502 B2 * | 8/2013 | Tenny | H04W 8/26 370/216 |
| 9,060,039 B2 * | 6/2015 | Walsh | G06Q 30/02 |
| 9,226,156 B2 * | 12/2015 | O'Toole | G06Q 30/0267 |
| 9,646,382 B2 | 5/2017 | Hawkins | |
| 9,817,557 B2 | 11/2017 | Gresham et al. | |
| 9,836,755 B2 * | 12/2017 | Zamer | G06Q 30/0255 |
| 10,176,486 B2 | 1/2019 | Pulitzer | |
| 10,178,710 B2 | 1/2019 | Pulitzer | |
| 10,353,982 B1 * | 7/2019 | Kumar | G06F 17/00 |
| 10,524,309 B2 | 12/2019 | Pulitzer | |
| 10,547,742 B2 | 1/2020 | Pulitzer | |
| 11,012,536 B2 | 5/2021 | Awad et al. | |
| 11,412,575 B2 | 8/2022 | Pulitzer | |
| 2004/0158865 A1 | 8/2004 | Kubler et al. | |
| 2007/0294096 A1 | 12/2007 | Randall et al. | |
| 2009/0271740 A1 | 10/2009 | Ryan-Hutton et al. | |
| 2010/0262932 A1 * | 10/2010 | Pan | H04W 4/20 709/224 |
| 2010/0306064 A1 | 12/2010 | Inselburg | |
| 2011/0271295 A1 | 11/2011 | Redmann et al. | |
| 2012/0221962 A1 | 8/2012 | Lew et al. | |
| 2013/0116044 A1 | 5/2013 | Schwartz | |
| 2013/0157693 A1 | 6/2013 | Mercuri et al. | |
| 2015/0012308 A1 * | 1/2015 | Snyder | H05B 47/155 705/5 |
| 2015/0149619 A1 | 5/2015 | Tsuji et al. | |
| 2015/0281878 A1 | 10/2015 | Roundtree et al. | |
| 2016/0110467 A1 | 4/2016 | Hern | |
| 2016/0156638 A1 | 6/2016 | Somani et al. | |
| 2016/0335564 A1 | 11/2016 | Downy et al. | |
| 2017/0018004 A1 | 1/2017 | Walden | |
| 2017/0155761 A1 | 6/2017 | Pulitzer | |
| 2017/0280298 A1 | 9/2017 | Mycek et al. | |
| 2019/0082049 A1 | 3/2019 | Pulitzer | |

OTHER PUBLICATIONS

Anonymous: "NFC Basics | Android Developers", Feb. 19, 2014 (Feb. 19, 2014), XP055332687, Retrieved from the Internet: URL: http://web.archive.org/web/20140219150611/http://developer.android.com/guide/topics/connectivity/nfc/nfc.html [retrieved on Jan. 5, 2017].
EP: Article 94(3) Communication of 16869004.8 (related case); Jan. 2, 2020; 8 pages.

* cited by examiner

| REPORT: FEMALE TRENDS | | | |
|---|---|---|---|
| QUERY P1<br>6206 | QUERY P2<br>6206 | QUERY P3<br>6206 | RESULT IN %<br>6208 |
| QID(SCID:GENDER) +<br>RID(R2:FEMALE) | QID(SCID:POLITICAL<br>AFFILIATION) +<br>RID(R3:DEMOCRAT) | TS(2015-10-30 T xx:xx) | 67% |
| QID(SCID:POLITICAL<br>AFFILIATION) +<br>RID(R3:DEMOCRAT) | QID(SCID:GENDER) +<br>RID(R2:FEMALE) | TS(2015-10-30 T xx:xx) | 80% |
| QID(SCID:GENDER) +<br>RID(R2:FEMALE) | QID(SCID:POLITICAL<br>AFFILIATION) +<br>RID(R3:DEMOCRAT) | | 75% |
| QID(SCID:GENDER) +<br>RID(R2:FEMALE) | QID(SCID:SOFT DRINK)<br>+ RID(R3:PEPSI) | | 14.5% |

FIG. 62

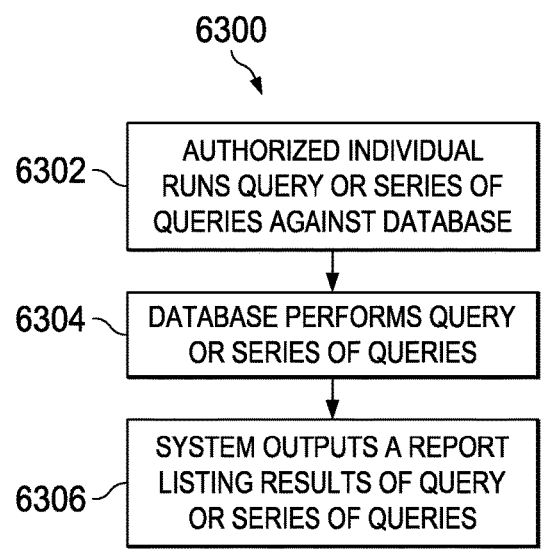

FIG. 63

| REPORT: MALE TRENDS | | | |
|---|---|---|---|
| QUERY P1 6406 | QUERY P2 6406 | QUERY P3 6406 | RESULT IN % 6408 |
| QID(SCID:GENDER) + RID(R1:MALE) | QID(SCID:POLITICAL AFFILIATION) + RID(R1:REPUBLICAN) | TS(2015-04-05 T 00:00 - 2015-11-02 T 00:00) | 65% |
| QID(SCID:POLITICAL AFFILIATION) + RID(R1:REPUBLICAN) | QID(SCID:GENDER) + RID(R1:MALE) | TS(2015 MLB SEASON) | 78% |
| QID(SCID:GENDER) + RID(R1:MALE) | QID(SCID:SOFT DRINK) + RID(R2:COCA COLA) | TS(2015 MLB REGULAR SEASON) | 45% |

SYSTEM AND METHOD FOR USING A MOBILE DEVICE AS AN INPUT DEVICE FOR SURVEYS AT A LIVE EVENT

CROSS-REFERENCE TO RELATED APPLICATIONS

This application is a Continuation of U.S. patent application Ser. No. 16/186,293, filed Nov. 9, 2018, entitled SYSTEM AND METHOD FOR USING A MOBILE DEVICE AS AN INPUT DEVICE FOR SURVEYS AT A LIVE EVENT, which is a Continuation of U.S. patent application Ser. No. 15/402,738, filed on Jan. 10, 2017, entitled SYSTEM AND METHOD FOR USING A MOBILE DEVICE AS AN INPUT DEVICE FOR SURVEYS AT A LIVE EVENT. U.S. patent application Ser. No. 15/402,738 is a Continuation-in-Part of U.S. patent application Ser. No. 15/360,697, filed on Nov. 23, 2016, entitled SYSTEM AND METHOD FOR USING A MOBILE DEVICE AS AN INPUT DEVICE FOR SURVEYS AT A LIVE EVENT, which is incorporated by reference herein in its entirety. U.S. patent application Ser. No. 15/360,697 is a Continuation-in-Part of U.S. patent application Ser. No. 15/146,464, filed on May 4, 2016, entitled SYSTEM AND METHOD FOR CREATION OF UNIQUE IDENTIFICATION FOR USE IN GATHERING SURVEY DATA FROM A MOBILE DEVICE AT A LIVE EVENT, issued as U.S. Pat. No. 9,959,689 on May 1, 2018, which claims the benefit of U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, which is incorporated by reference herein in its entirety. U.S. patent application Ser. No. 15/146,464 also claims the benefit of U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT, which is incorporated by reference herein in its entirety. U.S. patent application Ser. No. 15/146,464 also claims the benefit of U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, which is incorporated by reference herein in its entirety. U.S. patent application Ser. No. 15/146,464 also claims the benefit of U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, which is incorporated by reference herein in its entirety. U.S. patent application Ser. No. 15/146,464 also claims the benefit of U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, which is incorporated by reference herein in its entirety. U.S. patent application Ser. Nos. 15/402,738 and 15/146,464 are incorporated by reference herein in their entirety.

U.S. patent application Ser. No. 15/360,697 also claims the benefit of U.S. Provisional Application No. 62/258,994, filed on Nov. 23, 2015, entitled SYSTEM AND METHOD FOR PROVIDING MOBILE DEVICE SURVEY INTERFACE BASED ON VISUAL INDICIA, U.S. Provisional Application No. 62/258,996, filed on Nov. 23, 2015, entitled SYSTEM AND METHOD FOR GENERATING A DIGITAL IMAGE BASED ON INPUT FROM MOBILE DEVICE TO ALLOW CROWD TO CONTROL VISUAL RESULTS OF RESPONSE, U.S. Provisional Application No. 62/258,989, filed on Nov. 23, 2015, entitled SYSTEM AND METHOD FOR SOCIAL MEASUREMENT OF INDIVIDUALS BASED ON DATA COLLECTED FROM MOBILE DEVICE, U.S. Provisional Application No. 62/258,997, filed on Nov. 23, 2015, entitled SYSTEM AND METHOD FOR CONDUCTING A CONTEST BASED ON INPUT FROM MOBILE DEVICE IN A CROWD-BASED RESPONSE SYSTEM, and U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT. U.S. patent application Ser. No. 15/360,697 also claims the benefit of U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, and U.S. Provisional Application No. 62/258,990, filed on Nov. 23, 2015, entitled SYSTEM AND METHOD FOR EXTRAPOLATING STATISTICAL DATA GENERATED FROM A MOBILE DEVICE AT A LIVE EVENT FOR DETERMINING MERCHANTABILITY. U.S. Provisional Application No. 62/258,994 is incorporated by reference herein in its entirety. U.S. Provisional Application No. 62/258,996 is incorporated by reference herein in its entirety. U.S. Provisional Application No. 62/258,989 is incorporated by reference herein in its entirety. U.S. Provisional Application No. 62/258,997 is incorporated by reference herein in its entirety. U.S. Provisional Application No. 62/258,982 is incorporated by reference herein in its entirety. U.S. Provisional Application No. 62/258,983 is incorporated by reference herein in its entirety. U.S. Provisional Application No. 62/258,985 is incorporated by reference herein in its entirety. U.S. Provisional Application No. 62/258,987 is incorporated by reference herein in its entirety. U.S. Provisional Application No. 62/258,988 is incorporated by reference herein in its entirety. U.S. Provisional Application No. 62/258,990 is incorporated by reference herein in its entirety.

This application also claims the benefit of U.S. Provisional Application No. 62/277,270, filed on Jan. 11, 2016, entitled SYSTEM AND METHOD FOR USING DATA FROM A MOBILE DEVICE SURVEY SYSTEM FOR MESSAGE SELECTION AT A LIVE EVENT. This application also claims the benefit of U.S. Provisional Application No. 62/277,888, filed on Jan. 12, 2016, entitled SYSTEM AND METHOD FOR FACILITATING A PURCHASE FROM A VENDOR USING CARRIER INFORMATION FOR A MOBILE DEVICE. This application also claims the benefit of U.S. Provisional Application No. 62/277,941, filed on Jan. 12, 2016, entitled SYSTEM AND METHOD FOR USING DATA FROM MOBILE DEVICES WITHIN A WIRELESS MESH NETWORK. This application also claims the benefit of U.S. Provisional Application No. 62/277,899, filed on Jan. 12, 2016, entitled SYSTEM AND METHOD FOR BUILDING A SOCIAL MEASUREMENT MATRIX. This application also claims the benefit of U.S. Provisional Application No. 62/277,903, filed on Jan. 12, 2016, entitled SYSTEM AND METHOD FOR SEASONAL EVENT DEPENDENT REPORTING. This application also claims the benefit of U.S. Provisional Application No. 62/277,914, filed on Jan. 12, 2016, entitled SYSTEM AND METHOD FOR EVENT BASED INTERACTIVE POLLING. This application also claims the benefit of U.S. Provisional Application No. 62/277,917, filed on Jan. 12, 2016, entitled SYSTEM AND METHOD FOR DETERMINING COMPARATIVE LIFESTYLE TRIGGERS. This application also claims the benefit of U.S. Provisional Application No. 62/277,943, filed on Jan. 12, 2016, entitled SYSTEM AND METHOD FOR GENERATING POLLING RESULTS FROM INPUTS PROVIDED AT THE SUPER BOWL. This application also claims the benefit of U.S. Provisional Application No. 62/277,918, filed on Jan. 12, 2016, entitled SYSTEM AND METHOD FOR USING DATA FROM MOBILE DEVICES WITHIN A GEOFENCE. U.S. Provisional Application No. 62/277,270 is incorporated by reference herein in its entirety. U.S. Provisional Application No. 62/277,888 is incorporated by reference herein in its entirety. U.S. Provisional Application No. 62/277,941 is incorporated by reference herein in its entirety. U.S. Provisional Application No. 62/277,899 is incorporated by reference herein in its entirety. U.S. Provisional Application No. 62/277,903 is incorporated by reference herein in its entirety. U.S. Provisional Application No. 62/277,914 is incorporated by reference herein in its entirety. U.S. Provisional Application No. 62/277,917 is incorporated by reference herein in its entirety. U.S. Provisional Application No. 62/277,943 is incorporated by reference herein in its entirety. U.S. Provisional Application No. 62/277,918 is incorporated by reference herein in its entirety.

TECHNICAL FIELD

The following disclosure relates to generally to the interface between advertisers, media companies, leagues, sponsors, underwriters, partners and media partners, leagues, teams, franchises, sponsors, underwriters, media partners, conferences, venue specific messengers, and championships, as well as a target audience, and collecting statistics relating thereto.

BACKGROUND

When advertisers, media companies, leagues, sponsors, underwriters, partners and media partners, leagues, teams, franchises, sponsors, underwriters, media partners, conferences, venue specific messengers, and championships ("the messenger") distribute their advertising with respect to a particular venue, it is important that they have some type of feedback as to the effectiveness of these advertisements. The main problem that exists today in certain venues is that the advertisement is displayed on a screen at, for example, a football game, and it is expected that a certain portion of the attendees are viewing the screen. However, some attendees may have left their seats and gone for refreshments or they may actually, in the current environment, the occupied with their mobile devices. As such, it is difficult for an advertiser to have any feedback as to the "effectiveness" of a particular advertisement at reaching the eyes of the attendees.

BRIEF DESCRIPTION OF THE DRAWINGS

For a more complete understanding, reference is now made to the following description taken in conjunction with the accompanying Drawings in which:

FIG. 62 illustrates one embodiment of an example database report retrieved from a database in which query and response data is stored;

FIG. 63 illustrates a flowchart depicting one embodiment of a report generation method;

DETAILED DESCRIPTION

Figure 1:
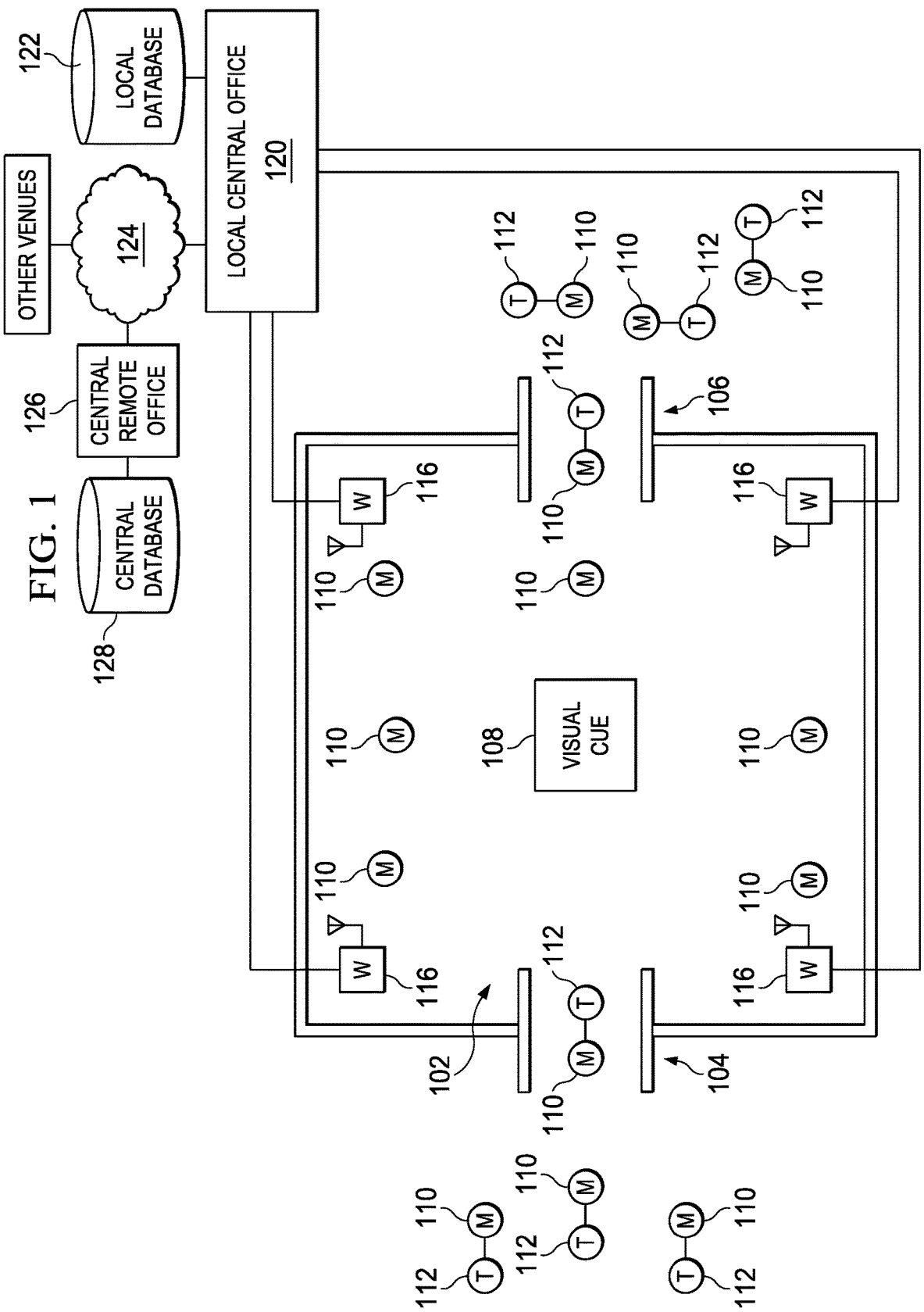
FIG. 1 illustrates an overall diagrammatic view of a venue utilizing a disclosed embodiment.

Referring now to FIG. 1, there is illustrated a diagrammatic view of the overall operation at a particular venue utilizing the disclosed embodiment. In this illustration, there is illustrated a single venue 102, such as a football stadium, a concert hall, or anything that requires a ticket to grant entrance thereto and also provide some type of seating chart such that each ticket holder has a defined seat associated therewith or assigned thereto. This venue 102 has provided therefore, by example, two gates 104 and 106. In the center of the venue 102 or disposed throughout the venue 102 there is provided some type of visual/audio interfaced 108. Throughout the following description, this will typically be referred to as a visual interface providing a visual cue of some sort. However, it should be understood that the cue is some type of information that can be transmitted from one or more locations within the venue 102 in the form of a video or an audio cue or some type of cue that can be sensed by an attendee. Although this visual cue 108 is illustrated as being in the center of the venue 102, it should be understood that it can be located at different locations throughout the venue 102. Additionally, the visual cue from multiple locations could all be the same cue, or it could actually be different cues.

There are illustrated a plurality of Mobile Units 110 labeled "M" which will be referred to hereinafter by the terminology "MU" 110. Each of these MUs 110 is associated with an individual, and that individual has associated therewith a ticket, this ticket referred to by a reference numeral 112. The only MUs that are illustrated as having a ticket 112 associated therewith are those that are entering the gate 104 or the gate 106. Each of these MUs 110 has the ability to communicate via a wireless link to one of the plurality of wireless network receivers 116 disposed throughout the venue 102. These wireless network receivers provide substantially full coverage around the venue 102, and each of the wires receivers 116 are connected directly to a local central office 120 (CO) which basically has a computer that is interfaced with a local database 122. This database 122 and local central office 120 are connected through a global network 124 (Internet) to a central remote office 126, which has associated therewith a central database 126.

The wireless receivers can be any type of wireless receiver network, for example, a Wi-Fi-based network. However, it should be understood that any other type of network could be utilized. Each of these wireless receivers 116 has associated therewith a unique ID in the form of an SSID that can be recognized by the MU 110 and, once a communication link is effected between the MU 110 and the wireless receiver 116, a physical location can be established with respect to the physical location of the venue 102. Since the local central office 120 is aware of its location and it is connected directly to the wireless receivers 116, the location of the venue 102 can be associated with any data in the local database 122. This allows any data associated with the local database 122 to also be associated with any information collected from attendees at the event occurring in the venue 102.

Additionally, the wireless interface between each of the MUs 110 and the local central office 120 could be effected with a mesh network. The communication protocol could use a Zigbee network, a Thread network, or any type of network that allows data to actually be transmitted to a master station to be transferred from one MU 110 to another MU 110.

In the overall operation, as will be described hereinbelow, a particular user will enter the venue 102 and initiate an application on their associated MU 110 which will create a unique ID (UID) associated with that particular device at that particular time based upon information contained on their individual ticket which will also identify the seat to which they are assigned. The user will then provide a response of some sort to possibly a visual cue received locally and send the UID and response to the local CO 120. This will result in a registration of that particular device with the local CO 120. Thereafter, visual cues are displayed on the display 108 with choices. These choices are associated with preset choice buttons on the MU 110 that, when selected, provide responses that are utilized by the local CO 120 for collecting statistics on the attendees.

Figure 2:
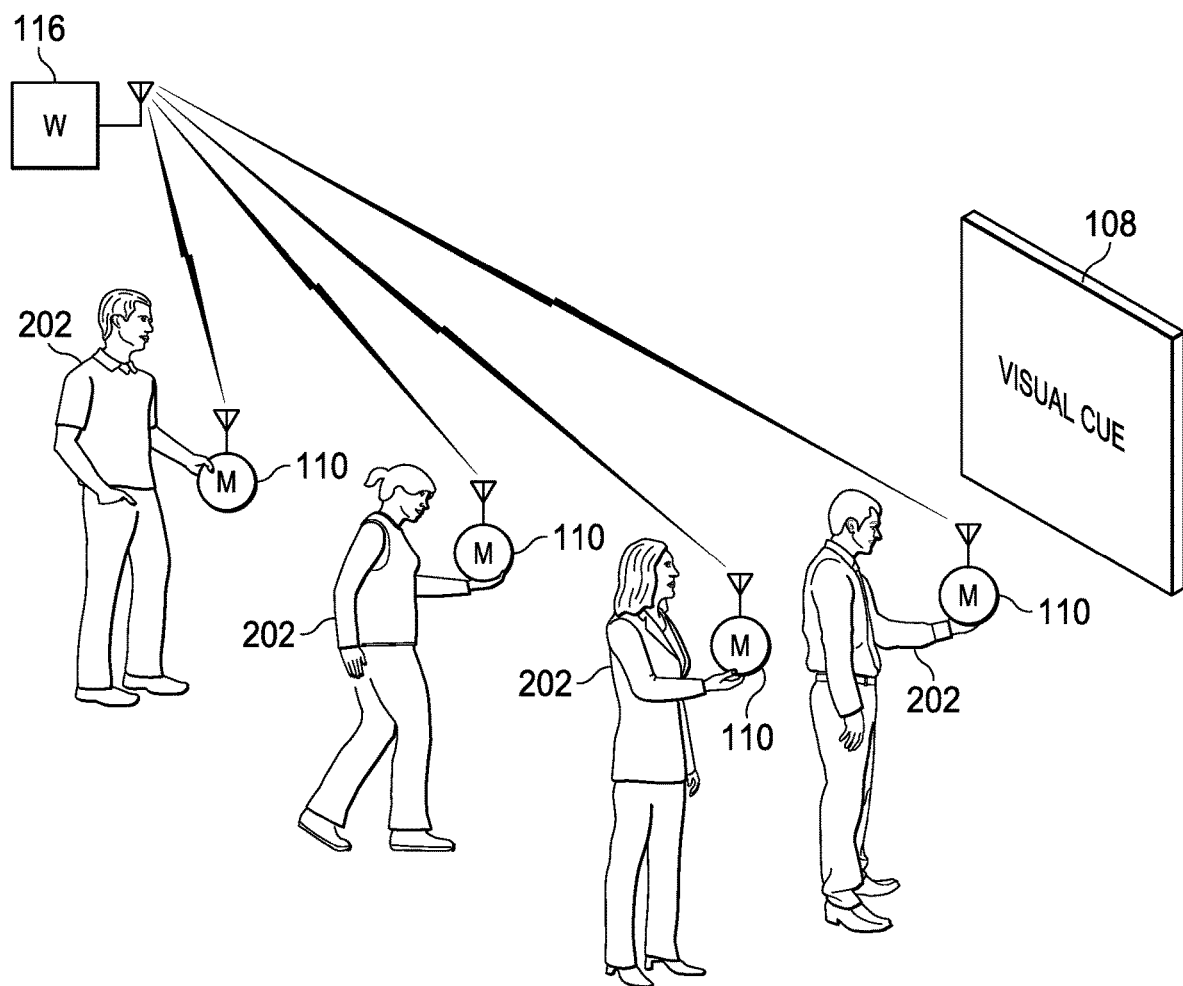
FIG. 2 illustrates a diagrammatic view of multiple attendees interfaced with a screen on which advertisements are presented.

Referring now to FIG. 2, there is illustrated a diagrammatic view of a plurality of individuals 202 with their associated MUs 110. The display 108 is illustrated as providing a visual cue in the form of some type of program, advertisement or the such that will be followed with or associated with a visual cue that, if the individual 102 is viewing the screen and is paying attention to the advertisement, will be enticed to actually make a selection and, upon making a selection, this selection or responses sent back via the wireless receiver 116 two the local CO 120.

Figure 3:
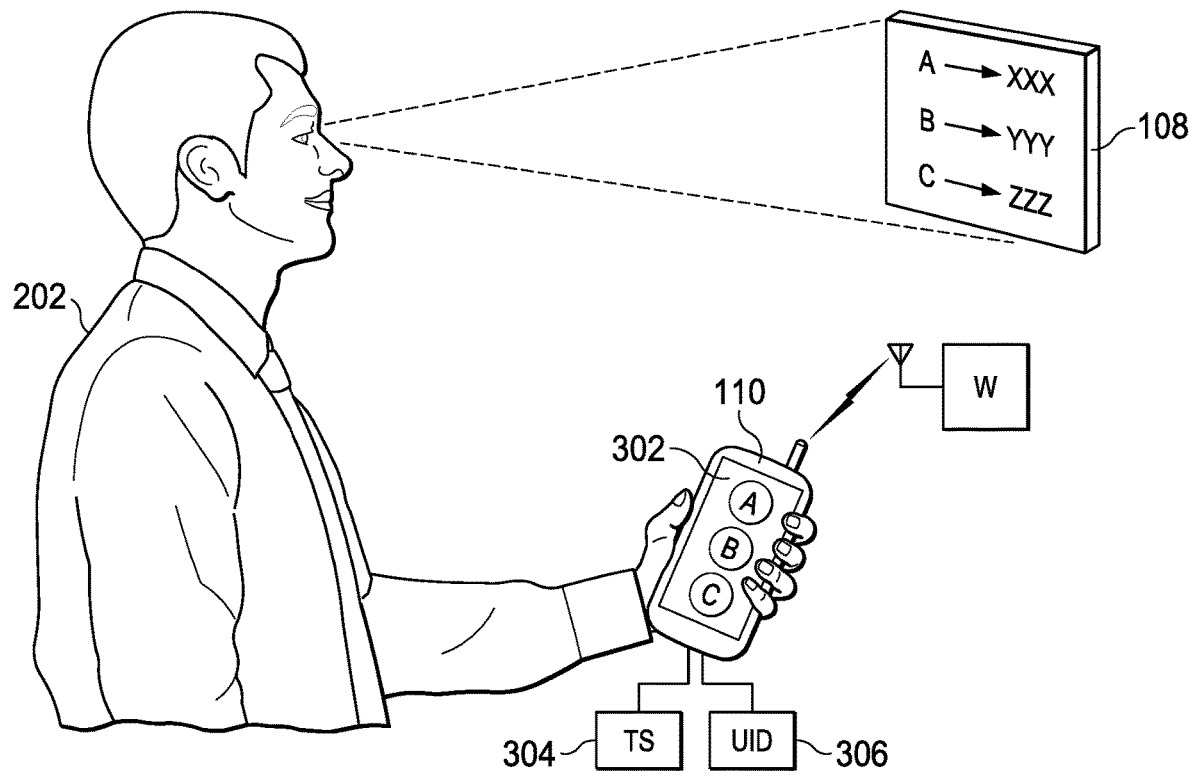
FIG. 3 illustrates a view of a single attendee interfacing with the screen and choices provided thereon and their mobile units and the selections provided thereon.

Referring now to FIG. 3, there is illustrated a diagrammatic view of a single individual presented with three responses on the display 108, these being illustrated as the letter A, the letter B, and the letter C. Each of these is associated with some type of information which allows the individual 202 to discern these particular choices. They may be some type of contest providing different selections. It may be that the particular cue requires a single response just to indicate that the user is paying attention to the screen. For example, it could be a contest that allows a responder the possibility of entering a contest, i.e., "press A on your device to enter your seat number in a lottery to win a certain prize." The MU 110 is provided thereon a screen 302 having those three selected letters available for choices. By placing their finger over one of the selections, the user creates a response that is then combined with a timestamp 304 and the created UID 306 back to the local CO 120 for processing thereof. It should be understood that, once the UID is created by the MU 110, this is now a UID that is carried temporarily in the MU 110 until the MU 110 either leaves the venue 102 or there is some type of timeout period of, for example, two hours.

The result of this overall operation is that a device, once entering the gate and initiating the application, creates a UID on the device that defines that device in a local database. Thereafter, any response can be correlated with the query in the substance of that query as long as the response is sent within a particular time window. For example, a query would be transmitted to the attendees and, during the transmission or slightly thereafter, there is a defined time window within which a response must be made. As such, even though the button associated with the letter A is selected for different queries, it is easy to discriminate in the database what information that particular response was associated with.

Figure 4:
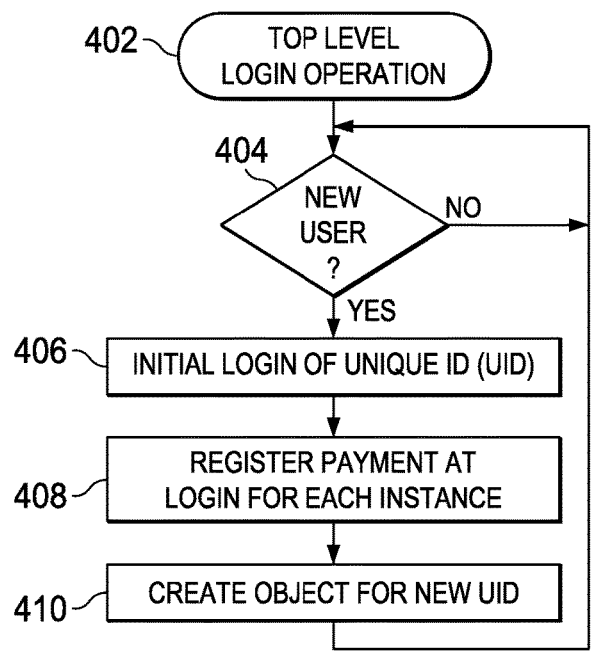
FIG. 4 illustrates a flowchart depicting the top level login operation.

Referring now to FIG. 4, there is illustrated a flowchart of the top level login operation, which is initiated at a block 402. This then proceeds to a decision block 404 to determine if a new user has entered the system. This is typically determined at the gate when the user passes through the gate or when an application is initiated. This may also be determined when a user answers an initial query, in addition to providing the user's seat number. If it is indicated that a new user is present, the program proceeds along a "Y" path to a block 406 to login an initial unique ID (UID) for that device. The program then proceeds to a function block 408 in order to register payment at the login event for each instance of a device passing through the gate or initiating their application. This payment operation will be described in more detail but, in general, the way that revenue is collected on this particular overall operation is that a flat fee is provided for each device that is registered for a particular event. The flat fee may be for any value. Thereafter, all of the data collected, whether the data is voluminous or not is immaterial to the overall revenue-generating model. Thus, then a defined amount of money can be collected depending upon the number of attendees while the advertisement level or volume has no effect on the overall revenue model. However, data is, to a large extent, owned by the central office. After registration of the login instance and the registration of the payment for that instance, a new object is created for that new UID in the local database, as indicated by a block 410. The flowchart then loops back to the beginning.

Figure 5:
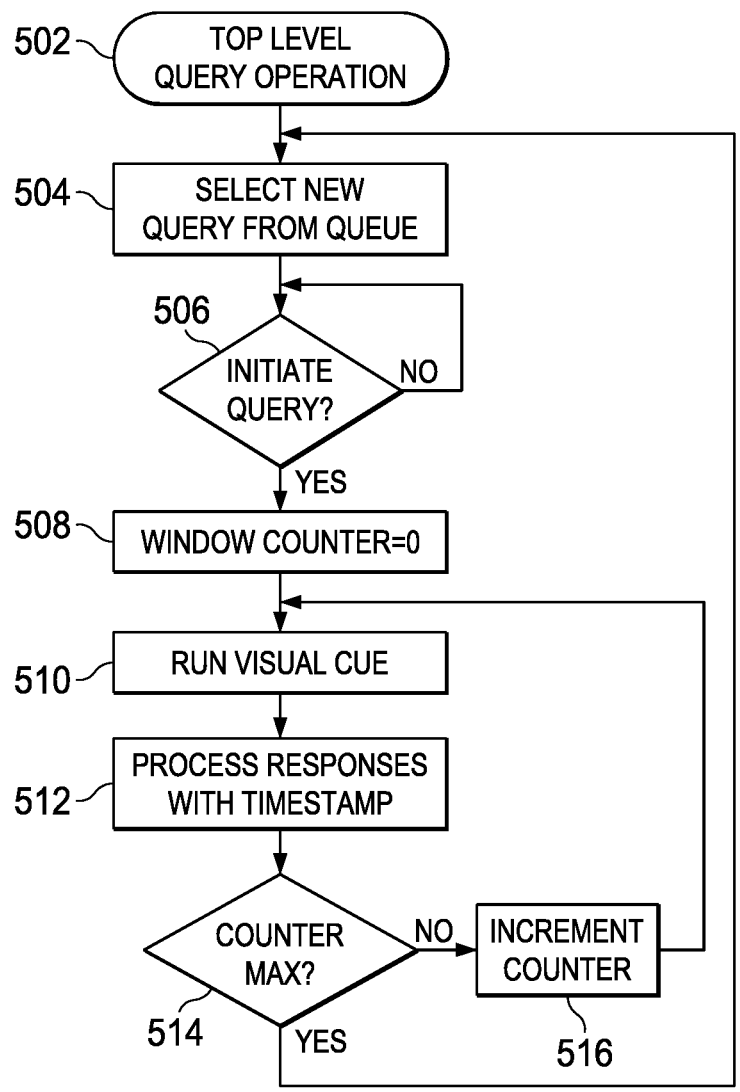
FIG. 5 illustrates a flow chart illustrating the top level query operation.

Referring now to FIG. 5, there is illustrated a flowchart for the top level query operation, which is initiated at a block 502. The program then flows to a block 504 in order to select a new query from the queue of queries. In general, when the system is set up, there will typically be some type of programming control over the information that is presented to the attendees at the event in the venue 102. This will, from overall point of view, allow each query to be independent within the database. However, they will be placed in the queue so that they can be individually selected at particular times and associated with particular advertisements. The program then flows to a block 506 to determine if the query has been initiated, which will occur at a defined time within the overall program schedule. The program then flows to a block 508 in order to set a window counter to a null value. As described hereinabove, each query requires a response to be returned within a defined time window. This actually gives context and meaning to a response. Otherwise, a simple key interface with a defined set of symbols, letters, or numbers would not be possible. In this matter, the letter A can be used multiple times for multiple queries and have a different meaning associated there with any statistical analysis of the overall data structure.

The program then flows to a function block 510 after it has been initiated and sent to a null value to run the visual cue. This way they see some type of advertisement with some type of enticing response required. The program will then flows to a function block 512 in order to process all of the responses received within the window, each of the responses having a timestamp associated therewith such that only responses received with a timestamp within the query window will be logged. The program then flows to a decision block 514 to determine if the counter is a maximum value, i.e., the end of the query time window. If not, the program flows along the "N" path to a block 516 in order to increment the counter and then back to the input of the block 510. This will occur until the counter has reached its maximum value, at which time flowchart will back around to the input of the block 504 to select the next query.

Figure 6A:
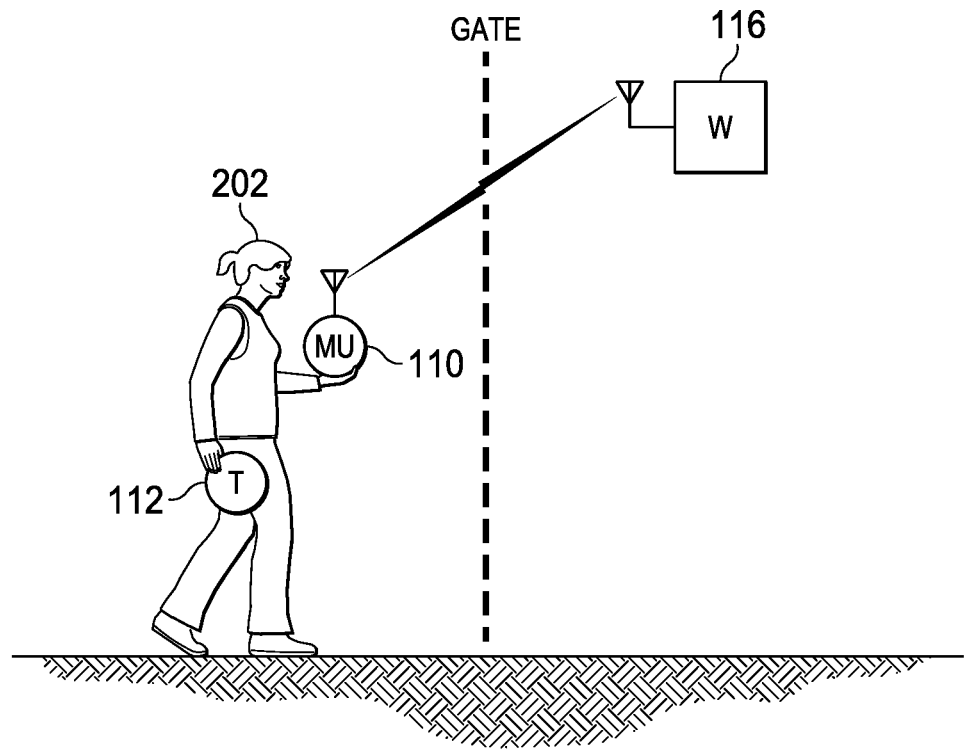
FIGS. 6A-6C illustrate examples of the initial registration when entering the venue.
Figure 6B:
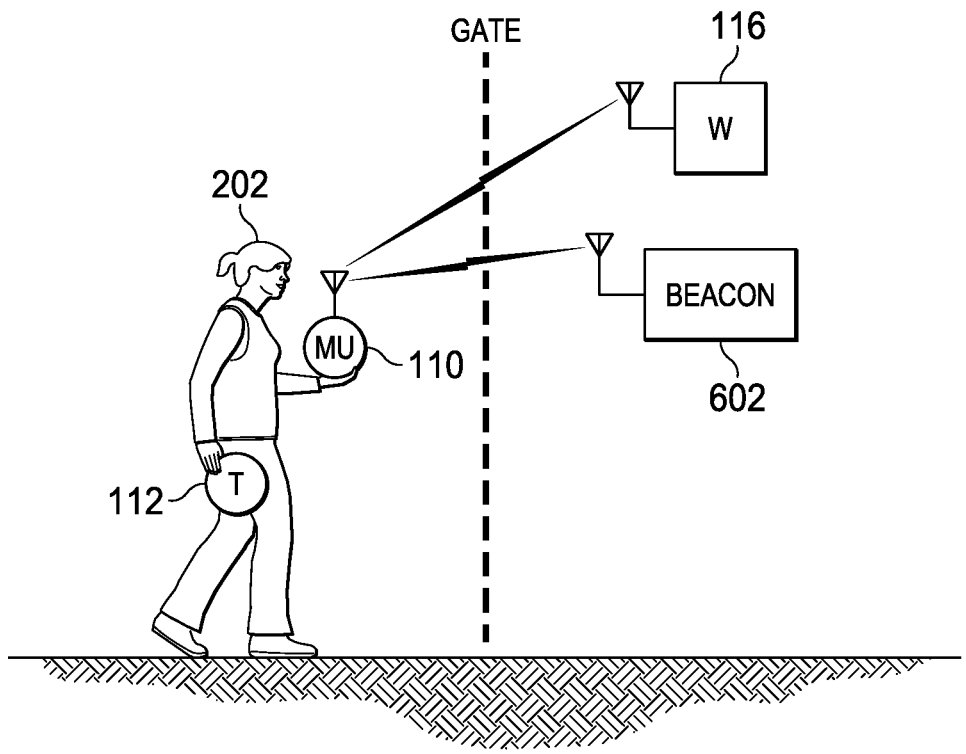
Figure 6C:
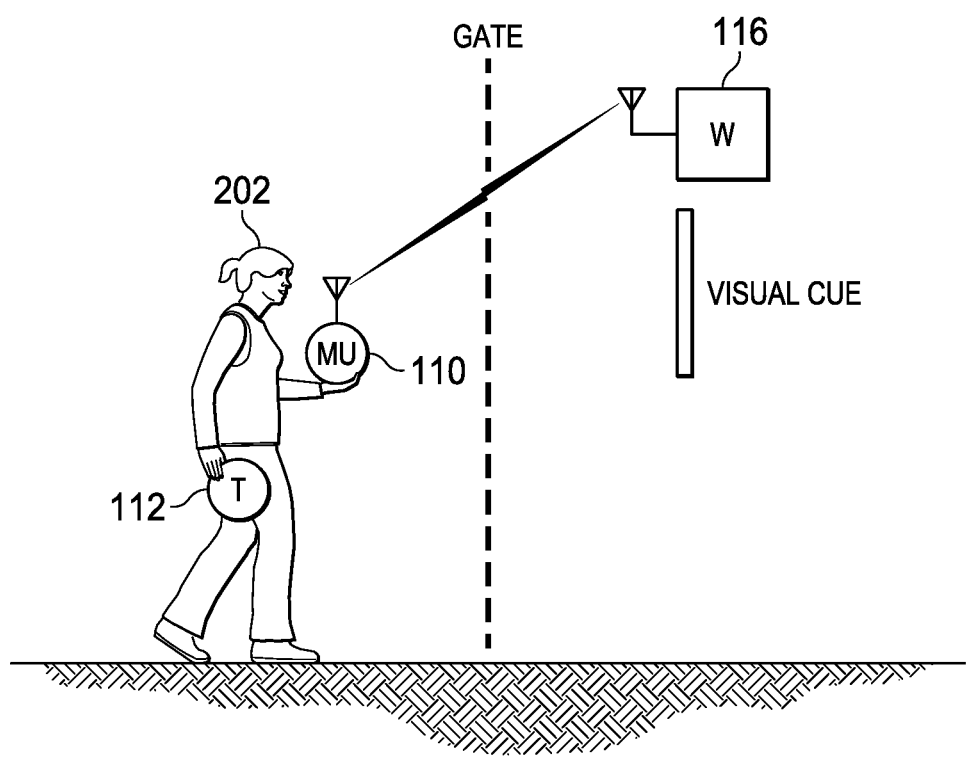

Referring now to FIGS. 6A-6C, there are illustrated three different diagrammatic views of how the presence of an individual 202 is recognized at one of the gates 104 or 106. In the embodiment of FIG. 6A, the individual 202 has the ticket 112 associated therewith, and, upon reaching gate, the individual 202 is prompted by some type of signage or the such to activate their application. Upon activating their application, the individual 202 can be presented with a screen to select a particular response which, when transmitted to the wireless device 116 with the created UID of the MU 110 and information regarding the selected response. As will be described hereinbelow, that is defined as a Response ID (RID). The second embodiment associated with FIG. 6B, the individual 202 is recognized by a beacon 602 which generates a signal that can be scanned by a separate receiver on the MU 110. These typically operate under IEEE 802.15.XX protocol, and they typically have some type of unique ID associated therewith and, in some instances, especially with the beacon, a command structure that allows more than just an ID to be sent. These can be a Bluetooth system or a BLE system or a Zigbee system or other similar systems. The point is that the application running on the MU 110 can recognize this ID and, upon recognizing this ID, can launch the full program and display the screen to the individual 202. The individual 202 then enters the ticket number and the MU 110 then creates the UID and generates a response, i.e., it answers a question which is an initial question, and then transmits this to the wireless device 116 for transmission to the local CO 120 for registration.

In the embodiment of FIG. 6C, there is illustrated an embodiment wherein the individual answers the initial question via some type of visual cue that is presented at the gate. This is a special visual cue that may be permanent. The user must answer this question in order to be registered. The screen of the user may actually display a simple display indicating to the user that they must view this visual cue at the gate and enter it in order to be eligible for a prize. This will prompt the individual 202 to input information from the ticket in additional to answering the response. Again, what is required to register the particular device with the local CO 120 is to generate UID from the ticket and then answer a question and provide one of one or more available responses to that question and forwarded the UID and RID to the local CO 120.

Figure 7:
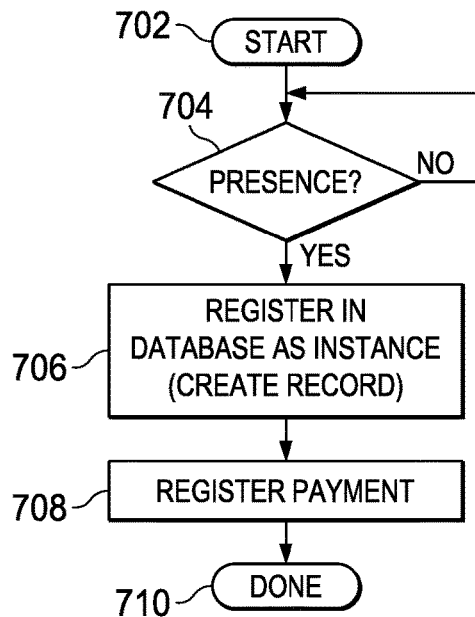
FIG. 7 illustrates a flowchart for the overall registration operation.

Referring now to FIG. 7, there is illustrated a flowchart depicting the overall detection of the presence of an individual at a gate, which is initiated at a block 702 and then proceeds to a decision block 704. This decision block 704 determines if it has detected the presence of a new device entering the venue 102 and, if so, the program proceeds to a function block 706 to register that user in the database as an instance, i.e., it creates a new record for that individual device which, thereafter, when it receives the UID from that device in associated with a response, it can recognize that a particular device has responded. This is important in that, for example, an individual might respond with multiple identical responses to a given query. What is necessary from the messenger's point of view is to know the number of separate devices, i.e., separate UIDs, that responded to a particular query. Thus, every one of the UIDs generating the responses to a particular query with a particular timestamp such that they are associated with that particular query will be logged, such that the messenger can now have a very clear and instant feedback as to the number of individuals actually paying attention to their particular advertisement. For example, if there were 10,000 attendees at an event and 5,000 responded to a particular query, this would indicate to the messenger that their advertisement actually was viewed by 5,000 attendees. Without this system, it is nothing but speculation as to how many of the attendees are actually viewing the advertisement.

The program then proceeds to a function block 708 after registration in the database to basic register a payment, as will be described hereinbelow, to indicate that a new UID has been added to the system. The program then proceeds to the "Done" block 710.

Figure 7A:
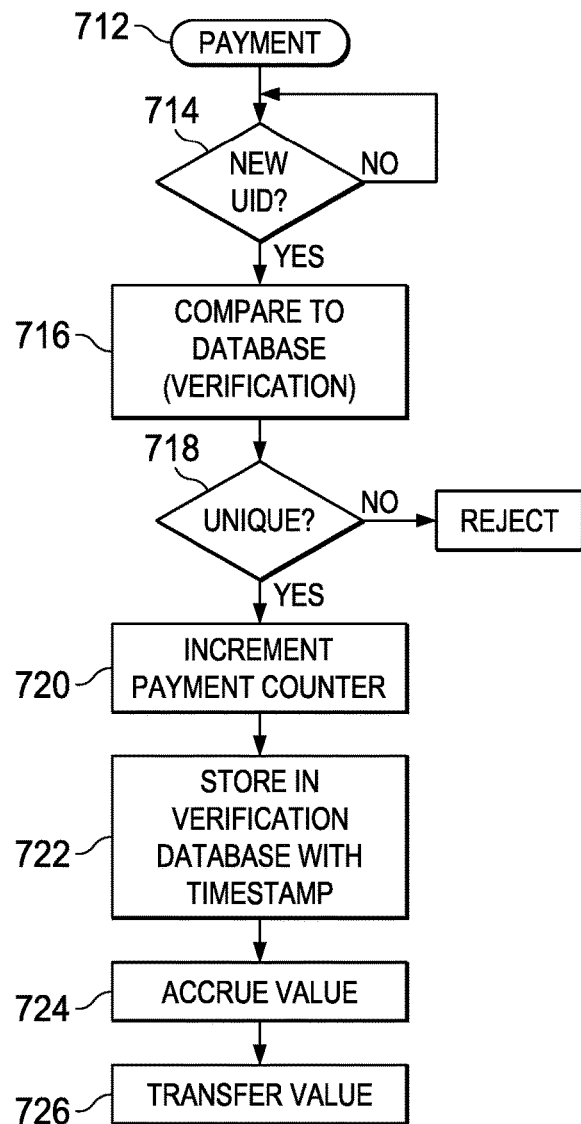
FIG. 7A illustrates a flowchart depicting the payment operation.

Referring now to FIG. 7A, there is illustrated a flowchart depicting the overall revenue model, which is initiated at a block 712 and then proceeds to a block 714 to determine if the new UID has been created. It should be understood that it is possible for an individual 202 to input the wrong seat number and, as such, duplicating another seat number that is already been entered into the system. If the UID is associated only with the seat number, there could be a possibility of a duplicate. If it is a new UID, the program proceeds to a function block 716 to determine if there is a duplicate in the database due to the input of a wrong seat number or such. This is the local database or the verification database. Program then proceeds to a decision block 718 to determine if it is unique and, if not, it rejects and, if so, it proceeds to a function block 720 to increment a payment counter. This payment counter information is stored in the verification database with a timestamp for the particular increment, as indicated by a block 722, and then the program flows to a block 724 in order to accrue the value and into a block 726 in order to transfer value.

Figure 8:
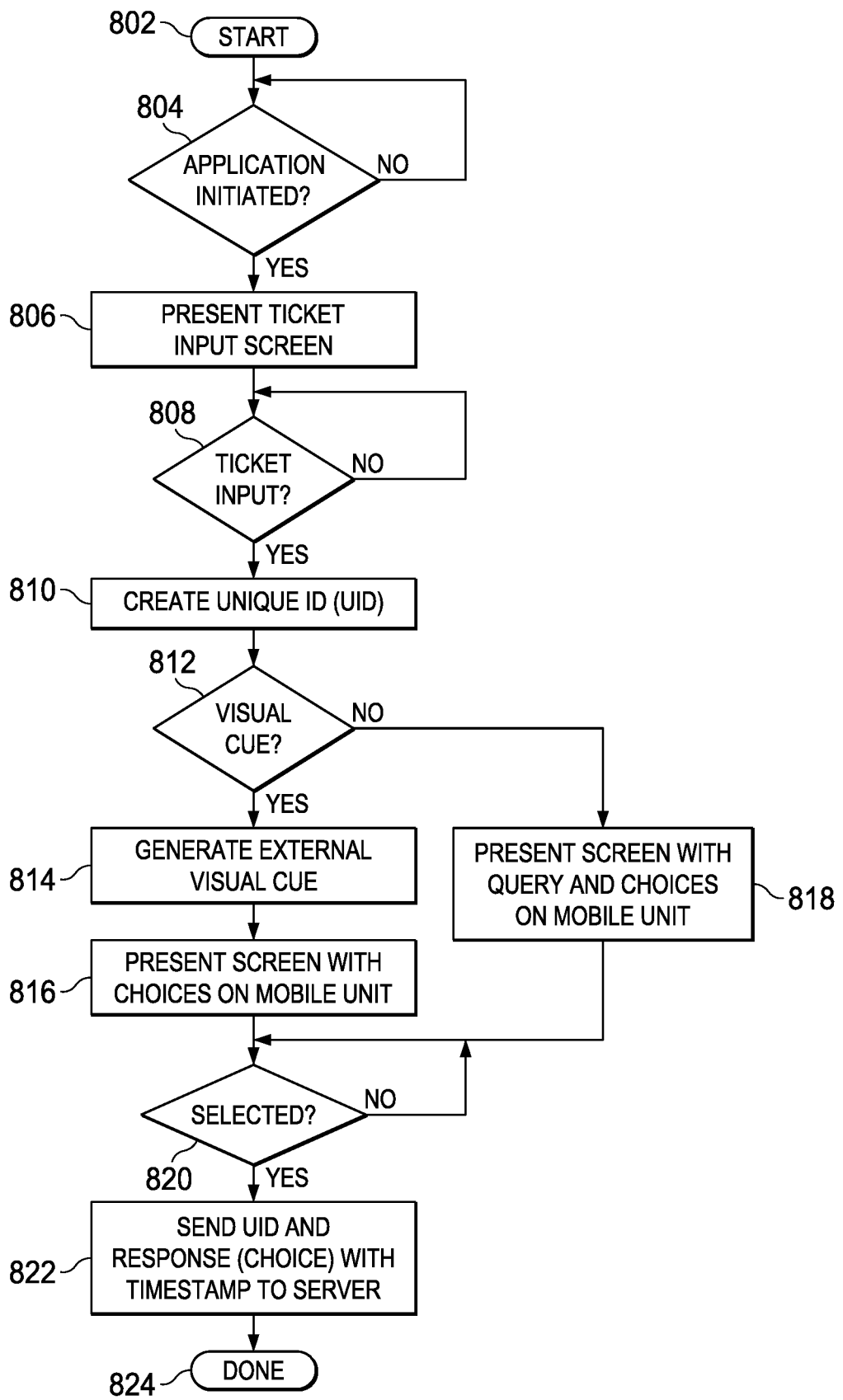
FIG. 8 illustrates a flowchart depicting the overall operation of creating the unique ID.

Referring now to FIG. 8, there is illustrated a flowchart depicting the operation at the MU 110, which is initiated at a block 802 and proceeds to a decision block 804 in order to determine if the application on the MU 110 has been initiated. If so, the program flows to a block 806 to present the ticket input screen to the individual 202. The program then flows to a decision block 808 to determine if the ticket information has been input. As noted hereinabove, that input is basically the section, row, and seat information that is typically on the ticket. However, any information that is unique to the ticket can be provided as input information. One advantage, however, of having the actual "physical" location of an individual is in a situation where in a prize is delivered to that individual as a result of some response. It may be that query is to require the individual to continually "tap" their response key at a rapid rate and for a long duration of time and the individuals that exceed a particular threshold will be awarded, for example, a T-shirt. This can then be delivered to their seat.

After the information on the ticket has been acknowledged as having been input, the program flows to a block 810 in order to create the unique ID (UID) on the device itself. This UID, as described hereinabove, is basically the information regarding the section, row and seat information associated with the ticket, in one example. This is created on the device and stored on the device as a local value. The program then flows to a decision block 812 in order to determine if the next step, the requirement that a response be provided, is to be provided by a visual cue. The visual cue could be a sign at the gate that indicates to the individual that they are to initiate their application on their device and then depress "1" for an indication of the Male gender and, for indication of the Female gender, depress "2" when the display of the potential or available response buttons is displayed to the individual. Of course, the display will only be displayed after the operation is initiated. This is the process that is associated with the "Y" path which flows to a function block 814 to generate external visual cue, either in real time or as a fixed display, and then the program flows to the function block 816 to present the screen or display with the various choices on the user's device. If, alternatively, no visual cue is provided externally, the user is presented on their device with a screen that provides a choice with a query, such as "select your gender" with only two choices provided, "1" for the gender Male and "2" for the gender Female, as indicated by block 818. Once user has selected one of these two, then the application will shift into the full response mode and a full-screen of all available responses will be displayed, as will be described hereinbelow.

The program then proceeds to a decision block 822 to determine if the selection has occurred, and, if so, the program proceeds to a function block 822 in order to send the created UID and that the response code (RID) along with a timestamp to the server and in the program proceeds to Done block 824.

Figure 9:
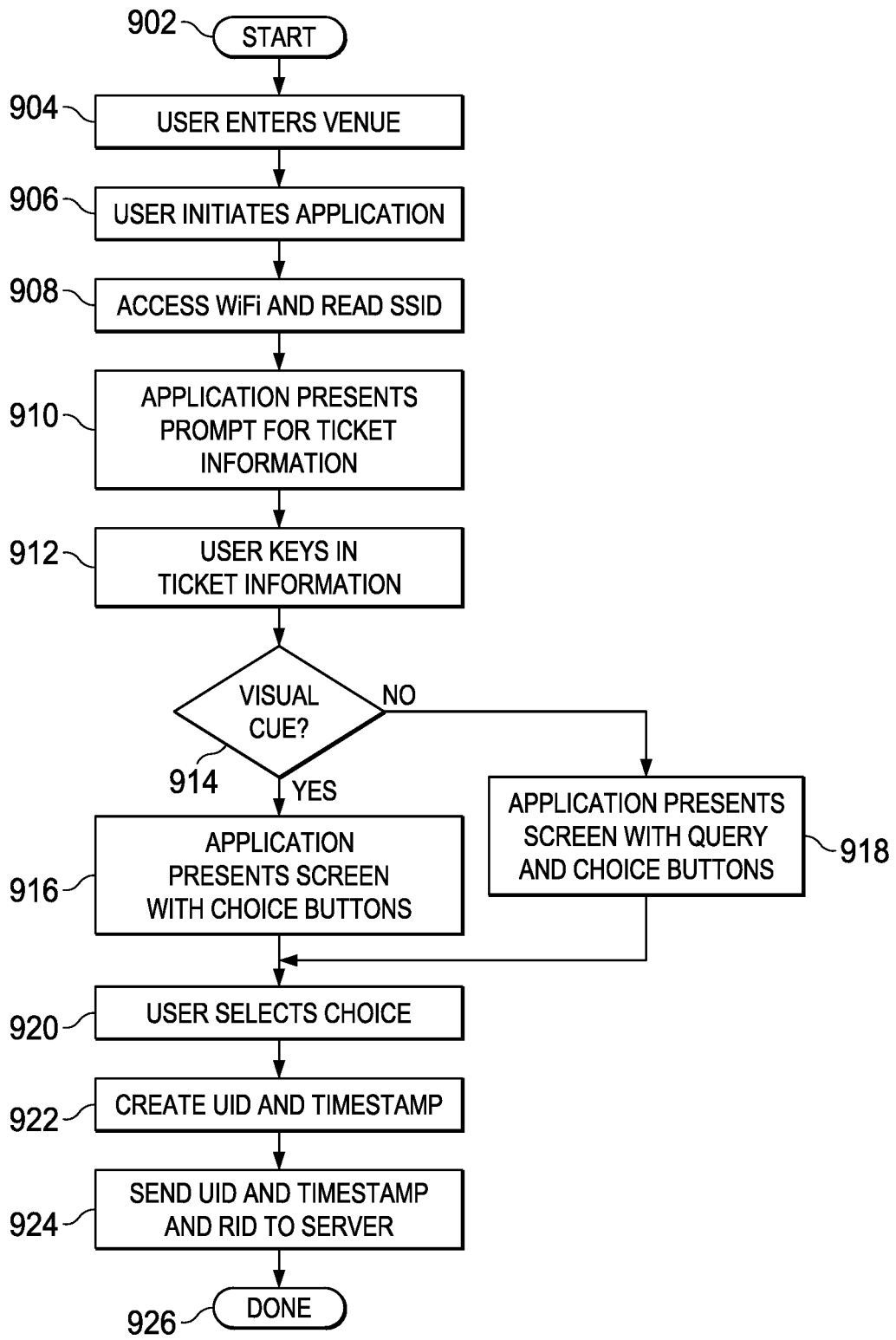
FIG. 9 illustrates a flowchart depicting the operation of creating the unique ID at the user's device.

Referring now to FIG. 9, there is illustrated a flowchart depicting the overall operation of the user entering the venue and the overall operation. The program is initiated at a block 902 and then proceeds to a block 904 wherein the user enters the venue. Once the user enters a venue, the user then initiates the application, as indicated by block 906, which, as described hereinabove, can be initiated by the user, or some external device such as a scanner or gate beacon or the such can be utilized to automatically activate the application upon passing a gate. When the application is initiated, it will access the network and determine the SSID or some similar identification information associated with the network from the network, as indicated by block 908. The application will present to the user a prompt for ticket information, as indicated by block 910. The program then flows to block 912 wherein the user will key in the ticket information. However, alternatively, there could be provided the ability of the user's device to actually scan the ticket with the camera which will allow the camera to extract unique information there from. The unique information could be, in the one disclosed embodiment, the section, row, and seat information associated with the ticket or could be some unique code on the ticket. As long as this information is unique as to all other individuals bearing a ticket, this will facilitate the operation of the overall disclosed embodiments. Once the ticket information has been input, this allows the unique UID to be created with that information. The program then flows to a decision block 914 in order to determine if there is a visual cue. If there is a visual cue, the application will present the user with choice in block 916 providing choice buttons associated with a particular visual cue that are necessary in order to respond to the visual cue. If no visual cue is presented externally, the program will flow to a block 918 to present the user with a screen having both a query and the choice buttons associated there with. Once the choice has been made, as indicated by a block 920, the program flows to a function block to 922 in order to create the UID with a timestamp and then sends the UID and the timestamp in association with the RID to the server, as indicated by block 924. It should be noted that each available choice will have some code associated there with. As will be noted here below, there are a limited number of available choice buttons that will be provided to user. These will typically be limited to 40. Thus, a five-bit code is all that is required in order to support this number of available choices. Thus, the RID will be a code from 1-40 in binary form. This is a relatively small amount of information to be provided in a transmission. The program will flow to a "Done" block 926.

Figure 10A:
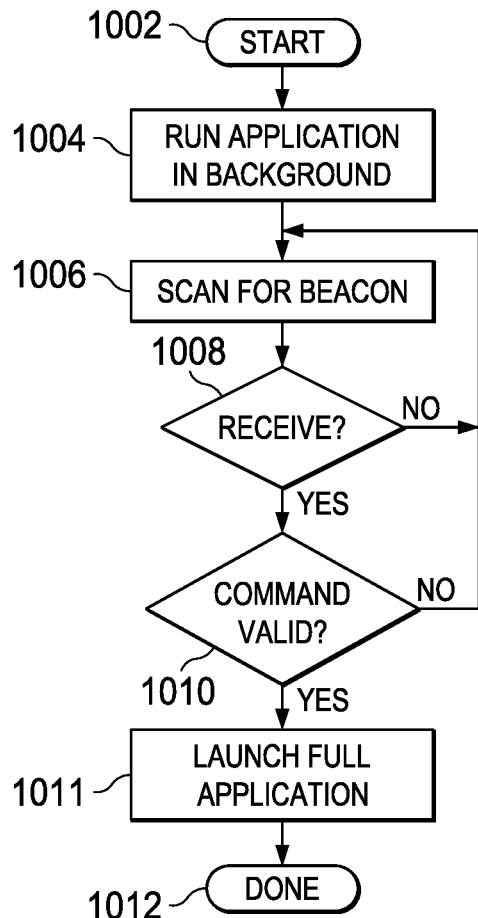
FIGS. 10A and 10B illustrate flowcharts for launching the application based on a presence determination at the gate of the entrance.
Figure 10B:
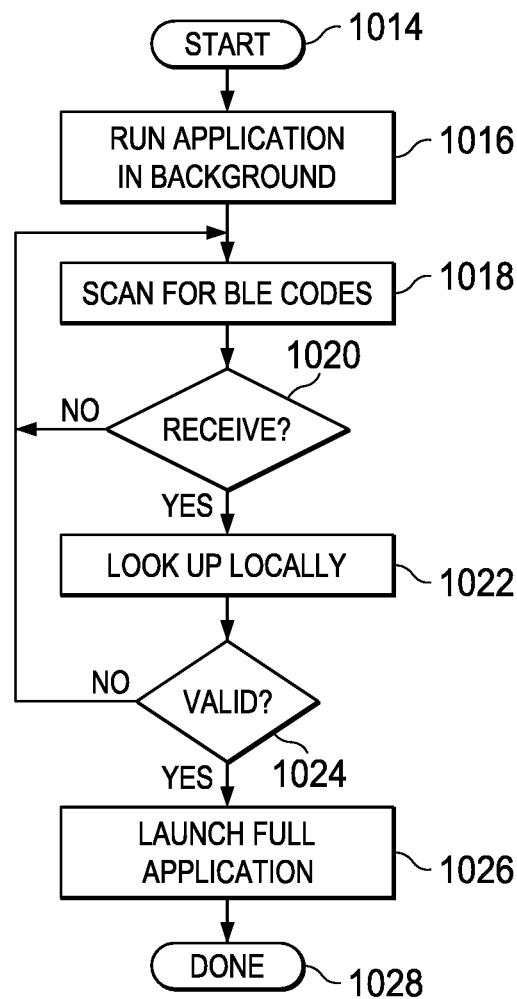

Referring now to FIGS. 10A and 10B, there are illustrated flowcharts depicting the operation of presence recognition operation for determining when a device, an MU 110, is passing through a gate. Referring specifically to FIG. 10A, the program is initiated at a block 1002 and then proceeds to a block 1004 to run the application in the background. In this mode, the full application is not running but, rather, a background application that performs a "sniffing" operation for known signals on one of the multiple radios that may exist within the device. For example, some devices will have a cellular transceiver interfacing with the cell network, and 802.15.4 radio for interfacing with Wi-Fi, a Bluetooth transmitter and maybe a Zigbee transmitter. Additionally, a thread transmitter may also be provided for interfacing with these types of devices. This background application merely looks for the presence of one of these transmitting devices external to the device in order to read its identifying information. This is unique to that device and can be, through a lookup table locally on the device, utilized to take some action such as launching the full application.

The program proceeds to a function block 1006 in order to scan for, in this example, a beacon. A beacon is typically at a transmitting device that not only has a unique ID but also transmits data along with its transmission. This is a one-way transmission and does not require any type of handshake in order to receive the information. Some technologies, such as Bluetooth, do require "hearing" in order to receive information from the transmitting device. The program then proceeds to a decision block 1008 in order to determine if any beacon information has been received. If so, the program flows to a decision block 1010 to determine if any information received from the beacon, such as a command, is a valid command which can be operated on by the background program or application. If not, the program flows back to the input of function block 1006. If the command is valid, the program flows to a function block 1011 in order to launch the full application and then to a "Done" block 1012.

Referring now to FIG. 10B, there is illustrated a flowchart depicting the use of a BLE transmitter. The BLE transmitter is a device that can not only send a unique identifier but also transmit information without requiring "pairing." Program is initiated at a block 1014 and then proceeds to a block 1016 in order to run a background application for the sniffing operation. The program then flows to a function block 1018 in order to scan for BLE codes, i.e., the unique identifier. The program flows to a decision block 1020 to determine if such has been received and, if not, back to the input of function block 1018. Once received, the program flows to a function block 1022 in order to lookup the code locally. If the code, stored in a local database, is valid, this indicates, via a decision block 1024, that the code is a recognizable code, i.e., one that is associated with the overall operation of the system. If so, the program flows to a function block 1026 in order to launch the full application and then to a "Done" block 1028.

With the automatic recognition of an external transmitter with a small local transmission range disposed at an entrance gate, all that is required for an application to be launched is just a recognition of the presence of a particular device within the transmission range of a beacon or similar type transmitting device. This, of course, only initiates the application. There is still a requirement that the individual viewing the screen, which is typically achieved by some type of audible tone or prompt, is to provide some type of response. As noted hereinabove, that response may be a response to a query actually output by the device, which indicates that at least the individual is looking at their phone and interfacing with the application. It could be that the response is in response to viewing some type of visual cue local to the gate. This visual cue could be a "fixed" visual cue or it could be a time varying visual cue. With a time varying visual cue, the timescale that is provided on the response that is sent can be utilized to verify that this response was activated at the gate as opposed to somewhere else. Of course, that necessitates that, not only does the unique ID have a timestamp associated with it at the time it was created, but also that the response to the visual cue be timestamped.

Figure 11:
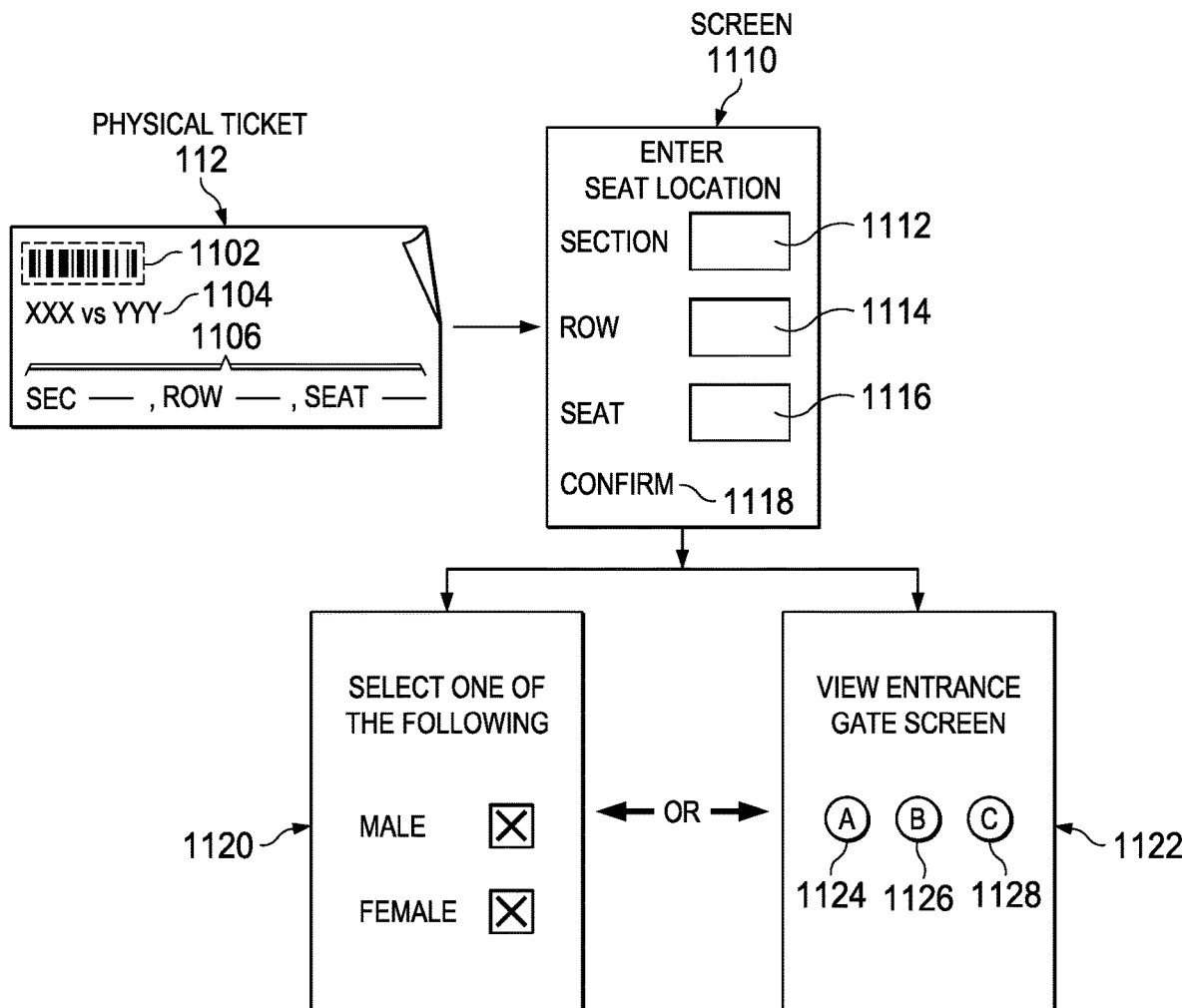
FIG. 11 illustrates a diagrammatic view of the screen interface with the user for entering the ticket information and creating the unique ID.

Referring now to FIG. 11, there is illustrated a diagrammatic view of the initial screen display to the user of the MU 110. As described above, there is provided a ticket 112 that has associated therewith multiple fields. There is provided with some type of unique barcode 1102, information about the event 1104 and also the seat and row information in a field of 1106. In the disclosed embodiment, the section, row and seat information is what is input. The screen provided is represented by a reference numeral 1110 and displays a text prompt to the user to enter the information regarding the section, the row and the seat in fields 1112, 1114 and 1116, respectively.

Once the user enters this and selects a "Confirm" field 1118, then this information is utilized to create the unique ID as described hereinabove. Then one of two events will happen. The first is that a screen 1120 will be displayed that basically provides a query requesting the selection of one of two choices, in this example, either a Male or a Female gender. By selecting one of these two, a response can be generated that actually provides information to the database as to the gender of the individual. Interestingly enough, as will be described hereinbelow, this provides to the messengers information regarding the gender of each unique ID (UID) that is in the system. However, studies suggest that a certain percentage of the individuals will make a mistake on their entry for whatever reason in a certain number of individuals will actually put the wrong answer in. Thus, what will be indicated to the messengers is that statistically this person is one gender or the other, but this is not a 100% indication.

The other aspect of it will be the presentation of a screen 1122 which prompts the user to view some type of screen that is proximate to the entrance gate. The screen is utilized for the purpose of providing the first query which is required in order to actually create the entry into the database of the UID for that particular device. There is presented in this screen 1122 various response fields, in this example, 3 response fields, 1124, 1126 and 1128. In this example, there would be provided a viewable screen that provides some type of query requiring the selection of one of three selections as the response. These responses, in addition to allowing registration of the UID in the database, also provide some statistical information about a person associated with that UID.

Figure 11B:
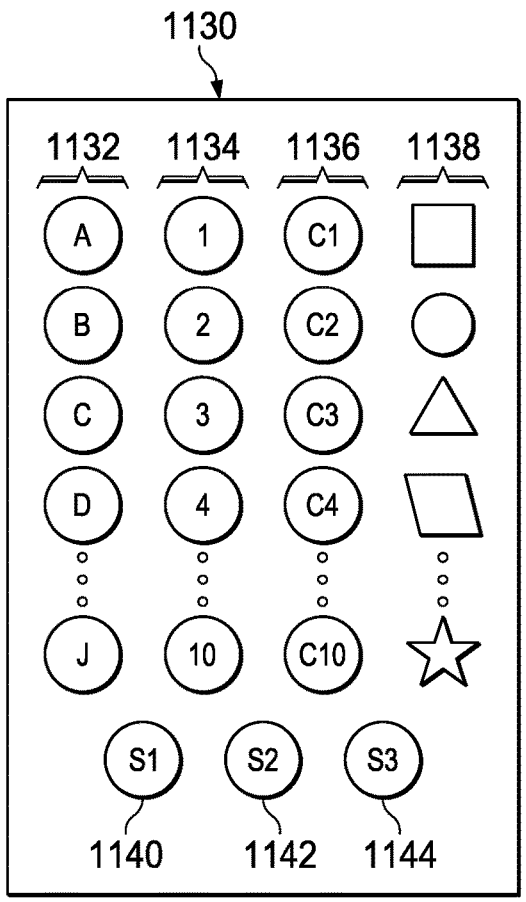
FIG. 11B illustrates a screen view illustrating the fixed selection of possible response buttons provided to a user.

Referring now to FIG. 11B, there is illustrated a depiction of an actual screen that is provided after registration of the UID for providing responses to various queries. This screen is represented by reference numeral 1130. This screen 1130 provides a fixed number of displayed response codes. There are provided a first column 1132 of output alphabetical characters, the first 10 characters of the alphabet from A through J. There is provided a second column 1134 for the first ten numerical characters from 1 through 10. There is provided in a third column 1136 the first 10 the primary colors, each color represented in a circular button. There are provided in a fourth column 1138 ten basic shapes such as a square, a circle, a triangle, etc. Thus, there are provided 40 fixed characters that will always be provided on the screen. None of these characters is dedicated to any particular response to any particular character. When building a query, designer of that query actually maps a particular response key to the database and the definition of a desired response, as will be described hereinbelow. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. First, the fact that they answered with either response indicates that there looking at the screen and this is important information to have. A further refinement of the response can be provided by mapping a particular response to certain statistical records. This will be described in more detail herein below.

There are also provided three response buttons 1140, 1142 and 1144, respectively, that are not responses that can be mapped into the database outside of the MU 110. These buttons 1140-1144 are provided for another function, and the function is to allow interface with the internal application in response to a visual cue, which will be described hereinbelow.

Figure 12:
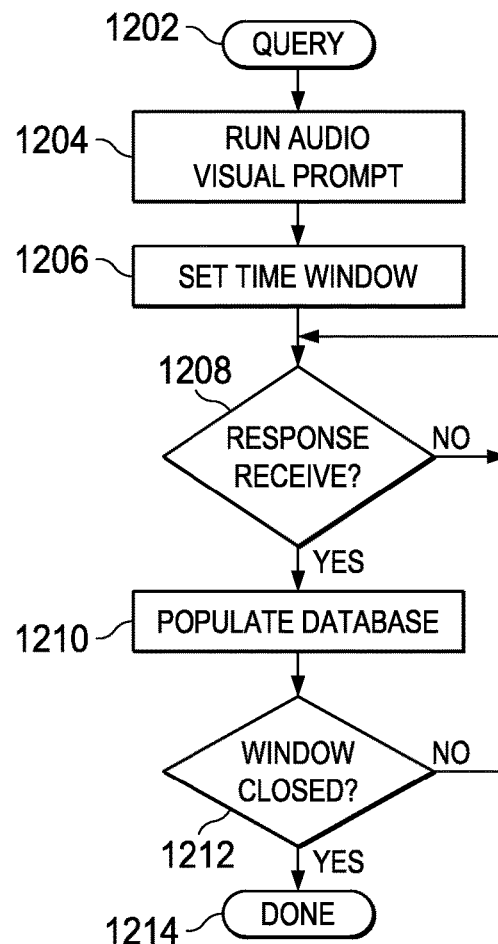
FIG. 12 illustrates a flowchart depicting the query operation for generating a query for viewing by the user.

Referring now to FIG. 12, there is illustrated a flowchart depicting the operation of running a query at a top level. This program is initiated at a block 1202 and proceeds to a block 1204 in order to run the audio or visual prompt. The program flows to a function block 1206 in order to set the time window within which a response is to be received for that particular query. The program then flows to a decision block 1208 to determine if any responses have been received and, if so, then to a function block 1210 in order to populate the database with a response, which just indicates that this particular MU 110 via its UID is actually associated with a person looking at the prompt. The program then flows to a decision block 1212 to determine if the time window has closed for receiving responses. If not, the program will continue to loop back to the input of the decision block 1208 until the time window is closed for that particular query, at which time the operation is terminated at a "Done" block 1214.

Figure 13:
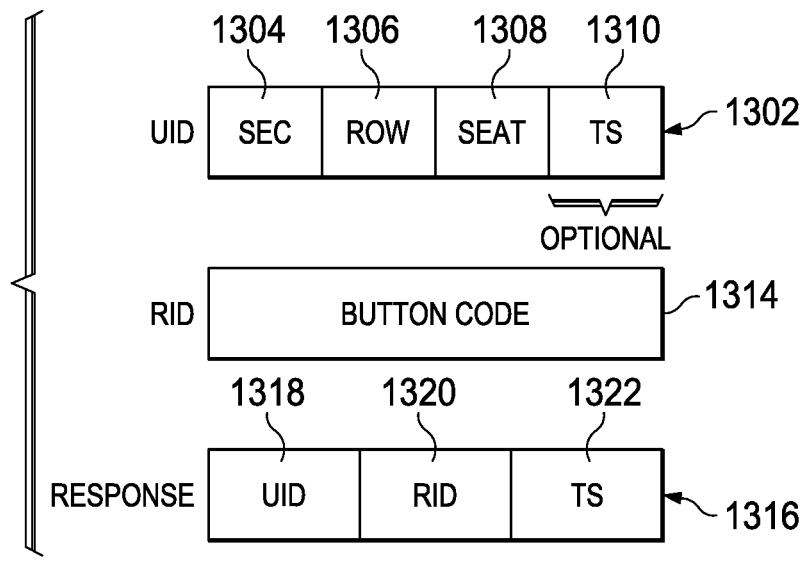
FIG. 13 illustrates the data structure of information assembled at and transmitted by the Mobile Unit.

Referring now to FIG. 13, there is illustrated a diagrammatic view of the various data structures generated by the MU 110 during registration and operation. In a first data structure 1302, there is illustrated the various data fields for the UID. They are defined as a first field 1304 associated with the section, a second field 1306 associated with the row and a third field 1308 associated with the seat. A fourth section 1310, an optional section, is associated with a timestamp that can be utilized at the time of the creation of the UID to uniquely define it in the event that somebody else actually this enters their seat number, for example. This is not a timestamp that is used for identification of the time at which the UID is transmitted but, rather, just additional information to make the UID more unique. Of course, it could also be utilized for the purpose of determining the time in which the UID was created. This particular data structure requires very little data bandwidth to transmit such, as the information contained in there is minimal.

For the second data structure, a data structure 1314 is provided for the button code for the response, which, as noted above, is the response ID (RID). This is a five bit code. The actual response that is sent is illustrated by a data structure 1316, which is comprised of a first data field 1318 having associated therewith the UID, a second data field 1320 associated with the RID, a third data field 1322 associated with a timestamp, TS. This field 1322 is actually the timestamp that is generated when the response is actually created as compared to the timestamp infield 1310 that further defines the UID as unique. Overall, this response data structure 1316 is all that is required to be transmitted in response to seeing a visual cue. There is no two-way communication that is required between the server and the MU 110, thus reducing the overhead load on the network traffic. Thus, for example, if the response data structure 1316 required three bytes of data, 10,000 participants viewing a visual cue and responding thereto would only transmit 30 Kbytes data within the window. If that window defined by the query was open for just one second, there would be required a minimum bandwidth of 30 Kbytes/sec, which is well below the lowest bandwidth Wi-Fi connection to any network. Thus, if one of the responses was to see how many times any individual associated with a UID could "tap" a particular response button, it would still be difficult, with the human response time, to exceed any practical bandwidth limit in a network. It is a minimization of overhead and the production of the actual data that is required to provide information to an messenger. Again, what is provided by the response button is both an indication of "eyes on the screen" and also some back end statistical data.

Figure 14:
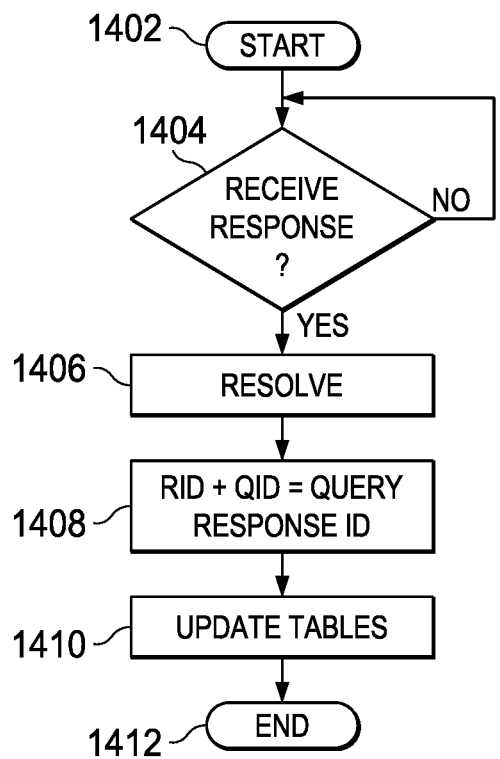
FIG. 14 illustrates a flowchart for a server receiving a response.

Referring now to FIG. 14, there is illustrated a flowchart for the server receiving the response, which is initiated at a block 1402 and proceeds to decision block 1404 in order to determine if a response has been received. When received, the program flows to a function block 1406 in order to resolve the particular response. What has been received at this point is a response having a UID, and an RID and a timestamp. What is resolved is, knowing the time window, the presence of a unique code which is a combination of the RID and QID (query ID), is indicated by function block 1408. This combination, as will be described hereinbelow, is a unique ID that can be utilized for back end statistical analysis. The UID is also resolved and is utilized to indicate that a particular UID has responded (noting that any time that response is referred to as being responded by UID, this also means that it is being responded by MU 110). If the query, for example, just wanted to know how many individuals are looking at the screen in response to a particular query, any response received, whether it be multiple responses or a single response, during the time window associated with the query will provide an indication, for for all received UIDs, of the number of individuals that paid attention to the query, and all that is required to resolve this particular query into any useful information is the UID. By looking at the combination of the unique RID plus QID, further information can be determined to resolution associated with other tables mapped to this particular query and response. The program will then flow to a function block 1410 in order to update various tables and into and "End" block 1412.

Figure 15:
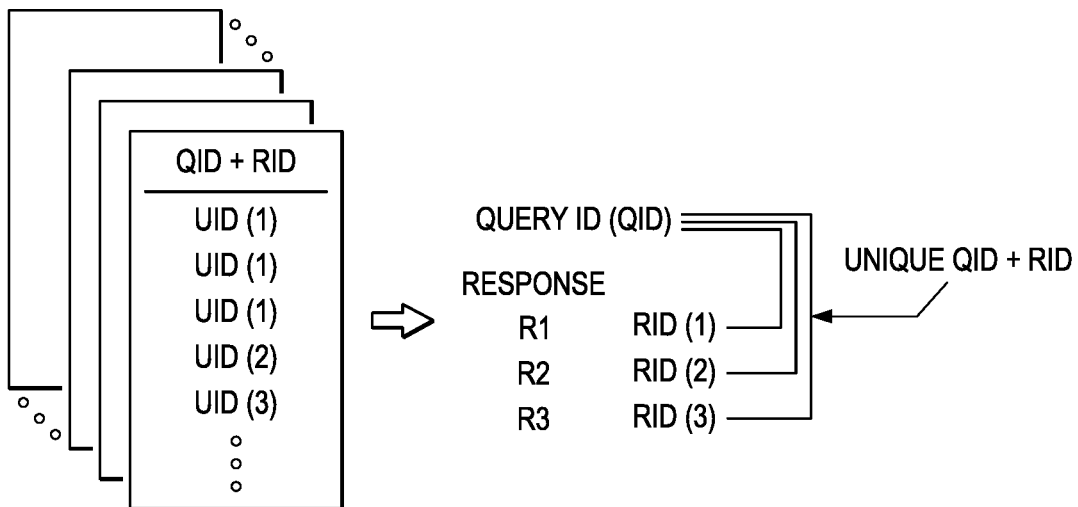
FIGS. 15-18 illustrate diagrammatic views of the various records that are generated and populated in the local database.

Referring now to FIGS. 15-18, there are illustrated diagrammatic views of how the tables are generated for various combinations of RIDs for a particular query ID (QID). For example, for a given query, there may be three responses provided, R(1), R (2) and R(3). It may be that the query presented to the individual is the choice of responses "A," "B," and "C." These particular response codes will be mapped to some type of information associated with that response. For that response, i.e., for the first response in association with a particular QID, QID+R (1), this combination being a unique ID that defines a unique object or table within the database for this combination. Thus, within this particular table associated with that unique ID, the particular UIDs that responded as such can be contained therein and each of these UIDs will provide pointer back to the actual UID record associated with that UID. FIG. 15 illustrates these particular tables.

Figure 16:
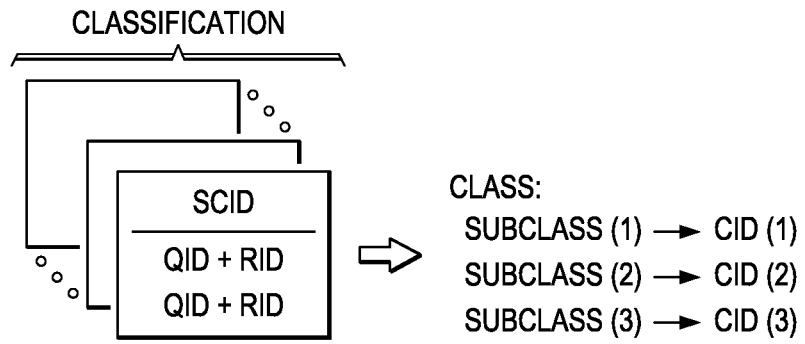

In FIG. 16, there is illustrated a further refinement of the information. As will be described hereinbelow, queries can be provided with information associated with classifications. For example, there may be a classification of "gender." This would have the sub classification, at its highest level, of male or female. Classification would have a classification ID of CID and the sub classification would have a unique ID of SCID. For example, take the example of gender. This can be so classified into possibly ten different analytical "bins." The system could be designed such that a prior knowledge of a particular generated query could be resolved into ten different percentage classifications, one wherein the gender is classified as follows:

10% F/90% M
20% F/80% M
30% F/70% M
40% F/60% M
50% F/50% M
60% F/40% M
70% F/30% M
80% F/20% M
90% F/10% M

Figure 17:
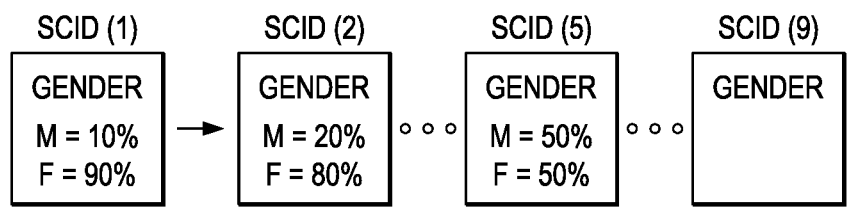
Figure 18:
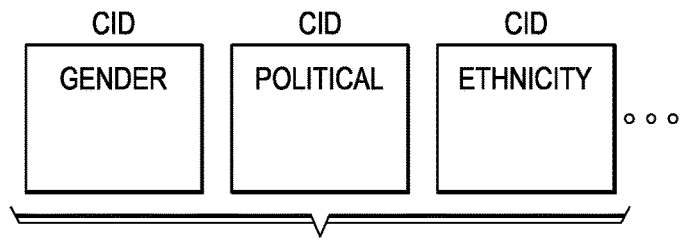

Thus, a particular response can actually be mapped to one of these statistical bins. This would thus require that the designer of the query understand that when a particular individual responds with the particular response, this will indicate to the database that, for example, 80% of the respondents are female. Each of these particular sub classifications can be mapped all the way back to the UID and the QID+RID unique code. This is illustrated in FIG. 17. The actual CID is illustrated in FIG. 18, indicating that there can be one CID for gender, one for political affiliations, one for ethnicity, etc. By utilizing prior information known to the designer of the query, each response can be mapped to multiple different classifications and sub classifications, such that just the response provided by any MU 110 can be resolved into information regarding the particular individual that responded to such. Certain information can be determined as to their gender, as to the political affiliation or as to their ethnicity and other such information.

Figure 19:
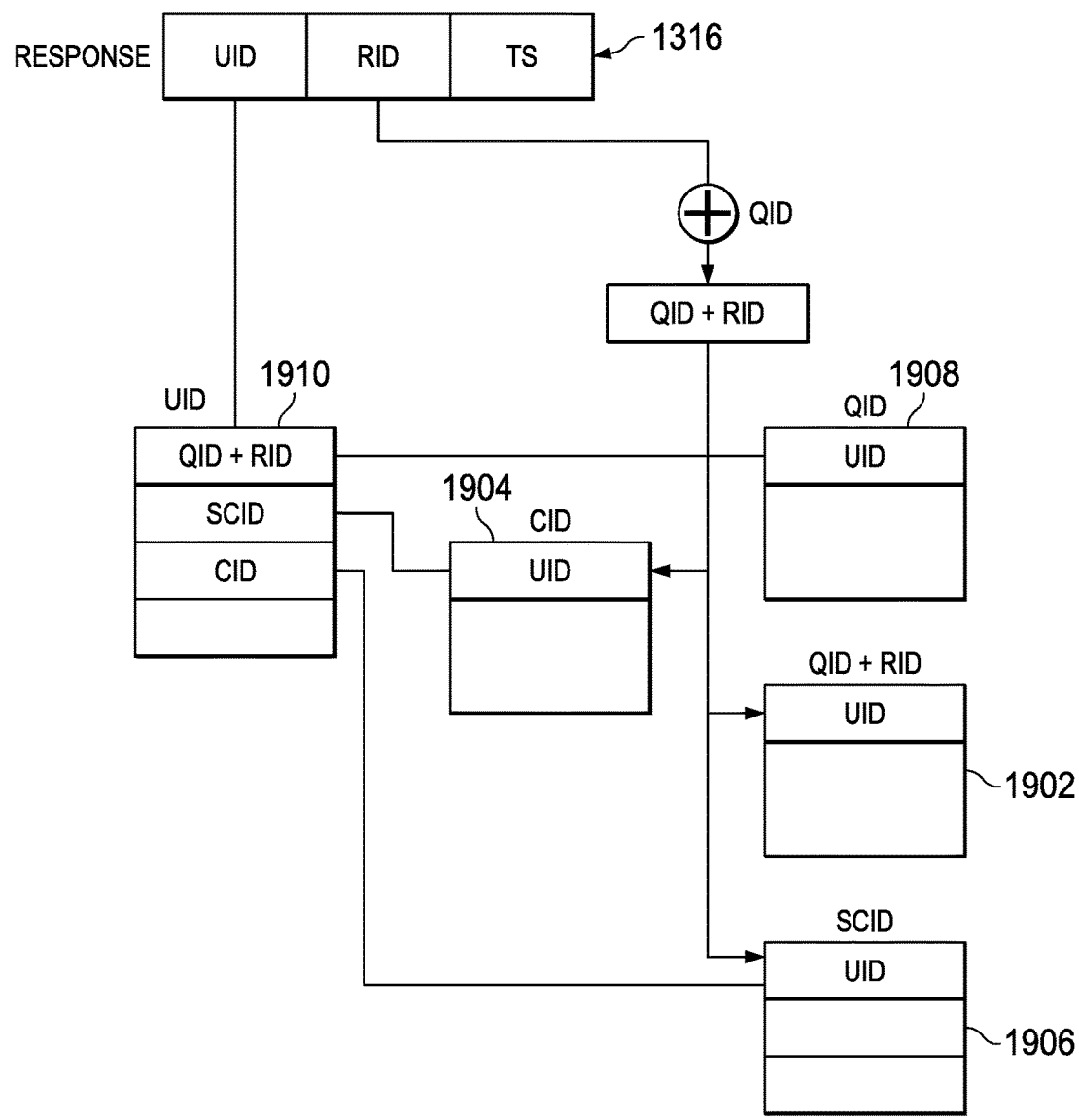
FIG. 19 illustrates a diagrammatic view of the overall relationship between multiple records and unique IDs in the system.

Referring now to FIG. 19, there is illustrated an additional diagrammatic view of how the mapping occurs. The additional response data structure 1316 is resolved such that the UID will define a UID data record or object that is to be updated with the various information provided by the analysis and the mapping of the responses. The resolving technique defines, with the response and the query in which the response was received, the unique ID for the QID+RID denoted in a table or object associated therewith. This is a table 1902, which is updated with the particular UID that responded with that particular response code. This QID+RID unique code is mapped to a CID table 1904 to place a pointer to the UID therein. This also points to an SCID table 1906 such that the UID can be placed therein. There's additionally a QID table 1908 that has the particular UID associated with this response placed therein. Thus, by looking at any one of the tables associated with the UID table, all of the UIDs that were associated with a particular response for the QID will have a reflection of the number of UIDs that responded as such. If, for example, one wanted to know how many UIDs responded to just the gender question where either response indicates some information about gender, one need only look at the CID table 1904 associated with that particular response, i.e., the one to which the QID+RID unique code was mapped to. If one wanted to look at how many respondents replied to the particular query, all that is required is to look at the QID table 1908 and this will give a total of all of the UIDs that responded to the query. There is knowledge, of course, as to how many total UIDs are in the system or are present at the event. If, for example, at halftime of a basketball game, any query was presented to the attendees and a response resulted in a 40% response, this would indicate to the messengers that 40% of the attendees were viewing the screen. Some information can be gleaned from this information. However, this provides an actual real time indication to the messengers of the fact that they were able to have 40% of the attendees with "eyes on the screen."

Figure 20:
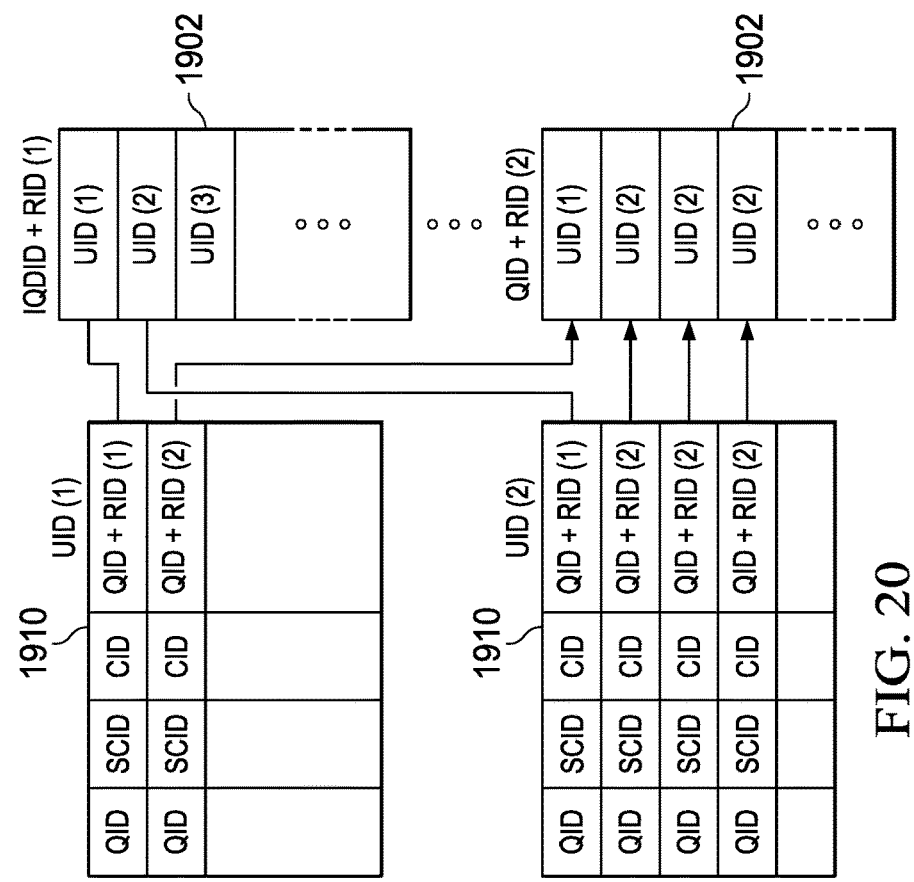
FIG. 20 illustrates a detail of the records illustrated in FIG. 19.

Partly referring now to FIG. 20, there is illustrated a more detailed diagrammatic view of the mapping operation. It can be seen that, for each UID in table 1910 that each UID has associated therewith a QID, an SCID, a CID and a QID+RID. There is shown the mapping to the table 1902 which shows multiple UIDs mapped thereto. There are illustrated two UID tables flanking 1910 Thereto. These tables also mapped to a second QID+RID table 1902.

Figure 21:
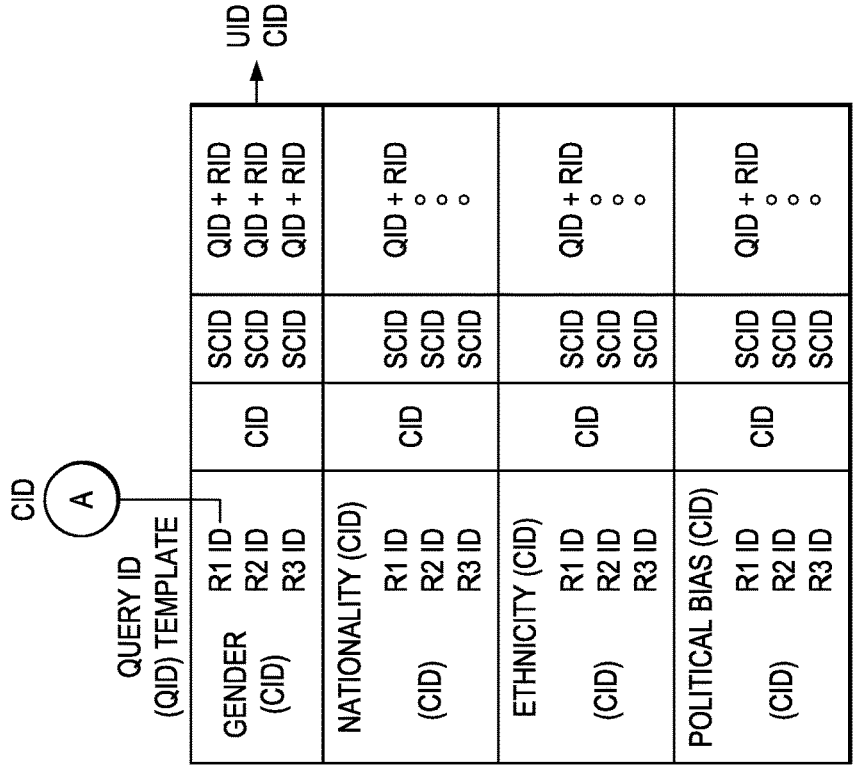
FIG. 21 illustrates a diagrammatic view of the template utilized for creating a query.

Referring now to FIG. 21, there is illustrated a diagrammatic view of an overall template for creating a query. This template provides the ability to map any particular classification and sub classification with any response. For example, illustrated in the template are four classifications, gender, nationality, ethnicity and political bias. Each of these may be selected as somehow associated with a particular query. The designer of the query will then be provided with the ability of providing any number of response buttons in their queries. Each of these response buttons just needs to be mapped to a particular sub classification ID, SCID, in order to give it meaning. Thus, the gender has a CID, to which the particular query is mapped for a particular query. This will be CID gender D. There may be, as noted hereinabove, nine sub classifications. Each of the response buttons can be mapped to one of the sub classifications. It is illustrated that the response R1 ID is associated with the RID to the particular map button, for example, the "A" button. This will be mapped to the particular unique QID+RID code for that combination of the particular QID for the query being designed and the RID associated with the "A" button. This will be generated as a particular object in the system or record for that unique ID. This would be mapped to a particular SCID. It is asserted to keep in mind that this particular SCID is a predefined SCID, such that it can be utilized to collect data from multiple queries. It is not associated with just this particular query only but the particular QID is associated with query and the particular mapping of the RID to a particular button for that query in the form of the unique ID, QID+RID. It is noted that the first RID, that associated with the R1 ID associated with the "A" button will exist for each of the particular classifications, i.e., for the nationality CID, the ethnicity CID and the political bias CID. Thus, what will happen is that, upon providing a response via the "A" button for that particular query, this particular UID will be mapped into each of the SCIDs to which that response button is mapped. By looking at the QID table, the total number of UIDs responding thereto will be known. By looking at an SCID table, all of the responses over all queries will be known. With respect to gender, for example, if there were nine different bins associated with nine different SCIDs, a bell curve could be generated from all of the data that is received for the multiple queries indicating the general gender makeup of the crowd. This is all derived from just simple responses received from multiple MUs 110 transmitting a minimal amount of data responses for a query to a server.

Referring back again to FIG. 11B, there are provided 40 fixed characters that will always be provided on the screen. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. A further refinement of the response can be provided by mapping a particular response to certain statistical records. Each of the responses may have statistical information associated therewith. In this way, each response may have an SCID associated with that particular response in the given time window. Again, the "A" response may have associated with it the gender SCID corresponding to a 0.6/0.4 Male/Female percentage classification. This SCID association with the response may only last for the duration of a particular live event, and may only be relevant to that live event. So, at a live event on a different date, any SCIDs associated with the responses may be newly formed at that particular live event and are thus unique to that particular live event. However, it will be understood that statistical information may be carried over from other live events if the desired statistical data warranted such.

It may also be that the statistical data associated with responses can be shared across a series of concurrent live events. For instance, the SCID corresponding to a 0.6/0.4 Male/Female percentage classification in association with the "A" response may be shared across four different live events taking place on the same night and around the same time. In this embodiment, it may be that the four events all ask a particular question at the same time based on a pre-defined time window for the question. This question asked at all four of the events may also have the "A" response as having the same SCID associated with it so that the different audiences can be evaluated using the same statistical associations. This may be useful when polling audiences at different types of events. If an "A" response is expected to be answered 60% by males, it can be measured against differing audiences in order to determine if that assumption holds true, taking some variation into account. For instance, if the question is asked at a sporting event and 58% of the responses are from males, but when asked at a concert the "A" response is chosen by a population of only 35% males, this provides useful information for particular types of venues.

The visual cue 108 may provide for any arrangement of any of the 40 characters. In some embodiments, the characters used might be in a logical order ("1-2-3", "A-B-C", etc.), or they might be arranged in a random, or seemingly random, order. In some embodiments, the responses displayed on the visual cue 108 may only be used once at a particular live event. For instance, at a live event, if the particular questions asked have used all characters from 1-10 and A-J, it may start using color or symbols exclusively, as 1-10 and A-J have already been used earlier in the event. This allows for certain statistical data to be associated only with particular response characters. However, in other embodiments, a particular question may require certain characters for that question, and thus those characters would always appear with that question.

As provided herein, the 40 fixed characters on the mobile unit screen allows for users of the mobile unit to simply press or tap the particular character that is associated with their desired response. Doing so will cause the response to be transmitted to the local central office 120, along with the timestamp and other information to be transmitted. This thus allows for a one-click user experience. In some embodiments, from the user's perspective, users will only see the characters presented. No text or other information pertaining to the query being displayed on the display cue 108 would be displayed on the mobile units. Thus, each of the mobile units acts as a response system only, encompassing only that aspect of the system. The mobile unit response system would not perform any other function besides accepting a user's response and transmitting that response to the local central office 120.

Figure 22:
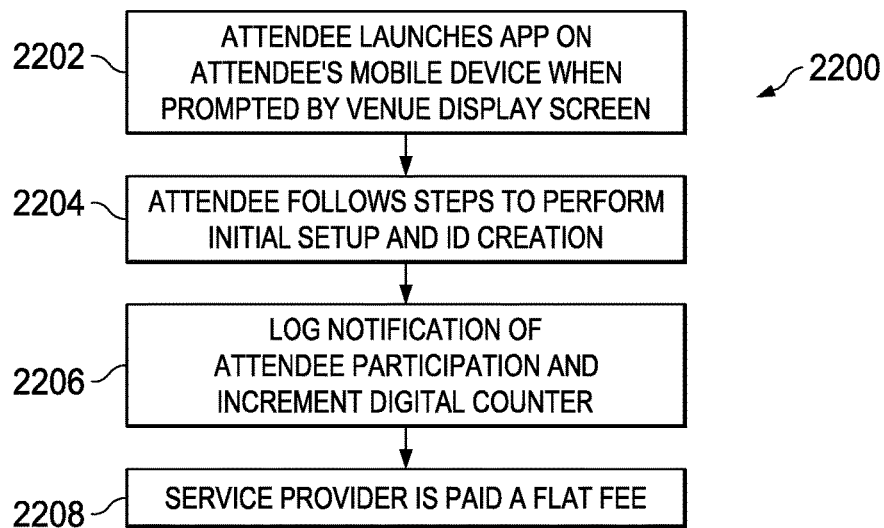
FIG. 22 illustrates a flowchart for a process of tracking attendee participation.

Referring now to FIG. 22, there is illustrated a flowchart of one embodiment of a process for tracking attendee participation at a live event 2200. The process begins at step 2202 when an attendee or user passes through the gate or launches the application on the attendee's mobile unit. The application may be a standalone application, or part of another application's functionality. If part of another application's functionality, such as an official Major League Baseball app, there may be an extra section or tab of the application that the attendee may select to begin using the functionality provided for by the present invention. At step 2204, the attendee follows steps to perform the initial setup and ID creation process as provided herein. This may occur when a user answers an initial query, in addition to providing the user's seat number. This provides for an indication that the attendee is ready and willing to participate in the polling, games, or other activities provided at the venue 102.

At step 2206, upon completion of the initial setup and ID creation process at step 2204, the participation of the attendee is logged. To keep track of the number of attendee's that have chosen to participate, a digital counter may be incremented as well to indicate that another attendee has used the application to participate. In some embodiments, a log might not be kept and only a digital counter used, or in other embodiments only a log would be kept, as desired by the parties involved. The log and/or counter may be saved either permanently or only initially by the local central office 120, and the data would be later transferred to the central remote office 126. This provides a unique advantage over more traditional polling, statistics, or advertising systems because the present invention allows for a verified viewer. In traditional methods, such as an ad banner or ad video at a live event, for example, it is unknown how many people paid attention to the ad. The present invention allows for an exact number of verified viewers or participators to be tracked.

Upon completion of the initial setup and ID creation process and step 2206, at step 2208, a service provider is paid a flat fee for the use of the service. The service provider may be the owner of the central remote office 126, the developer of the application, either developing the standalone app or developing the functionality for the official partner app, or any combination thereof. The service provider would receive the flat fee as compensation for providing the services described herein to the venue 102. The flat fee may be for any value. In some embodiments, the fee may be a low value, such as $5.00, which may be low enough to attract live event venue customers or live entertainment organizations to use the service, while allowing for the revenue stream for the service provider to be substantial if there is high attendee participation. The flat fee would be charged to the live event venue or live entertainment organization for each attendee at a live event that completes step 2204. Preferably, the flat fee would only be paid once per live event per attendee that completes step 2204. This means that the fee would not be paid again when an attendee who has already completed step 2204 participates again during the same live event by answering other polls, participates in games, or other activities. However, other embodiments may allow for a fee to be charged each time an attendee participates at a live event. For example, if 20 polling questions are asked at a live event, the flat fee would be charged for the same attendee 20 times if that attendee participates in every question.

Figure 23:
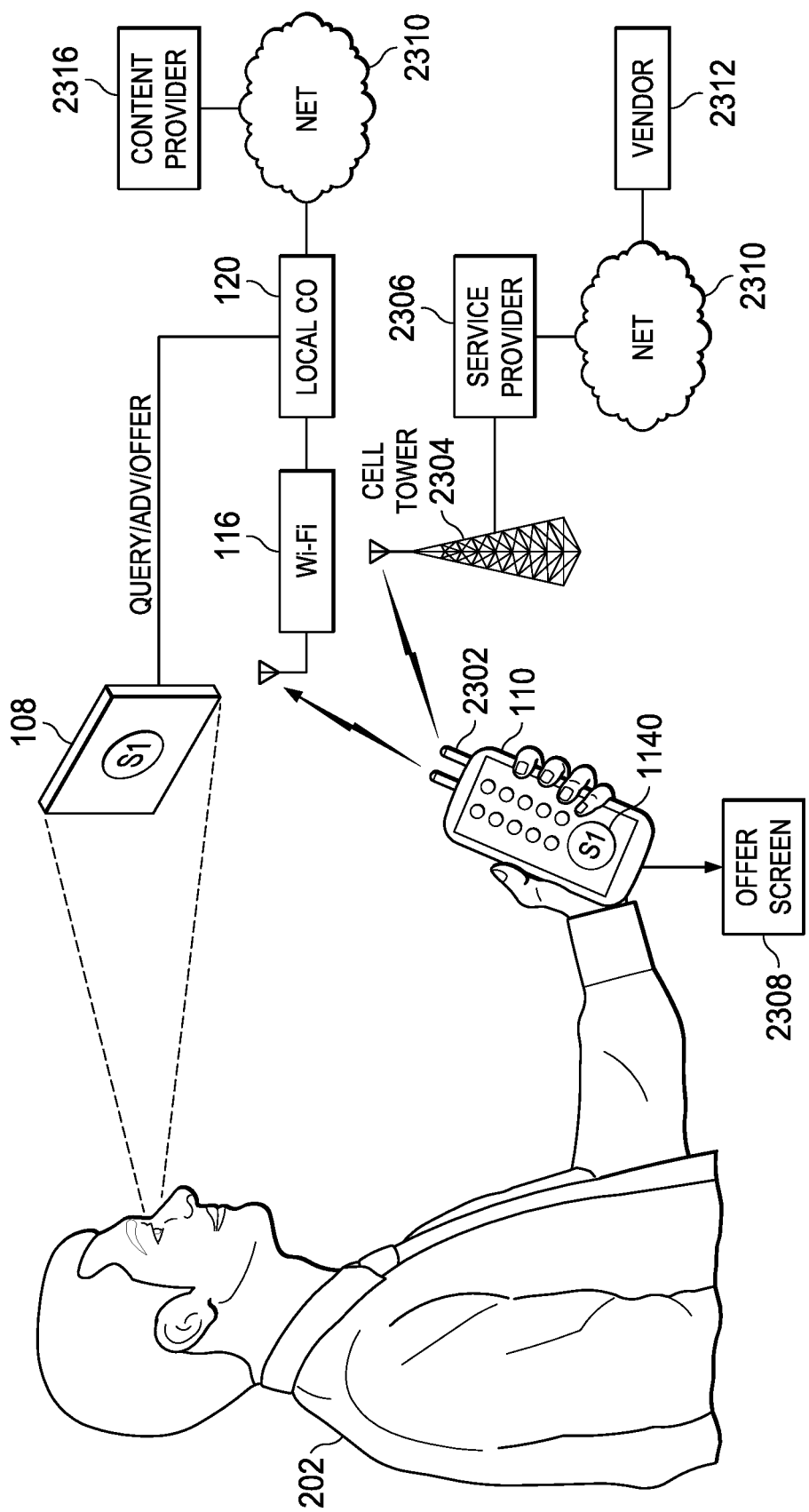
FIG. 23 illustrate a diagrammatic view of an alternate embodiment for offering merchandise for sale.

Referring now to FIG. 23, there is illustrated a diagrammatic view of an operation of the current system for facilitating the purchase of merchandise from outside vendors outside of the overall polling/statistical collection system disclosed hereinabove. As noted hereinabove, the Mobile Unit 110 can be any type of device for facilitating communication with the hotspot 116 or wireless interface 116. However, in most cases, the MU 110 is a smart phone that is registered with a provider that provides a data plan for that particular device. This utilizes a separate radio on a separate antenna 2302 for interfacing with a cell tower 2304 or any other type of data interface. This cell tower is interfaced with a service provider 2306, with which the individual 202 and the device 110 is a registered. Thus, the service provider 2306 will have, due to the fact that the MU 110 is registered with the service provider 2306, information regarding payment option such as credit card and address information with respect to the actual individual 202, in addition to other information about the individual 202. As noted hereinabove, the local CO 120 has no information regarding the MU 110 other than what is provided via inputting the ticket information and running the application. No information is provided with respect to unique information about the particular MU 110 and none is necessary.

In this particular embodiment, the screen 108 displays information to the individual 202 which, for polling operation, elicits some type of response from the individual 202 via the MU 110. In this embodiment, however, what is displayed to the individual 202 for viewing is an offer for merchandise from an outside vendor, the definition of outside vendor meaning a vendor or a party that is outside of current system, i.e., it is not associated with the local CO 120. The vendor could be a merchant that sold goods online or actually be a merchant that was within the confines of the local event within the venue 102. The user is prompted to use one of selection buttons 1140-1144, of which selection buttons 1140 is illustrated in FIG. 23 on the device screen of MU 110. The advertisement might state "the following goods offered for sale at a significant discount of X %—want to take advantage of this offer, please select S1 within the next 10 minutes on your FEVR application." The user or individual 202 would then have 10 minutes, in this example, within which to make the selection. The selection merely requires them to press the button 1140. What would that happen is that a second screen 2308 would be presented on the MU 110 to the individual 202 to complete the transaction external of the local CO 120 and any collection of data or statistics. Everything after this point is unknown to the local CO 120 and whoever controls such.

With this offer screen 2308, the data link is routed through to the service provider and then to the Internet 2310 to provide a link to a vendor 2312. However, the entire offer could be facilitated internal to the MU 110. The primary issue is that information is required to be input to the offer screen 2308 in order to provide information, if needed. It could be that only a single items is being offered with no requirement to input a size or color, etc. In this case, all that is necessary is to push the button 1140 and the transaction is completed with the vendor 2312. However, if additional information is required, the offer screen 2208 allows the individual 202 to interface with the vendor 2312 in order to provide such information. What then occurs is that service provider interfaces with the vendor 2312 in accordance with a prearranged transactional agreement to actually bill the individual 202 through their contractual relationship. This can be facilitated due to the fact that the service provider 2306 has all the information necessary to just provide this payment on the individual's monthly statement.

Although the local CO 120 could provide this query/advertisement/offer from the local database, it also could be retrieved from a content provider 2316 via the Internet 2310 when needed. This allows the content provider 2316, in one example, to actually live stream the advertisement. The main point is that the advertisement is, 1) presented to the individual 202 with predetermined selection button associated there with and, 2) that a time window is provided.

Figure 24:
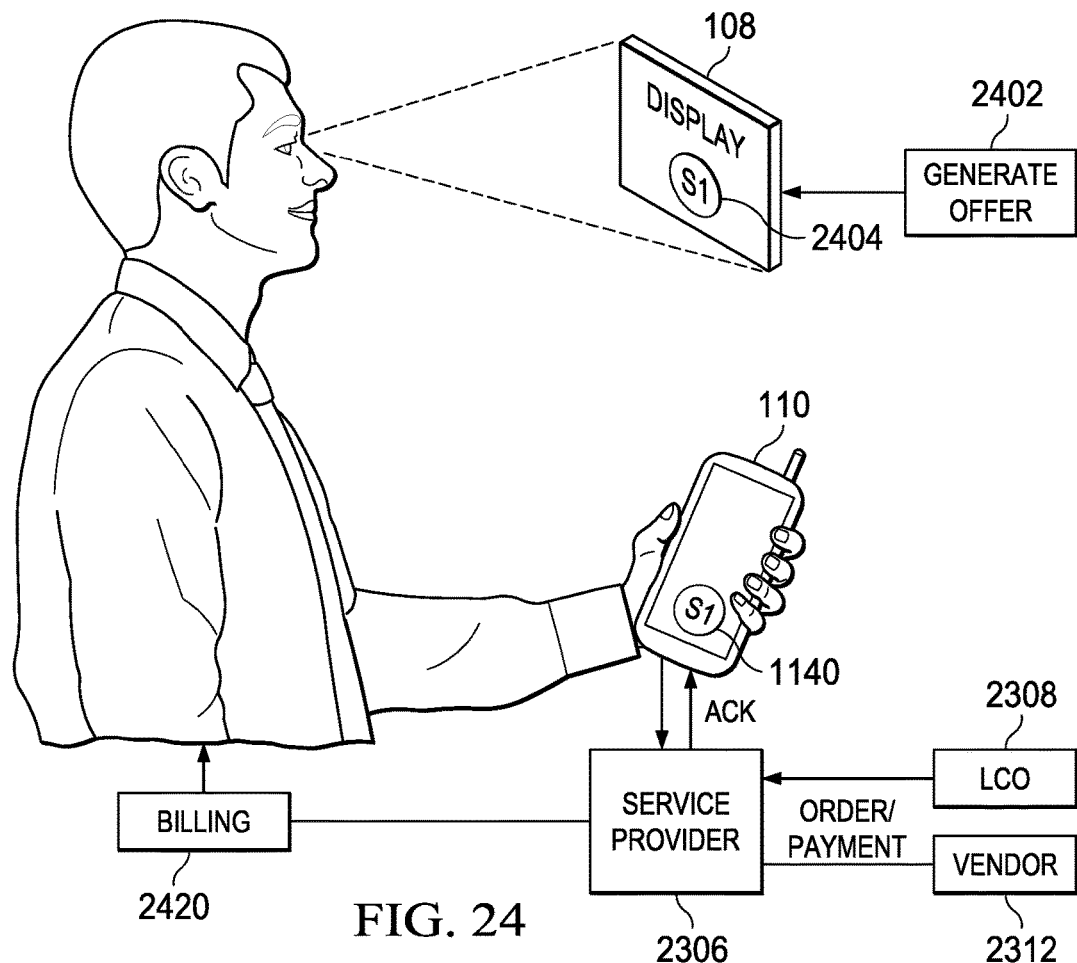
FIG. 24 illustrates a diagrammatic view of the overall system for facilitating the embodiment of FIG. 23.

Referring now to FIG. 24, there is illustrated by diagrammatic view of the overall system flow for facilitating the presentation of the offer and the completion of the transaction, including the billing. A block 2402 represents the generation of the offer which is sent to the display 108 with a selection field 2404 displayed that their one. The MU 110 displays the advertising addition to the selection buttons 1140, in this example, which is then, in accordance with the above noted description, sent to provider 2306. All that is really necessary to send to the provider is, at the minimum, the selection button in addition to some type of location information. With this information, it is possible to allow the service provider or even the vendor to determine which promotional advertisement is associated with and also with you venue 102 it is associated with. To facilitate this, some kind of location information is provided via a block 2408. Since there is no two-way communication with the local CO 120, the information that the MU 110 has is GPS information, SSID information of the wireless hotspots, and a ticket number. The ticket number, if it is in the form of a seat number, section number, and room number, may not be unique to any particular system, as multiple venues might share the same seat number. However, it may be that there is a unique ticket number that is unique across all venues, and this may actually define the location. If not, then GPS information could be provided to define the location of the MU 110 at the time of the generated response. This provides the actual physical location of the MU 110, and this just needs to be correlated with a known physical location of a particular venue. Thus, this promotional advertisement or offer might be displayed at multiple venues throughout the country. For example, on any given weekend, there may be multiple football games sponsored by the NFL®, and the promotional offer or advertisement, since it may only be presented during timeouts, halftime events, etc., would not be synchronized across multiple games and multiple channels. In this event, the vendor would have to know the physical location of the event in order to determine which venue this was associated with in order to verify information. Additionally, a particular vendor or program operating outside of the local CO 120 would have to be aware of the time in which it was presented. Thus, the local CO 120 would have to inform the vendor of the time in which the promotional advertisement was actually displayed, and this could be coordinated with the generation of this response via the button 1140.

Thus, the service provider 2306 would receive both the information recording the response that was sent, i.e., an indication that the button 51 was pressed, the location information, and also the time information in the form of a timestamp. This information is then routed to the vendor 2312. The vendor 2312 has a contractual relationship with the service provider 2306 in order to allow the service provider 2206 to bill the individual 202 through the contractual relationship it has therewith. This is represented by a block 2420.

Figure 25:
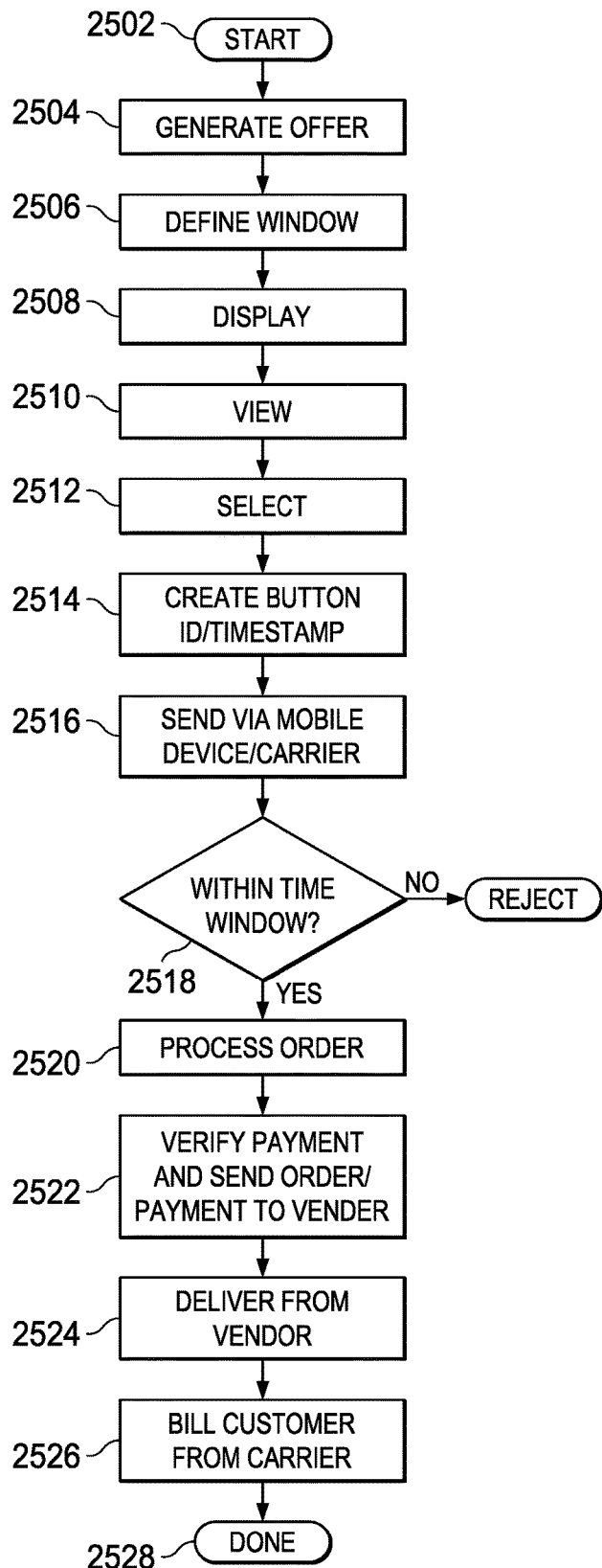
FIG. 25 illustrates a flowchart for the overall operation of the system of FIG. 23.

Referring now to FIG. 25, there is illustrated a flowchart for the overall operation of the merchandising feature area. This is initiated at a block 2502 and then proceeds to a block 2504 or in order to generate the offer. This requires the definition of a time window, as indicated by block 2506. This is then displayed, as indicated by a block 2508, with the appropriate response button that must be selected in order to take advantage of this particular promotional offer. The program then flows to block 2510 wherein the individual 202 views the offer, and a selection is made, as indicated by block 2512. At this point, a button ID with a timestamp is created, this button ID not being for the purpose of the polling or statistical operation of the local CO 120. It is merely provided in order to encode within the button ID the information about the button unique to the application, i.e., in this case it would encode the underlying code for the button 1140. This is then combined with a timestamp and sent via the overriding offer application, which is associated with the screen 2308, to the provider 2306 in order to interface with the vendor 2312 or to just send the information to vendor 2312. This is indicated at a block 2514. The program then flows to block 2516, wherein this is sent via the MU 110 to the carrier and then to the 2312. At this time, a determination must be made as to whether a timestamp associated there with, in addition to location information, indicates that the selection was made within the time window, this indicated by decision block 2518. If not, this is rejected. If so, then the overall order is processed, as indicated by a function block 2520. This process includes verifying payment and then sending order/payment to the vendor, as indicated by block 2522. The vendor will then deliver the product as indicated by block 2524, and the customer is billed by the provider, as indicated by block 2526. The program then proceeds to a Done block 2528.

Figure 26:
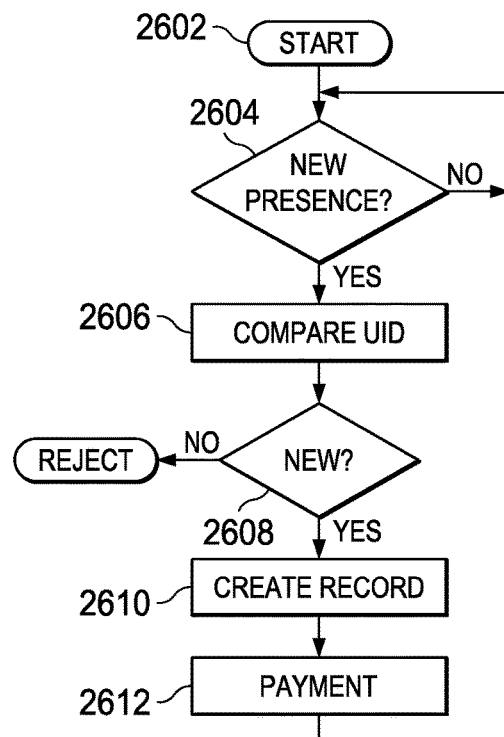
FIG. 26 illustrates a flowchart for ensuring that only a single seat is associated with a unique ID.

Referring now to FIG. 26, there is illustrated a flowchart depicting the operation of ensuring that only a single UID is associated with a single seat. The reason for this is that, from an integrity standpoint, an advertiser wants to have statistics that cannot be manipulated. One issue might be that another entity could manipulate the statistics by entering other UIDs into the system due to the fact that the timestamp makes it more unique. By requiring each UID to have a unique seat number, the situation wherein a second application has the wrong seat number entered therein will result in a rejection. Even if first UID assigned to that seat number is incorrect, UID will be rejected when the individual 202 with the correct ticket numbers tries to enter in their seat number. Since it had already been incorrectly entered and a UID registered with that seat number, the new one will be rejected. This will be an error, but it will be tolerated. The important thing is that an advertiser or somebody interested in statistics about the crowd can be ensured that, for a venue having associated therewith 10,000 tickets, there will be no more than 10,000 UIDs generated. Even if only 8000 attendees registered their UIDs, the advertiser can be assured that these are in fact associated with the "eyes" that they desire to be directed at their particular advertisements, etc.

The program is initiated at a block 2602 and then proceeds to decision block 2604 to determine if there is a new presence, i.e., a new MU 110 is entered at the event boundaries, and a ticket has been utilized in order to enter the unique information from the ticket and create the UID. UID is sent to the system, the local CO 120 and compared to the already existing UIDs, as indicated by block 2606. The program then flows to a decision block 2608 to determine if this newly received UID is unique to the system. If not, this indicates that it is a duplicate for some reason, and it is rejected. If so, the program flows to a function block 2610 New Record, as described hereinabove and then to a block 2612 in order to register payment, as described hereinabove.

Figure 27:
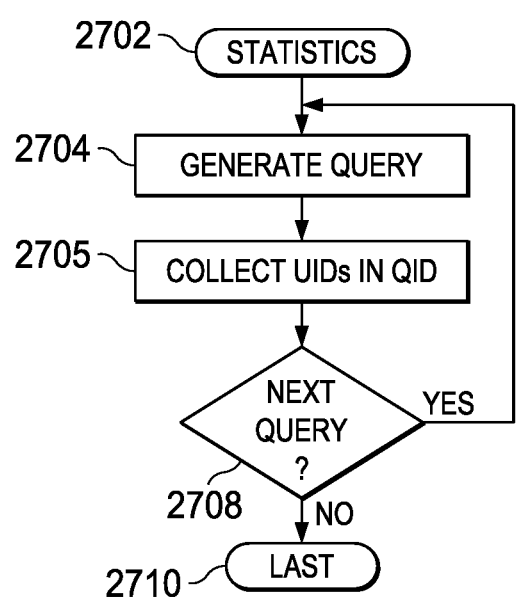
FIG. 27 illustrates a flowchart for analyzing and collecting statistics via the crowd-based response input.

FIG. 27 illustrates a flowchart depicting the overall operation of collecting statistics via all of the responses received in the crowd-based response system, which is initiated at a block 2702. The program then flows to a function block 2704 in order to generate the query. As noted hereinabove, the query is actually designed such that it has embedded therein statistical information that can be derived from a particular response. For example, press "1" for female and "2" for male. This particular key, i.e., that for the "1," is for that query during that time and is statistically related to the gender female. Of course, studies of individuals responding to that question may indicate that the 80% will actually be female. Thus, a statistical certainty of 80% can be associated with that particular "1" button for that particular query during that particular time window. That will accordingly be mapped to an SCID for that particular statistical certainty of female. It may be at another query was designed such that the button "C" was mapped to that SCID and, for that query in that time window, the button "C" is associated with the statistical certainty of 80% female. After generation of the query, the various UIDs responding thereto, as indicated by a block 2705, will be collected and the various data records updated. As noted hereinabove, a particular response can be associated with multiple SCIDs for a given button.

After all of the UIDs are collected and mapped to QIDs, CIDs, and SCIDs, the program flows to a decision block 2708 in order to determine if another query is in the queue. If so, the program backs around to the input of the block 2708, and, if not, the program flows to a block 2710 indicating that this is a last query.

Figure 28:
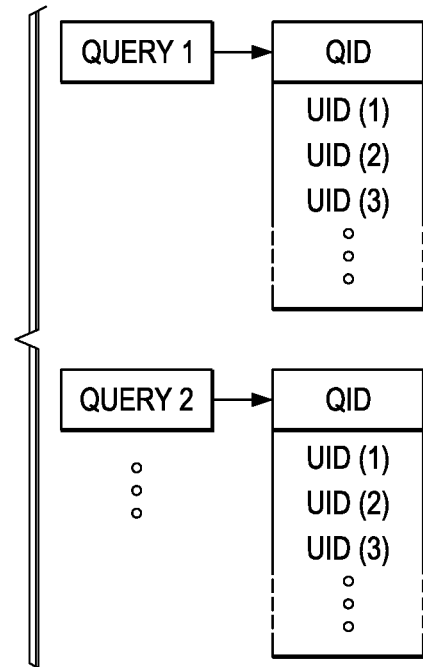
FIG. 28 illustrates a diagrammatic view of the relationship between the query and the UID.

Referring now to FIG. 28, there is illustrated a diagrammatic view of how a query is mapped to a QID, for example. When the query is output, as noted hereinabove, a time window is defined which is uniquely associated with that query. The response is resolved down to the UID, the timestamp and the RID. In the QID, all of the UIDs responding will be collected. Thus, all that is necessary is to look at the QID, which is unique as to a time window. For example, if there were two queries that were basically identical, and they were generated at different times, they would actually have a different QID, as each is unique with respect to its time window. It may be that a particular individual associated with an MU 110 presses the button more than once. This would provide the same UID in the particular QID record more than once. During the analysis, this can be discriminated. If it was desirable to see how many unique UIDs responded to a particular query to see how many people's "eyes on the screen" there were, then all that would be necessary was to determine the number of unique UIDs that responded. If, on the other hand, it was desirable to see how many times a response was provided to a particular query, the QID for that query be analyzed for the total responses including multiple responses from associated UID. This is illustrated in FIG. 23 in the form of two different queries associated with two different QIDs.

Figure 29:
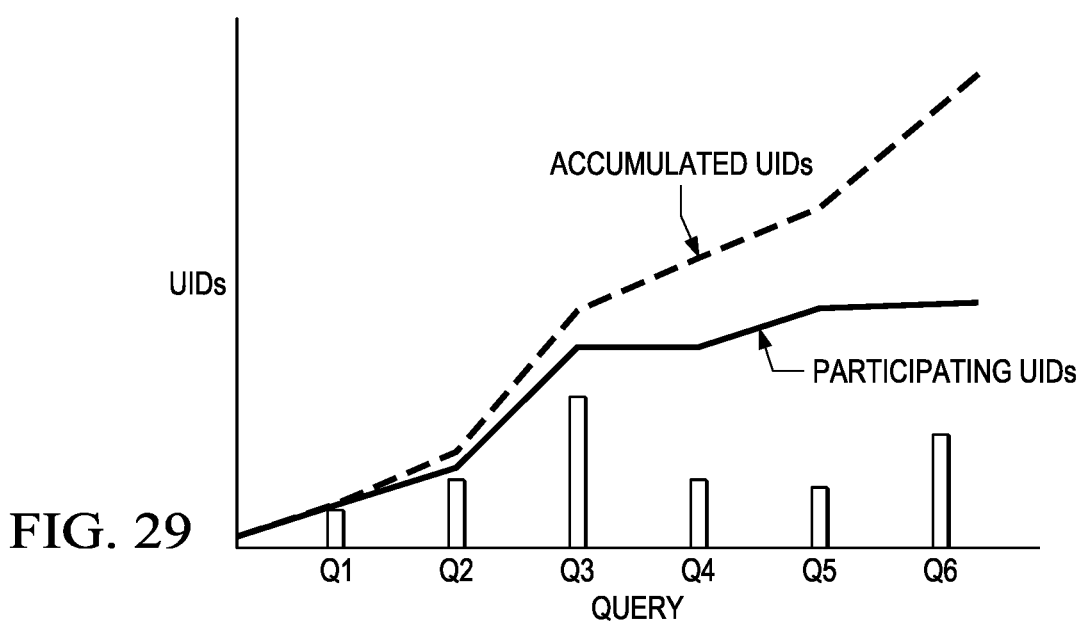
FIG. 29 illustrates the overall response that can be collected of that particular query.

Referring now to FIG. 29, there is illustrated a diagrammatic view of an example of an analysis with respect to these queries that are presented in each query. They can be seen from this graph that initially, the first query had a low number of responses and, as the event wore on, certain queries have higher level of responses as opposed to other queries. These are total responses to a particular given query. The first bar chart illustrates the total number of responses for a given query. An additional analysis can accumulate the total number of responses by accumulating UIDs over the time of the event. Additionally, an analysis can be performed to determine the actual participating UIDs. It may be that certain MUs 110 participate in the response-based operation more than others. There could be, for example, 30,000 attendees, of which 10,000 are registered with an associated UID. By knowing the number of total registered MUs 110, a determination can be made as to what percentage at any given time is actually participating, and also an analysis can be made as to the distribution of participation by the registered users. There may be a certain portion that responds to every query, a certain portion that only responds to 50% of queries, a certain portion that responds only 25%, and a portion that never responds. This can be important information for an advertiser/promoter. Additionally, since the seat number is known from the UID itself, as this is embedded information therein, it is possible for the system to actually map responses to certain areas of the live event. For example, suppose that the event were a baseball game. It is well-known that seats behind home plate are the most expensive seats, and the bleachers are the least expensive seats. It may be that certain queries are responded to more heavily by attendees in the bleacher seats as opposed to those in the behind home plate seats. A statistical certainty may actually be placed upon a particular seat with respect to income, for example. Thus, if it is determined that at certain times during the event that more responses are being received from UIDs associated with behind home plate seats, it is possible to actually tailor the queries during those times for those particular attendees. The analysis can be performed real-time to actually change the subject matter of the queries that are presented.

Figure 30:
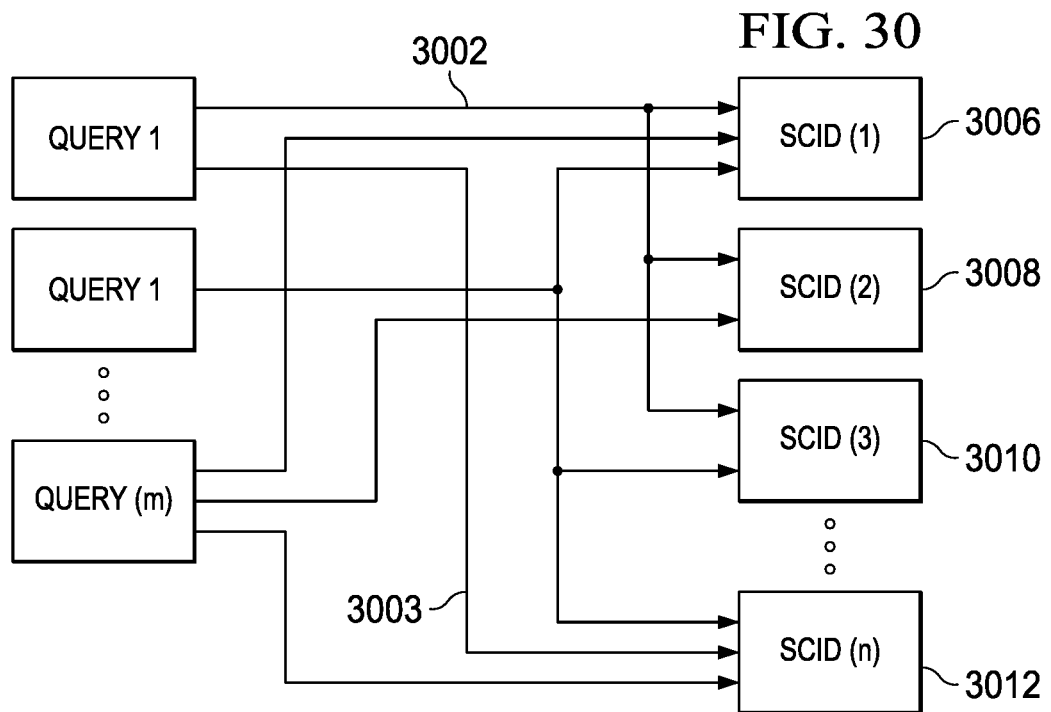
FIG. 30 illustrates a diagrammatic view of the mapping of queries to SCIDs.

Referring now to FIG. 30, there is illustrated a simplified diagram of the mapping of a query to an SCID. Each query, the QID and the CID, can be mapped to a particular SCID. This is defined in the design of the particular query. The SCID is associated with a statistical certainty such that any choice can be associated with any SCID. As noted hereinabove, a query is defined with anywhere from one to multiple choices, each choice associated with a particular button. That button will be associated with one or more SCIDs. These, again, are predetermined statistical certainties that are defined in the context of the particular query. Illustrated are multiple queries. The first query, query 1, has two choices, a choice 3002 and a choice 3003, meaning that there are two buttons associated with that query to allow the user to make two choices. It is noted that a choice may also require the pressing of multiple buttons and not just a single button. Thus, the combination of buttons would constitute a choice. The first choice 3002 is associated with an SCID 3006, an SCID 3008 and an SCID 3010. Each of these SIDs 3006-3010 have a different statistical certainty associated with a different classification or CID, such as gender, political affiliation, ethnicity, etc. The second choice 3003 is associated with an SID 3012, this being a different statistical certainty for a different classification. There is provided a second query, query 2, that is illustrated as having a choice, a single choice, that will be associated with the SCID 3006, the SCID 3010 and the SCID 3012. A last query, query (m), has three separate choices, one associated with SCID 3006, one associated with SCID 3008, and one associated with SCID 3012. This association is, again, defined in the design and the generation of the query. By having some knowledge of the particular query in the context thereof, a designer of the query can determine statistical relationships between that question, the response elicited and the statistical certainty from that response. Again, the example of just selecting one of two choices, one for female and one for male, will be easy to design, as it will be provided an SCID for male and an SCID for female. If there were a query asking if you are an out-of-town visitor, that would be a statistical certainty for a nonresident. A query for information regarding "your country of origin" could provide five responses via five separate choice buttons for Europe, Asia, South America or Canada, and these four choices would provide a statistical certainty for four different SCIDs, each associated with one of those choices. In this query, for example, each button that is provided at that time for that query has a defined statistical relationship as a result of being associated with a particular SCID, that statistical relationship defined by the properties of that associated SCID.

Figure 31:
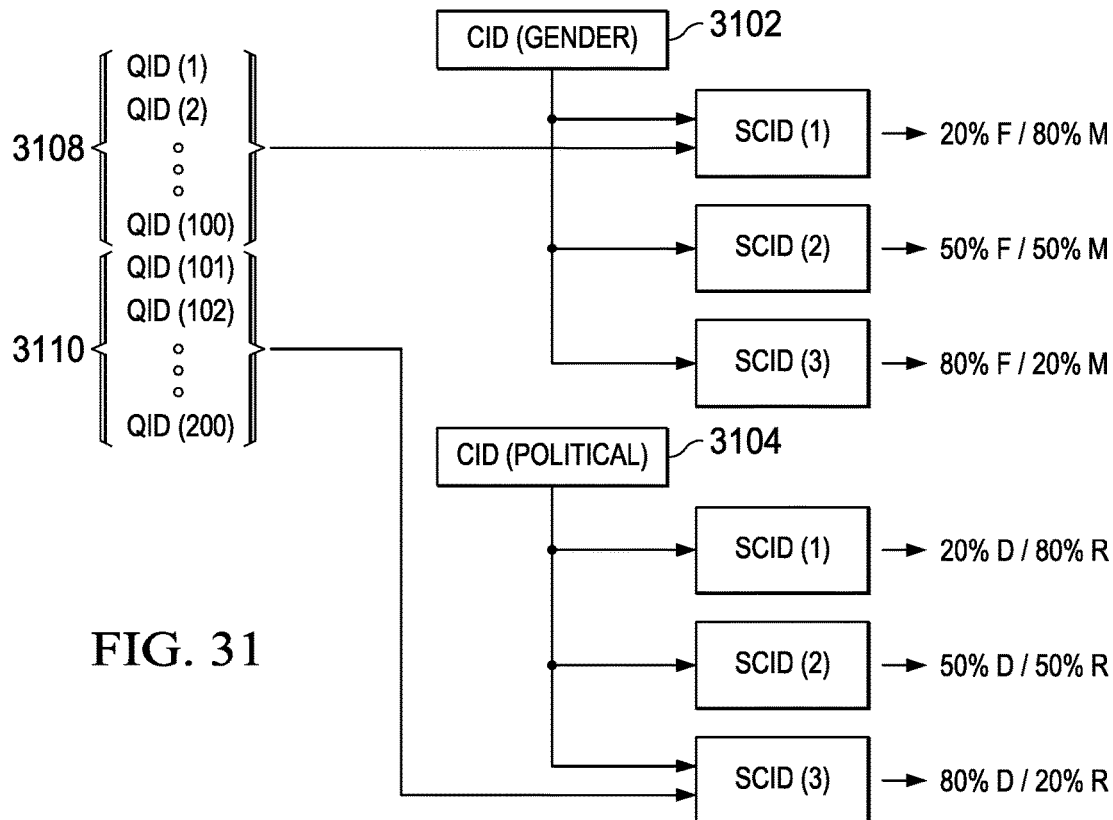
FIG. 31 illustrates a detailed example of a mapping of various QIDs to SCIDs.

Referring now to FIG. 31, there is illustrated a diagrammatic view of one example of the design of a collection of statistical data. In this example, there are provided two CIDs 3102 and 3104, the CID 3102 associated with gender, and the CID 3104 associated with political affiliation. There are associated with the CID 3102 three different SCIDs, one for a ratio of 20% female/80% male, one for 50% female/50% male, and one for a ratio 80% female and 20% female. The CID 3104 is associated with three SCIDs, one for 20% Democrat/80% Republican, 50% Democrat/50% Republican, and 80% Democrat/20% Republican. The designer can define for a particular query which statistical relationship is applicable and select the closest SCID that has embedded therein the statistical certainty. Thereafter, for any given query, each query or number of queries can be associated with that particular SCID. For example, there is a group 3108 of QIDs that are associated with the SCID having a ratio of 20% female/80% male. There is another group of QIDs 3110 having in Association with the SCID for 80% Democrat and 20% Republican. It may be that certain QID in group 3108 are also QID in group 3110. Just the mere response to the QID and, of course, the particular response button associated therewith, it being noted that there may only be a single response, will result in UID making that response being populated into the record for a particular SCID. When analyzing a particular SCID over multiple queries, a determination can be made as to how many unique UIDs responded thereto or the total number of responses. This of course must account for multiple taps and the such. This can be handled in the software response for any query such that not all responses from a single MU 110 are recorded-only a single recording of a response during a given time window will be recorded.

Figure 32:
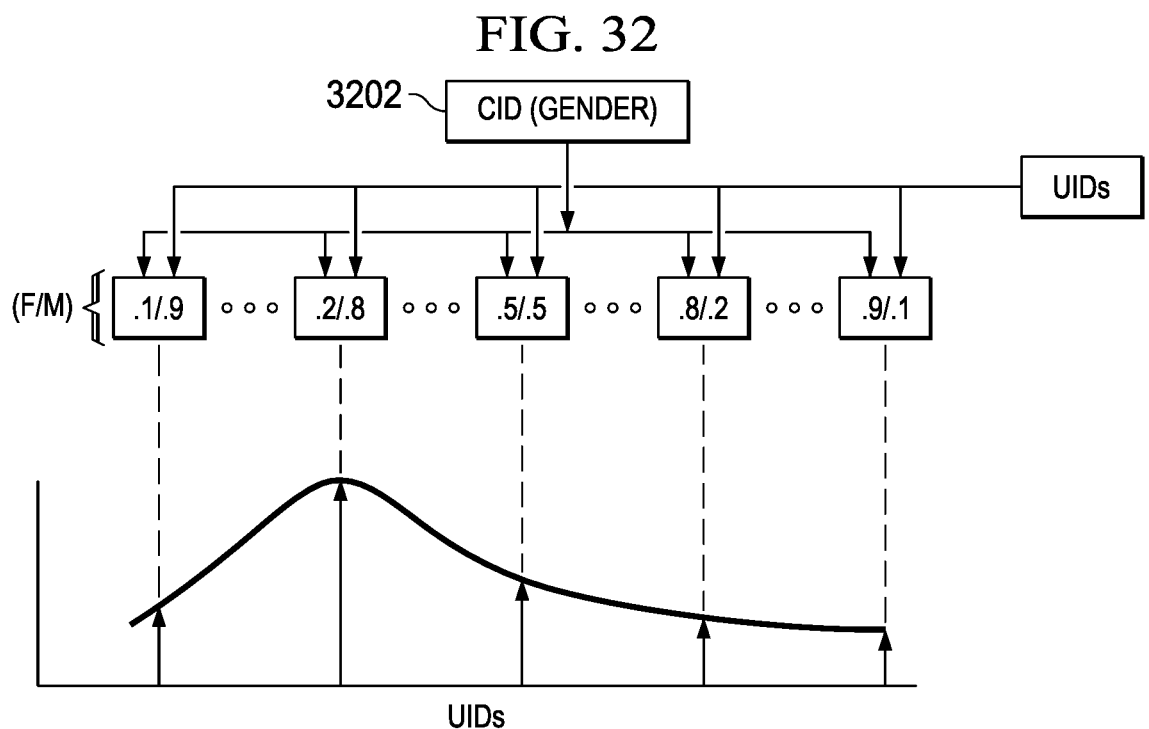
FIG. 32 illustrates a diagrammatic view of one particular statistical spread over multiple queries presented throughout an event at a live performance within a given venue.

Referring now to FIG. 32, there is illustrated a diagrammatic view of the analysis of one group of SCID associated with the gender CID 3202. There are provided eight SCIDs associated with the gender CID 3202, ranging from 0.1/0.9 through 0.9/0.1 as a ratio of female/male. This is a binning process wherein UIDs responding thereto will be binned therein for all queries. Of course, each SCID is mapped to a particular QID such that any QID can be analyzed for the particular SCIDs that are associated therewith. In the chart, it is illustrated that a distribution of binned UIDs are illustrated, it being noted that there are more females than males in the overall responders. This graph does not show or illustrate the number of queries that were responded to; rather, it illustrates the binning operation of the actual responses that, through the design of the queries.

Figure 33:
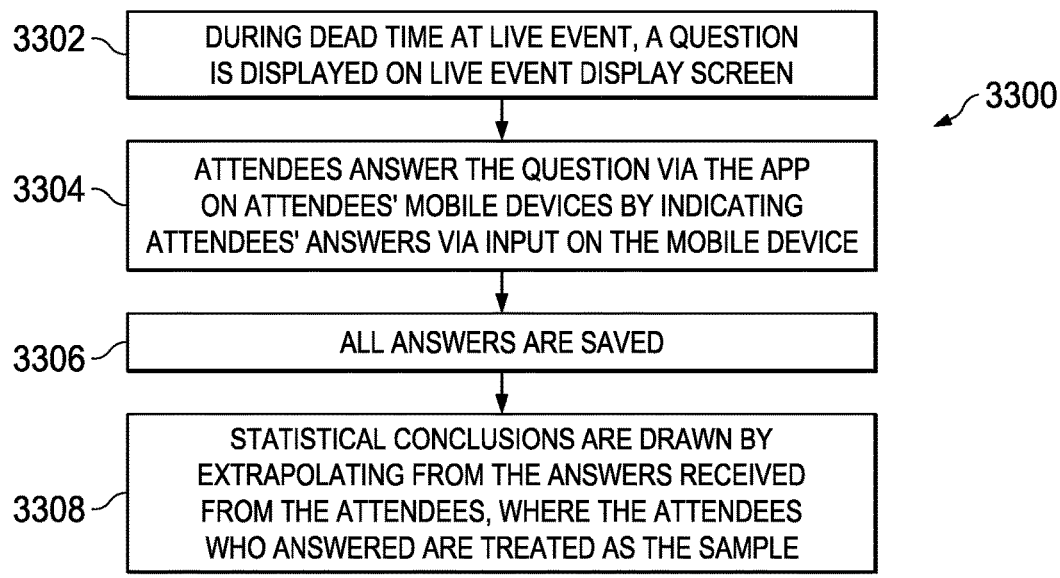
FIG. 33 illustrates a flowchart depicting one embodiment of a process for extrapolating from statistical data gathered from mobile devices at a live event.

Referring now to FIG. 33, there is illustrated a flowchart depicting one embodiment of a process for extrapolating from statistical data gathered from mobile devices at a live event 3300. The process begins at step 3302 where, during dead time at the live event, a polling question is displayed on a venue display screen. The displayed question may be on a large variety of topics, such as consumer preferences and political questions. For instance, a question may ask "what type of car do you drive?", with options listed for "compact car," "full-size car," "truck," "SUV," and "other." The user would select their answer by pressing a button on the screen of the mobile device that corresponds to the option presented on the venue display screen 108. On the other hand, a question such as "are you in favor of gun control?" with the options "yes," "no," and "undecided" presented. It will be appreciated that statistical data may also be gathered from activities other than polling questions.

Similarly, questions to assess merchantability may also be presented on the venue display screen. Merchantability for the purposes of the present invention includes gauging whether consumers would buy or endorse a particular product. For example, a question may be presented that asks "would you buy Pepsi or Coke?" or "would you buy a Chevy?". The question may be accompanied by other media, such as showing an ad for Pepsi following by an ad for Coca Cola, and then displaying the question. In another example, a live concert event may ask the audience, after the first two bands have played and while the headlining act is setting up, which of the first two opening bands the audience prefers, or for which of the two bands the audience would buy a record. Similarly, this may be done by playing music videos of bands unrelated to those playing at the concert, followed by a question regarding whether the audience would by an album for the bands, and for which one. In yet another example, a band at a concert may ask the audience to listen to a few melody selections, which the band would play live for the audience, and then present the audience with a question regarding which of the melodies most resonates with the audience. This would provide useful data for the band or record label in determining what types of melodies the general audience is most attracted to, and then base future songs on that preference. It will be understood that these are just a few examples, and the same concepts could be applied to all live events and within all industries.

At step 3306, all answers from attendees who participated in step 3304 is saved, either to the local central office 120 or the central remote office 126. At step 3308, statistical conclusions are drawn by extrapolating from the answers received from the attendees. The attendees are essentially serving as the sample for the statistical analysis. However, unlike most studies or focus groups, where you have a small sample size and extrapolation is performed based on that small sample, a live event such as a sports or music event can potentially have tens of thousands of people, or even more. Thus, this provides for more accurate conclusions to be drawn. Further, the data is collected from people who may already be interested in the subject-matter. For instance, an audience at a concert that is being asked for their preferences in music are exactly the type of people a record label wants to hear from; the people who pay to attend concerts. Ordinary focus groups often lack the core or target audience, and thus conclusions drawn from such data can lead to erroneous results. The results of the statistical conclusion may be displayed at the live event for entertainment purposes wherein people can measure their response against what the most popular response was, for example. The results may also only be viewed or analyzed by interested parties.

This process also allows for statistical conclusions to be based on the type of audience, or on a population generally, depending on the desired use of the data. For example, data collected from a live baseball game where the question "what type of car do you drive?" might be applied to baseball fans. So, if a majority of fans selected "truck" as their answer, a conclusion could be drawn that baseball fans are more likely to buy trucks than other types of vehicles. Similarly, if the same question is asked at an opera house, and a majority of the audience selected "full-size car," a conclusion could be drawn that opera fans are more likely to by full-size cars than other types of cars.

In addition, this process allows for attendees to measure themselves against other attendees in some embodiments. After an attendee has answered a question, the results may be compiled and re-displayed for the audience to view how their response measures against the audience as a whole. It will be appreciated that this has many applications. For instance, if a majority of the women in the audience answered a question a particular way, while a majority of the men in the same audience answered a question in a different way, this may be compiled and re-displayed for the audience. This allows for the audience to see how gender affected the results, and can measure their answer against the majority opinions. This creates an interest in answering the question, as there may be a natural curiosity to see how one's answer measures up to the results. The same method could be applied to merchantability questions, such as re-displaying the results of the question "would you buy Pepsi or Coke?" so that an audience member can see how his or her answer measures against the results. For instance, if someone chose the response option for "Coke," and the results are re-displayed to show that 90% of those who answered chose "Pepsi," the person who chose "Coke" can see that they are in the minority.

This system may also be extended to questions that elicit more emotional responses. These types of questions would relate to how people feel about a particular topic. For instance, the question might state "how do you feel about the government?" or "how do you feel about the neighborhood you live in?" with appropriate responses ranging from positive to negative to even fearful answers. The statistics regarding these answers would then be displayed to the users. This process may also be enveloped in a game. For instance, it might ask one section of the crowd to press one response key as fast as they can, while another section presses a different response key. The results would then be displayed, showing how the sections compared.

The displayed results may be in a variety of forms, bar graphs, pie charts, percentage, ratios, or any other visual representation of data.

Figure 34:
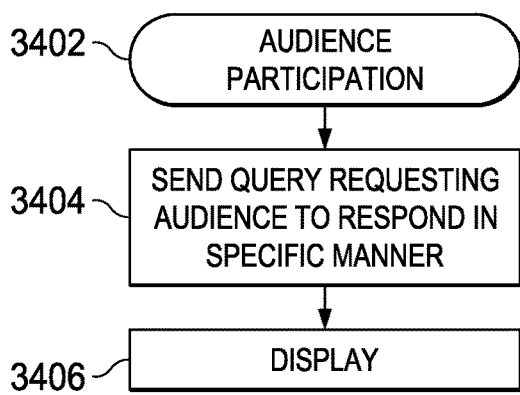
FIG. 34 illustrates an overall flowchart of the audience participation function.

Referring now to FIG. 34, there is illustrated a flowchart depicting the overall audience participation concept, which is initiated at a block 3402. Program then proceeds to a block 3404 to send the query or the prompt requesting audience participation in the form of a response in a specific manner. The program then flows to a function block 3406 to display the results. These results are real time results.

Figure 35:
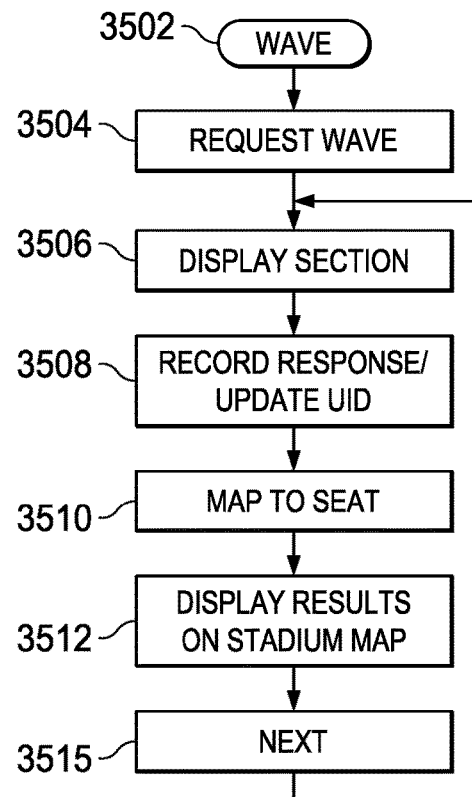
FIG. 35 illustrates a flowchart for the wave example of audience participation.

Referring now to FIG. 35, there is illustrated a flowchart for one example, that of the Wave. This is initiated at a block 3502 and then proceeds to a block 3504 to phrase the prompt or request on the display 108 as a request for the Wave. The program then flows to a function block 3506 to display a particular section. The program then flows to a block 3508 in order to record the response and update the UID. Since every response is in the form of the QID for that particular query, just by looking at a particular QID, the QIDs populating such can be determined. For this application, only a single "tap" of the key will be accepted. If, for some reason, an individual taps the key multiple times, this would actually be recorded in the QID during that appropriate time window as a valid input. This might be used for some statistical analysis, but for the purpose of this application, all that is necessary is to know how many UIDs have been recorded in that QID record. Each of these UIDs can then be mapped to seats, as indicated by a function block 3510. This is facilitated by the fact that these physical location is actually provided as a part of the UID. This can be utilized for such things as delivering prizes, for example, but in this situation, all that is required is to map the seat number onto the display. It may be that UIDs for other sections also responded, and these may or may not be displayed. The results displayed are illustrated in a function block 3512. The program then flows to block 3515 in order to select the next section and then back to the input of function block 3506. As each section is displayed, the results are then displayed in real time. Since this is real time, the time window can be very short period. Thus, after the time period has expired for particular section, no more UIDs for that section will be recorded. Thus, the time window is basically a "wide-open" time window that is only for the purpose of displaying results. When the section number is up there, the time window is open only for that section and those associated UIDs. Alternatively, all UIDs can be displayed that respond, and all that is necessary is to continually display a prompt that moved from section to section and then display the results of the MUs 110 that responded via their associated UID.

Figure 36:
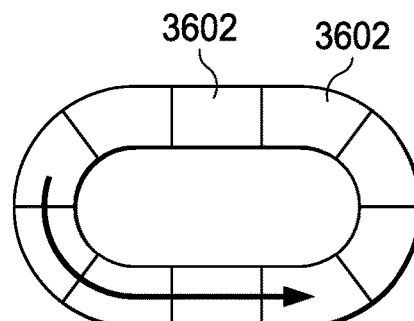
FIG. 36 illustrates a diagrammatic view of the display for the wave response.

Referring now to FIG. 36, there is illustrated a diagrammatic view of the overall display of the venue, illustrating a plurality of sections 3602. As the UIDs are collected, the particular section can either be completely eliminated or the shade associated with that particular section increases a function of the number of UIDs that respond. This allows the actual individuals to view the response and asked to participate more. Additionally, by analyzing the number of UIDs associated with that particular QID, it will provide to the analyst information regarding which sections have people that are actually more participatory than others, among other information.

Figure 37:
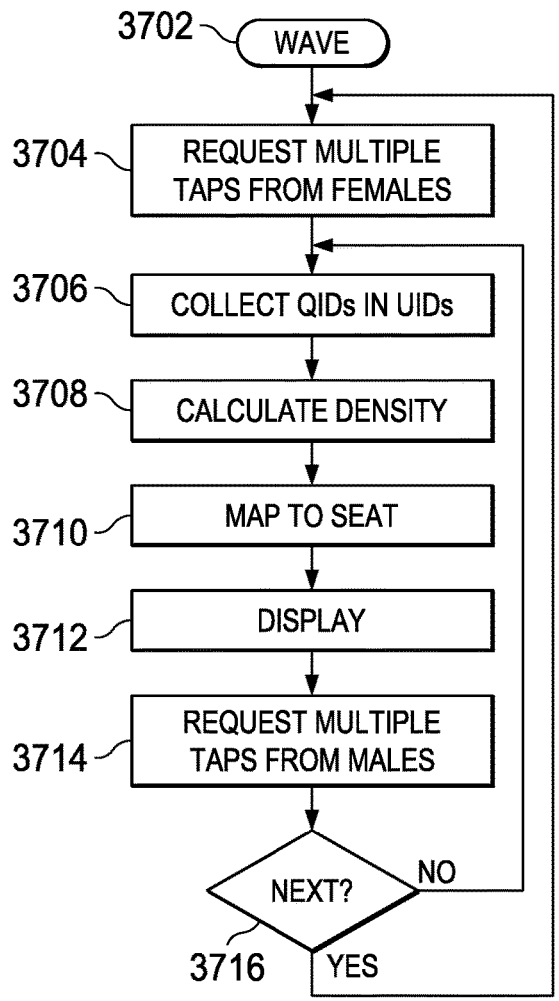
FIG. 37 illustrates a flowchart for the noise example of audience participation.

Referring now to FIG. 37, there is illustrated a flowchart for the "noise" interactive operation. This is initiated at a block 3702 and proceeds to a block 3704 in order to request multiple taps from females, in one example. The program then flows to a function block 3706 in order to collect in the QID for that query/prompt all of the UIDs responding thereto. This particular query might also have an SCID that is associated with gender. Suppose, for example, that the button that they requested to be pushed for this particular operation was the "A" button. At this point in time, that particular button is statistically linked to an SCID that has been predetermined to have a certain statistical relationship to the individual pressing a button being a female. As noted hereinabove, that is probably not 100%. It may be 90% due to the fact that certain people did not read the prompt correctly or they do not care. In any event, an SCID for 10% male/90% female could be associated with that particular button.

At this point, the overall density for the responses in total just looking at the QID can be determined, as indicated by a block 3708. The program then flows to a function block 3710 to map this to the seats in the venue 102 and then to a block 3712 to display the results. It could be that the more "taps" that a particular MU 110 is associated with, the higher the density for that particular seat will be. An average of the overall density in a particular region about all the seats can be determined or the actual seat itself can be made brighter, for example, due to the density of taps associated there with.

A new query is then generated requesting multiple taps from males, as indicated by block 3714. Again, this is a QID that is unique as opposed to the QID for requesting multiple taps from females. The program then flows to a decision block 3716 to determine if this is to go back around to collect the UIDs for this QID and, if so, the program flows to the block 3706 to collect UIDs for this particular QID associated with this particular query/prompt. This continues until it's finished and then, at the decision block 3716, it flips back over to the input of function block 3704 to request the multiple taps from the females in the associated query therefore. Each of these queries associated with that particular QID has a time window associated therewith, of course, as this makes a QID. Thus, for this purpose, a second QID could be generated each time a new query is generated, or the program could merely create the same QID with a different time window. However, for analysts, it will be desirable to have a separate QID for each time window such that, for example, if there were 10 requests for females to respond and 10 request for males to respond, there would actually be 20 QIDs created in the system. These would all be queued up for output at a particular time. Overall, this could actually be an automatic operation.

Figure 38:
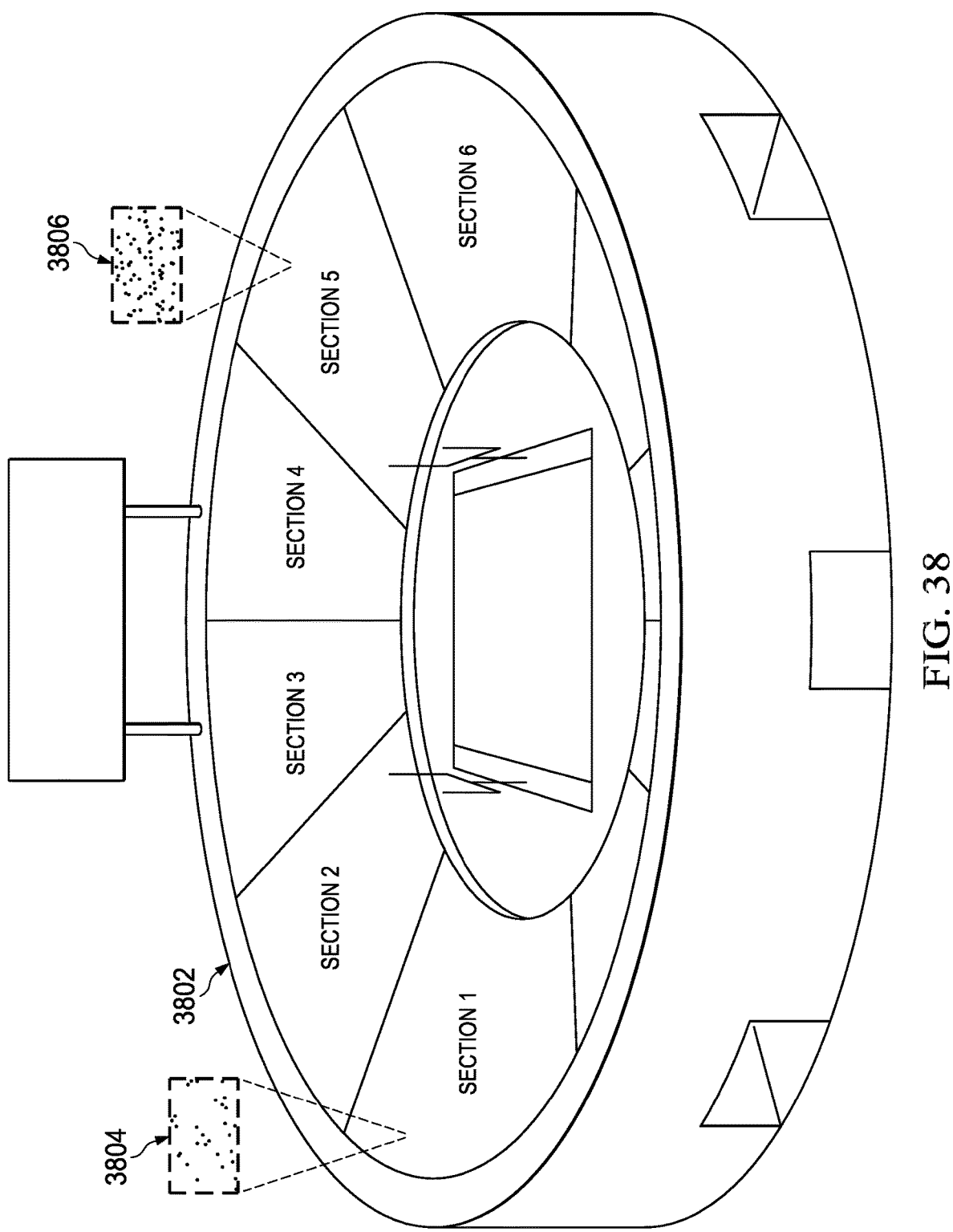
FIG. 38 illustrates a diagrammatic view of the display for the noise audience participation response.

Referring now to FIG. 38, there is illustrated a diagrammatic view of a venue display 3802 displaying various sections. There are illustrated in two detailed section views 3804 and 3806 two sections. In the sections, there are provided density distributions for the responses. As noted hereinabove, this could actually be a heavy shading. However, with knowledge of the UIDs and their seat location, any type of display operation can be provided.

Figure 39:
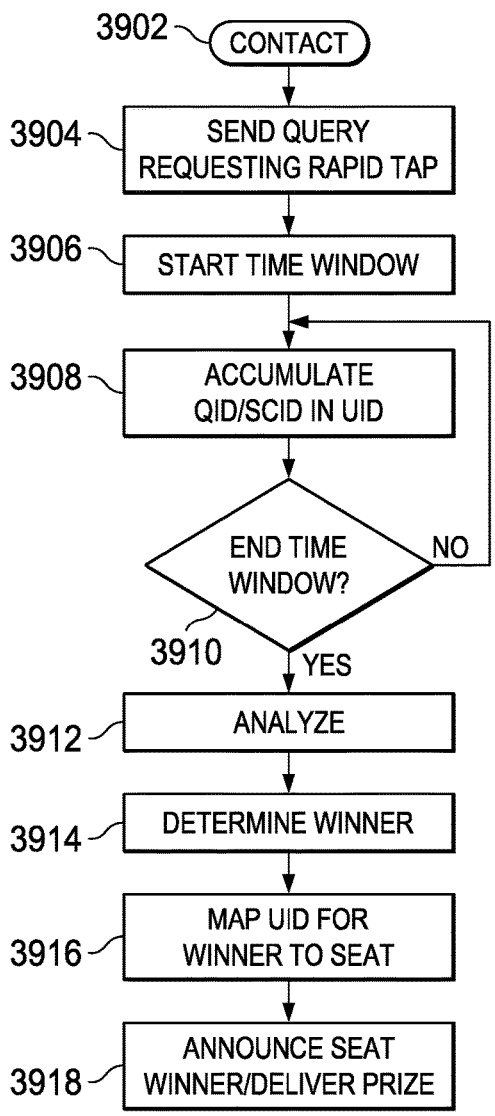
FIG. 39 illustrates a flowchart for the operation of running a contest.

Referring now to FIG. 39, there is illustrated a flowchart for a contest. This is initiated at a block 3902 and then proceeds to a block 3904 to generate and send a query requesting a rapid tap with some type of incentive for doing such. For example, the incentive could be that a promotional T-shirt will be given to the individual or individuals that could tap the fastest on their MU 110. Program then proceeds to a block 3906 in order to start a time window for the overall promotion and then to a function block 3908 to accumulate the various information in the QID and in the SCID, in addition to accumulating such in the UID. At this point, all of the database is updated in the various records. If all that was desired was to determine which MU 110 had the most taps, it would only be necessary to determine how many times the QID for that particular query was updated by the UID, which is reflected in the pointer back to the UID, as a UID record has a record of each QID that it responded to. If a time window were 10 seconds, a countdown timer on the prompting display might show the countdown, but the time window would not necessarily be exactly synchronized to that countdown timer. At the end of time, the number of times that the QID was responded to by a particular UID can be determined and that particular seat number declared a winner. The end of the time window is indicated by a decision block 3910, at which time an analysis is made of the data at a block 3912 and in the winner determined at a block 3914. At this point, the actual UID can be mapped for the winner to the seat, as indicated by block 3916 and then some type of announcement of that result indicated at a block 3918. The result could be that a promotional T-shirt is delivered to multiple seats surpassing a threshold, delivered to a single seat, or an announcement made that for a particular seat, the presentation of your ticket, would allow the individual to collect their prize at later time. In addition, it could be that a raffle was provided of an automobile, for example. That automobile could be advertised as one that would be given away at the end of the event, and based upon responses the automobile manufacture would provide this promotion and utilize the number of taps to place individuals into the raffle, or they could just merely be a response that places them in there. This response would be for the purpose of, for example, collecting statistics from the particular crowd. This would allow a large number of seats, take, for example, 8000 responders out of the 10,000 attendee event to be placed into the raffle. This would be an incentive for people to pay attention to the screen and, further, it would actually encourage people to actually activate their applications and enter crowd based response system.

In the event that MU 110 is not entered into the crowd based response system due to the fact that they did not register, it is possible to allow them to register. This would be a prompt that would actually ask people to turn on their application and respond to a particular response request in a certain manner, as entering whether they are male or female, i.e., pressing button "D" or "B." the preferable way, of course, is to register when they enter the stadium. The reason for this is that, at this time, registration would require another payment, and this payment may be entered at the middle of the overall event. This might be treated different by the overall financial arrangement with the event planners.

Figure 40:
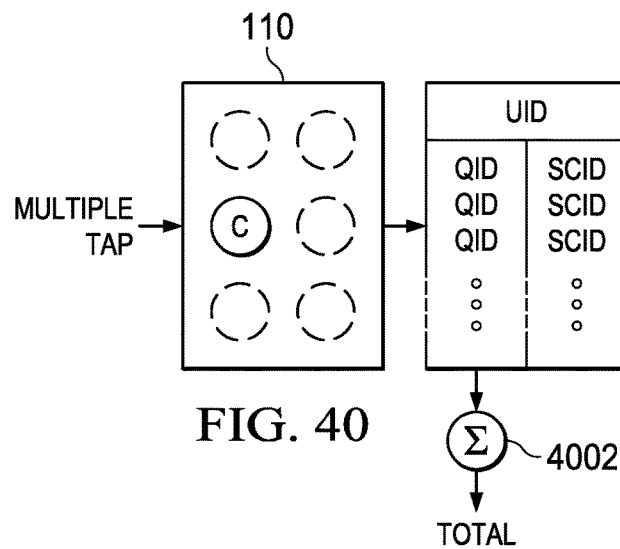
FIG. 40 illustrates a diagrammatic view of populating the UID record for a particular mobile unit.

Referring now to the FIG. 40, there is illustrated a diagrammatic view of the overall "tapping" response. The MU 110 is illustrated as having one button that is the focus of the particular query or promotional offer, this requesting the individual 202 to select this particular button, in this case, the "C" button. This will result in the particular UID for that particular MU 110 to collect both QID occurrences and SCID occurrences. Again, this particular request could be for females to tap, and the SCID for that would be different than a request requesting all males to respond. Any one of these can be summed, as indicated by a block 4002, in order to provide a total, in one example. As noted hereinabove, any type of analysis can be made upon this particular UID. Here, the issue is to determine how many times a particular UID has been associated with a QID within the time window of the QID.

Figure 41:
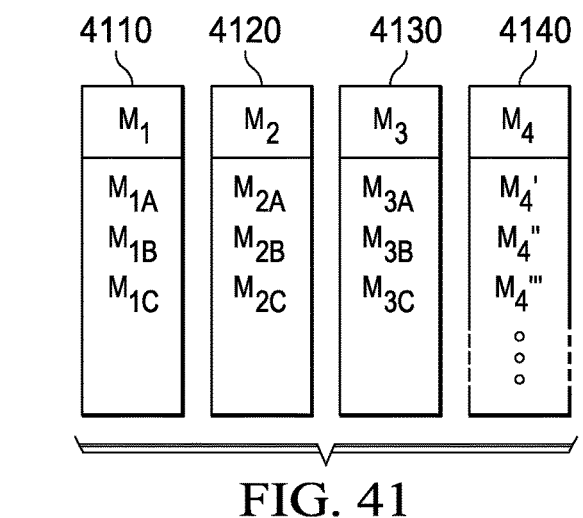
FIG. 41 illustrates sets of media messages which can be presented.

Referring now to FIG. 41, there is illustrated a diagrammatic view of sets of media messages that can be presented to event attendees. Each set of media messages has several different versions of a media message associated with it. Media messages are information presented to the event attendees in the form of audio, video, or still image messages. A media message can be either recorded or live. As an example, a first media message set 4110, referred to for ease of readability as M1, might be a set of advertisements for vehicles. This set might be comprised of message M1A, an advertisement for a motorcycle, message M1B, an advertisement for a truck, and message M1C, an advertisement for a sports car. A second media message set 4120, which will be referred to as M2, might be a set of descriptions of prizes that can be won in fan contest at the event. This set could be comprised of video message M2A, a description of a an autographed T-shirt from a sports team captain, video message M2B, a description of a piece of sporting equipment used by a professional athlete, and video message M2C, a description of a pair of free tickets to a future event at the event venue. A third media message set 4130, referred to as M3, could be a set of short video segments from various upcoming movies or television shows. A fourth media message set 4140 (M4) is provided to illustrate that the number of media messages in a set of media messages will be different in other embodiments. Some embodiments contemplated will have media message sets with only one message, while other embodiments will have media message sets with up to hundreds of messages. Although specific embodiments have been provided as examples, a media message can take the form of any message, including advertisements, announcements, news updates, entertaining interludes between parts of the event, or even political messages. In some embodiments, sets of messages can have multiple types and formats of messages. For example, in one embodiment a message set will include a video advertisement message and an audio news update message. In some embodiments, for each set of messages, which specific message is presented is based on the statistical make-up or preferences of the event attendees or even just the participating users. One way of selecting the specific media message to present is by analyzing the statistical data of responses to queries, as is described herein below.

Figure 42:
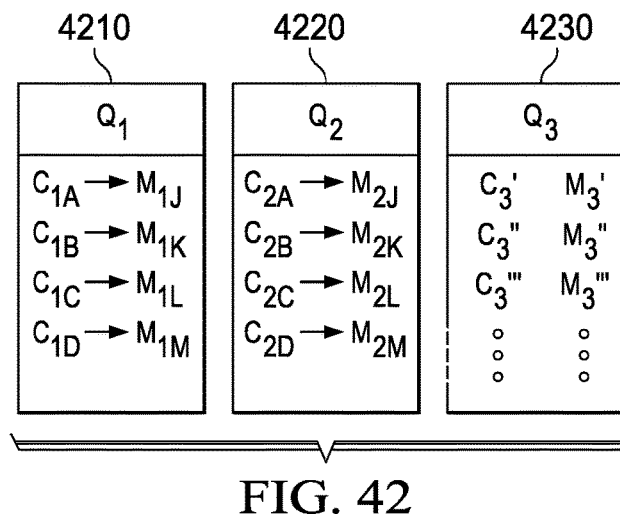
FIG. 42 illustrates sets of queries that can be presented.

Referring to FIG. 42, there is illustrated a diagrammatic view of queries, each with multiple associated query response statistical conditions and messages corresponding to those response statistical conditions. The specific message that is presented after a query is determined by which of the query response conditions is met. For example, query 4210, referred to as Q1, has associated response statistical conditions C1A, C1B, C1C, and C1D, each corresponding to a media message, M1J, M1K, M1L, and M1M, respectively, which is presented to the attendees if the corresponding condition is met. Similarly, query 4220, referred to as Q2, has associated response statistical conditions C2A, C2B, C2C, and C2D, each corresponding to a media message, M2J, M2K, M2J, and M2M, respectively, which is presented if the corresponding condition is met. Note that for query Q2, two of the conditions, C2A and C2C, have the same corresponding media message, M2A. This is to illustrate that in some embodiments, each condition need not have a unique message, and that multiple conditions have the same corresponding media message. Query 4230, referred to as Q3, is presented to demonstrate that the number of conditions and corresponding media messages associated with a query varies in other embodiments. Although the examples presented here have four conditions with corresponding media messages, other contemplated embodiments have queries with only one condition and media message, while other embodiments have as many as hundreds of conditions and media messages. It should also be noted that in some embodiments, some conditions will result in multiple messages being presented. In some embodiments, multiple response conditions being met will result in multiple media messages being presented.

Figure 43:
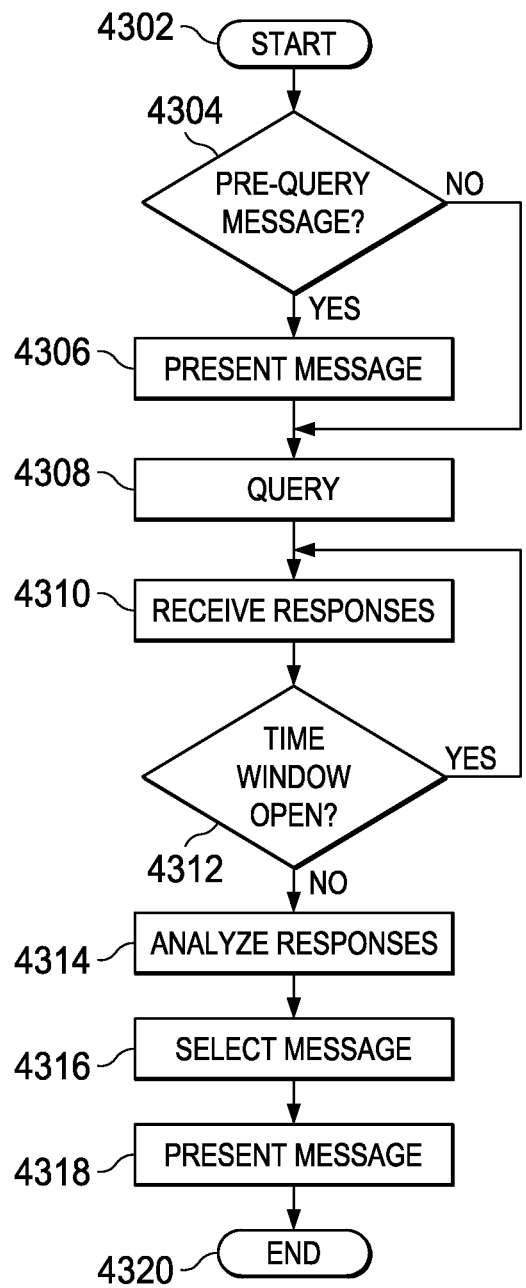
FIG. 43 illustrates a flowchart showing how queries and media messages are chosen and presented.

The process of analyzing the statistical data of responses to a query to select a media message is described herein. UID information and query responses can be used to influence subsequent media messages presented to the attendees of the live event. Referring to FIG. 43, there is illustrated a flowchart depicting the operation of selecting a media message based on the input of event attendees in response to a query. The process starts with start block 4302 and proceeds to decision block 4304 which decides if a media message will be presented before the query. If no pre-query message is to be presented, the process moves to function block 3008, where a query is presented to the event attendees. If a media message is to be presented before the query, the process proceeds to function block 4306, where the media message is presented, then to function block 4308, where a query is presented to the attendees. After the query is presented, the process goes to function block 4310, which receives responses from the MUs 110. Next, a decision block 4312 determines if the time window for responses is still open. If so, the process loops back to block 4310 to continue receiving additional responses. If the window is closed, the operation proceeds to block 4314, where the responses are analyzed associated with UID data. Next, function block 4316 applies the statistical response data and previously known statistical UID information to selection criteria and chooses the next media message to be presented. The program then proceeds to function block 4318 where the selected media message is presented to the event attendees. The program moves to block 4320 and ends.

Figure 44:
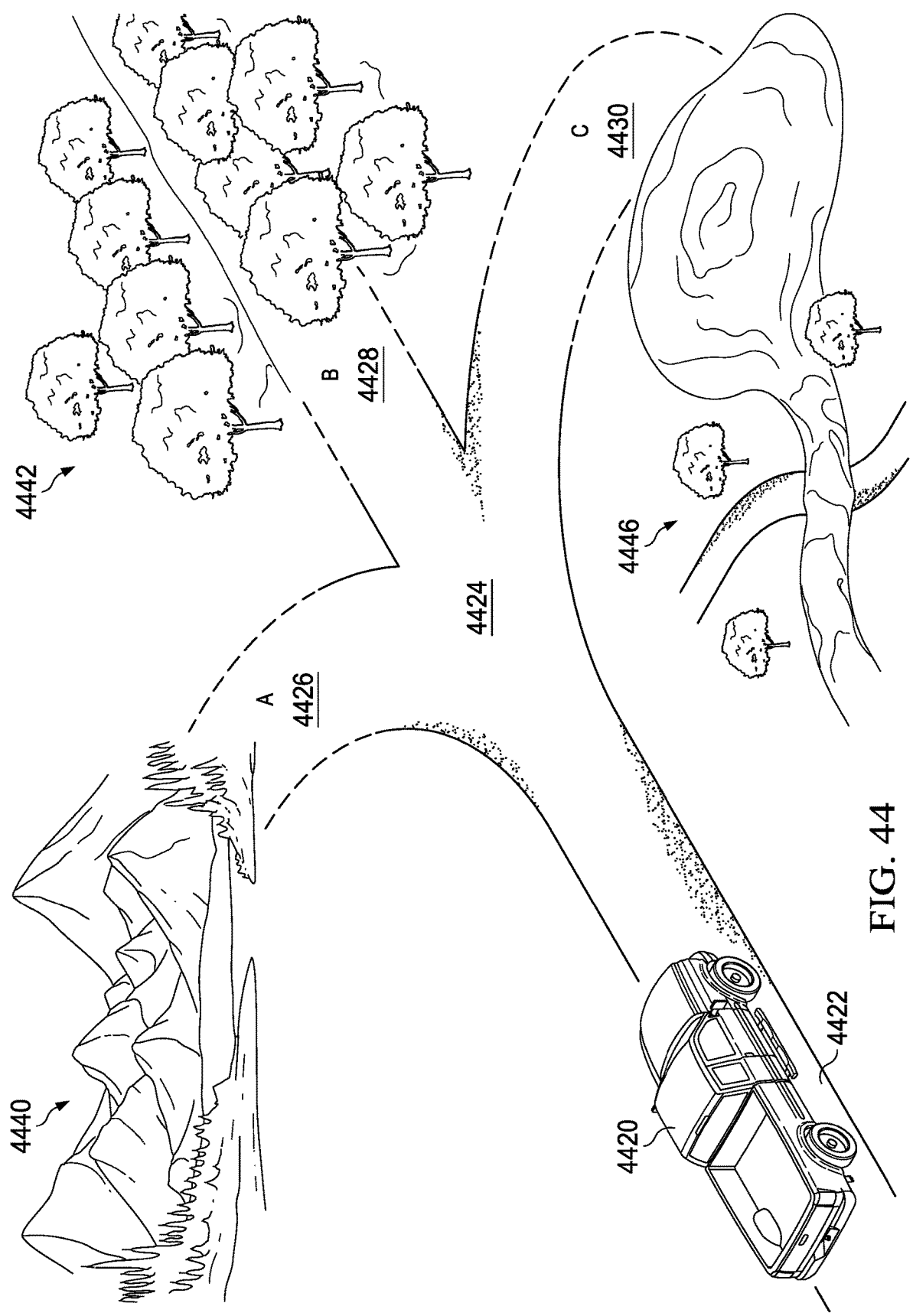
FIG. 44 illustrates the first part of an embodiment which uses a media message as a commercial for a truck.
Figure 45:
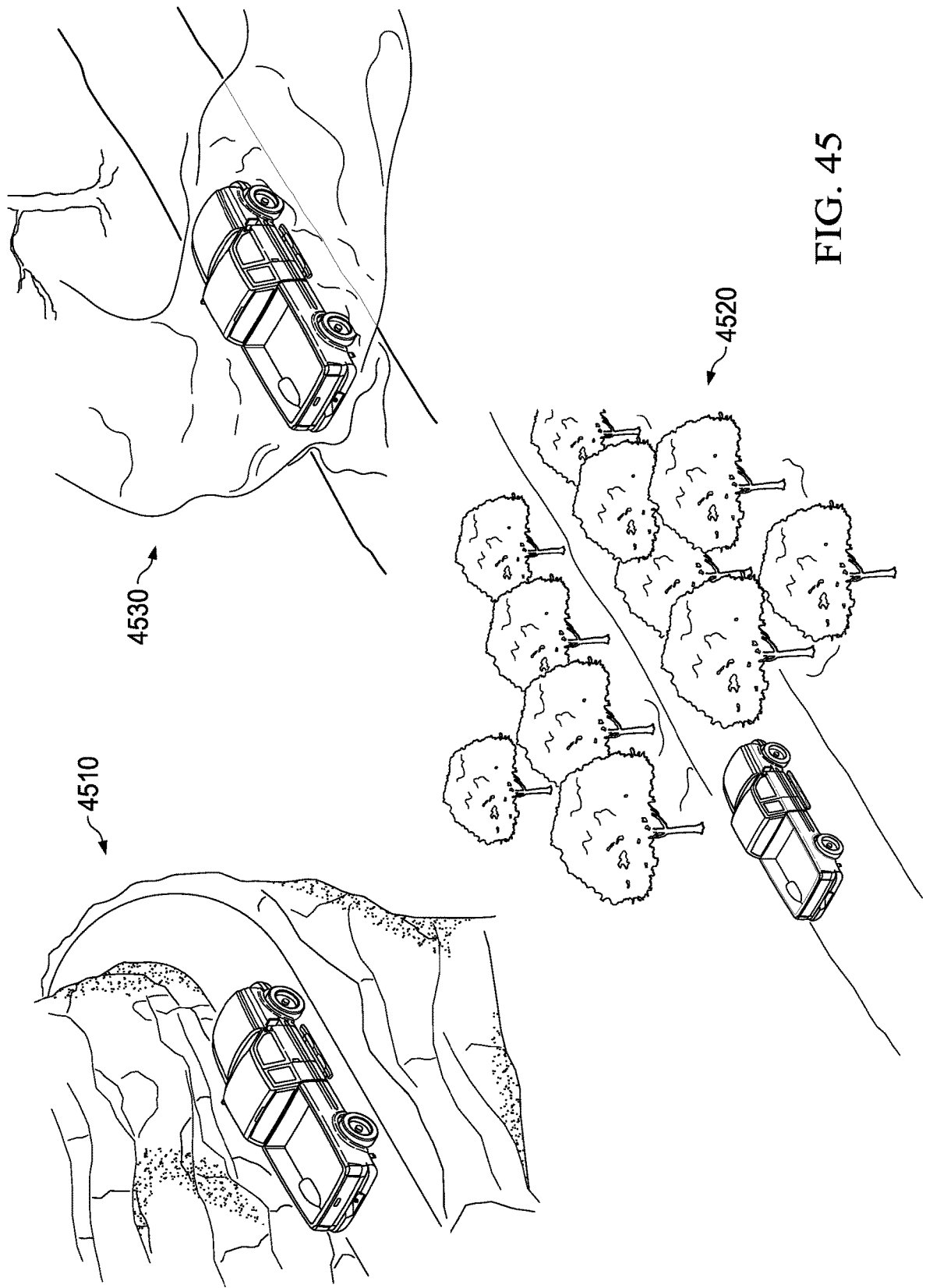
FIG. 45 illustrates the second part of an embodiment which uses a media message in the form of a commercial for a truck.

FIGS. 44 and 45 depict an example of how responses from MUs 110 to queries can be used to influence subsequent media messages. Referring to FIG. 44, there is illustrated an image representing an example of video media message to be presented to attendees of a live event. In other embodiments, the media message is a public announcement, an advertisement, a news update, a political message, or an entertaining interlude. The media message can be either audio, visual, or video. In this example, however, the image represents the first part of a video advertisement for a pickup truck. This first part of the advertisement shows a truck 4420 driving down a road 4422 until it arrives to and stops at a point 4424 where the road splits into three different paths. Each of the paths leads to a different type of driving destination. Path 4426, Path "A," leads to driving destination 4440 which includes a trail in the mountains. Path 4428, Path "B," leads to driving destination 4442 which includes a trail in the forest. Path 4430, Path "C," leads to driving destination 4446 which includes a trail in a valley with a river and a lake. At this point, the first part of the advertisement concludes with a message that informs the attendees that they can help decide where the truck will go next by choosing which path the truck will take. A query is then presented which prompts the attendees to use their MUs 110 to make a selection indicating their preferred path for the truck to take. For instance, the query might say, "Which adventure do YOU want to tackle during halftime?" The query would prompt the event attendees to select "A" on their mobile devices if they want to see the truck go down Path A and drive through the mountains, "B" if they want the truck to go down Path B and drive through the forest, or "C" if they want to see the truck take Path C drive through the valley with the river and lake.

Referring to FIG. 45 and continuing with the example of the truck advertisement, the second part of the advertisement video is presented after the time window for response queries has ended. The second part of the advertisement will be one of three video messages. The first video message, demonstrated herein with example image 4510, shows the truck driving through the mountains. The second video message, demonstrated herein with example image 4520, shows the truck driving through the forest. The third video message, demonstrated herein with example image 4530, shows the truck driving through the valley with the river. Which video message is played will depend on statistical data from the query responses. For example, if, in responding to where they would like to see the truck go next, more UIDs choose "A," indicating the user would like to see the truck drive through the mountain path, than "B" or "C," then the video message showing the truck driving through the mountains would be presented as the second part of the truck advertisement. In this manner, the event attendees "have a say" in what messages are presented to them.

The example depicted in FIGS. 44 and 45 represent an embodiment of the disclosure. As previously noted, other embodiments will have media messages that are video, audio, or visual in nature, or even combinations of the three, and will include live and pre-recorded messages. Some embodiments will have media messages presented before the query, while other embodiments will not. The truck advertisement described is only one type of content. The media messages in other embodiments include public announcements, news updates, instant replays, video or audio feed from events at other locations, advertisements, event announcements, or any other notification or message useful to event attendees. Also, the response conditions leading to each media message will not be as readily apparent to the event attendees in some embodiments as in the presented example of the truck advertisement. In some embodiments, the event attendees will not know how their query responses will affect the subsequent media message or messages. Some embodiments will not present a query as simple as "which message would you like to see?" but will nonetheless base post-query media messages on statistical information from the query responses. In some embodiments, the mobile users will not even know that their responses to queries affect the choice of the subsequent media message or messages.

The selection of which message to present after query responses have been received and analyzed can be based on various kinds of statistical data. The media message selection could be based solely on which choice received the most "votes" from the users, or the message selection could be based other statistical information gathered from the responses. Since demographic information can be associated with UIDs, an advertiser or media partner might choose to present a message based on the responses from UIDs associated with a certain demographic, such as a certain gender or household income. Continuing with the example of the pickup truck advertisement, the manufacturer of the truck in the advertisement might be especially interested in a particular segment of the event attendee population, such as males, and might focus on the responses from the UIDs associated with male users. For example, if 60% of responding UIDs indicated "C," the valley with the river, as the preferred destination for the truck, but 70% of responding UIDs statistically associated with males indicated "A," the mountain trail, as the preferred destination, the video represented by image 4510 showing the truck driving through the mountains might be presented as the second part of the advertisement if the truck manufacturer is particularly interested in keeping the attention of male event attendees.

Figure 46:
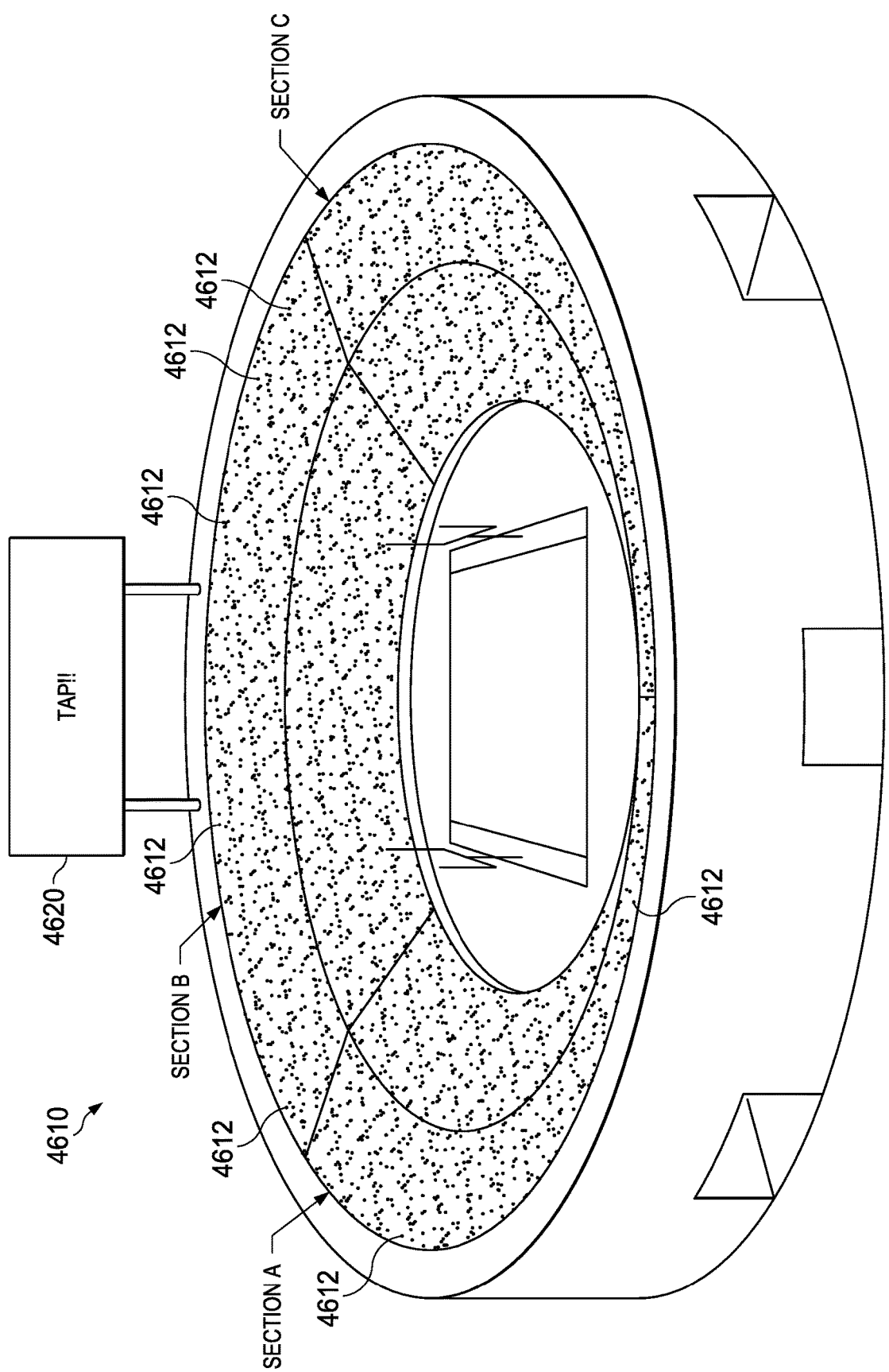
FIG. 46 illustrates a stadium with attendees who respond to queries with taps to their mobile devices.

In another embodiment of the disclosure, the query presented to the venue attendees prompts users to input a response into their mobile units as a way to determine which portions of the venue have the most attendees paying attention to the queries and multimedia messages. Referring now to FIG. 46, there is illustrated a sports stadium 4610, with venue attendees 4612. (In other embodiments, the venue will be a concert hall. In yet other embodiments, the venue will be a theater.) The seating of stadium 4610 is divided into multiple seating sections, labeled "Section A," Section B," and "Section C." Stadium 4610 includes a large display 4620 which can be seen by the event attendees. The display presents a message to the event attendees prompting them to respond with some kind of input into their MUs 110, such as by tapping rapidly a "button" on an application running on their MUs 110. The message prompt will be displayed for a predetermined time window, for example, fifteen seconds. The system records the number of tap responses for each UID. Since each UID can be associated with a seat location in the event venue, the system can determine which seating section had the most tap responses during the time window. Which seating section had the most taps will affect the subsequent media message that is presented to the event attendees. In some embodiments, the section with the most taps will see a message indicating each attendee in that section wins a prize. In other embodiments, the message might simply indicate which section produced the most taps. In some embodiments, seating sections in sporting events are divided based on which team the attendees support. For example, one seating section could be comprised mostly of "home team" fans, while another seating section is comprised mostly of "away team" fans. In some of these embodiments, the post-query message will be a message related to the sports team favored by the seating section with the most taps.

In other embodiments, the taps are not sorted by seating section, but are sorted by some other type of information, such as demographic information associated with the UIDs. For example, some embodiments the taps are categorized by male or female UIDs. In other embodiments, they are categorized by age range. In other embodiments, they are categorized by the team or player the attendees' support, regardless of where the attendees' seats are.

In a variation of the embodiment illustrated in FIG. 46, event attendees tap their MUs 110 in response to a query that takes the form of a game. Event attendees (and thus their UIDs) are divided into groups as teams (for the purposes of the tapping game). The number of teams can be anywhere from only a single team to several dozen teams. A visual or audio query message then prompts attendees to "tap" their MUs 110 as many times as they can during a predetermined time window. Once the time window has expired, a media message communicates to the attendees how many total taps were performed by the UIDs associated with each team. In some embodiments, the process will be repeated, with multiple prompts and time windows for tapping. At the end of each time window, a media message will communicate the number of taps per team for the latest time window, as well as the cumulative number of taps for each team during all of the time windows during the event. The game can be presented in several ways. In some embodiments, it will take the form of a virtual race taking place on a video screen over several time windows. Each team has an associated horse, person, dog, colored dot, or any other object or animal typically involved in a race. The more taps each team accumulates during each time window, the farther down the "track" that team's racer will travel at the end of the time window. Each race could last only one time window, or a race could span several time windows, with each time window representing a "leg" of the race and being accounted for in the "leg" during the next time window.

Figure 47:
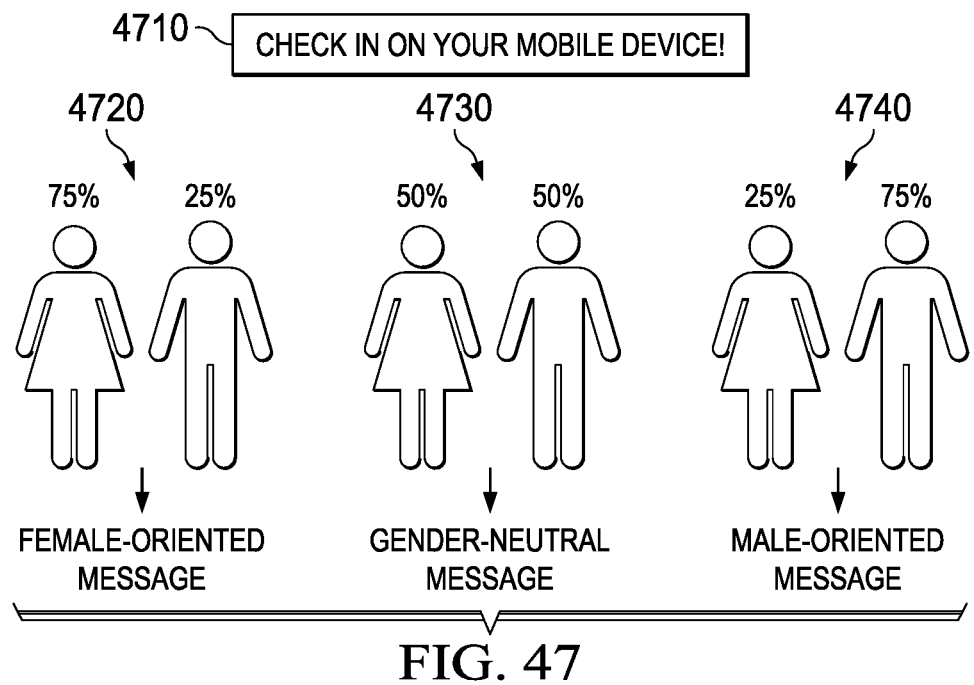
FIG. 47 illustrates the embodiment of users checking-in on the mobile devices.

Referring to FIG. 47, there is illustrated an example embodiment which displays a message based on the gender make-up of the event attendees that respond to a query to "check-in" with their MUs 110. Query 4710 is a message that is presented to the event attendees, in either an audio or visual format. Query 4710 prompts event attendees 202 to "check-in" using the application on their MUs 110. This query is presented any time that the event proprietors wish to know the demographic make-up of the attendees paying attention to the queries and multimedia messages. In some embodiments, the query will prompt to attendees to "check in" to be entered into a contest. The system will allow attendees to "check in" during a predetermined time window following the presentation of query 4710. Once the time window has expired, the system will determine, based on information associated with the UIDs that "checked-in," the demographic make-up of the respondents. The message presented after the time window has expired depends on the analysis of the demographic make-up of the attendees that responded. In the example embodiment presented, the system determines the gender make-up of the attendees "checking-in." The post-query message presented is at least partially determined by this gender make-up. Situation 4720 illustrates that if a significant majority of the attendees checking in are female, a female-oriented message is presented. Situation 4730 illustrates that if the numbers of males and females checking in is roughly equal, or not significantly weighted one way or the other, a gender neutral message is presented. Similarly, situation 4740 illustrates that if the number of males checking is significantly greater than the number of females "checking-in," a male-oriented message is presented.

In different embodiments, different demographics will be analyzed. For example, in some embodiments, the check-ins will be categorized by the age of the user associated with a particular MU 110. In other embodiments, the check-ins will be categorized by geographic locations of the attendees' homes. In other embodiments, the check-ins will be categorized based on sports team affiliations.

Figure 48:
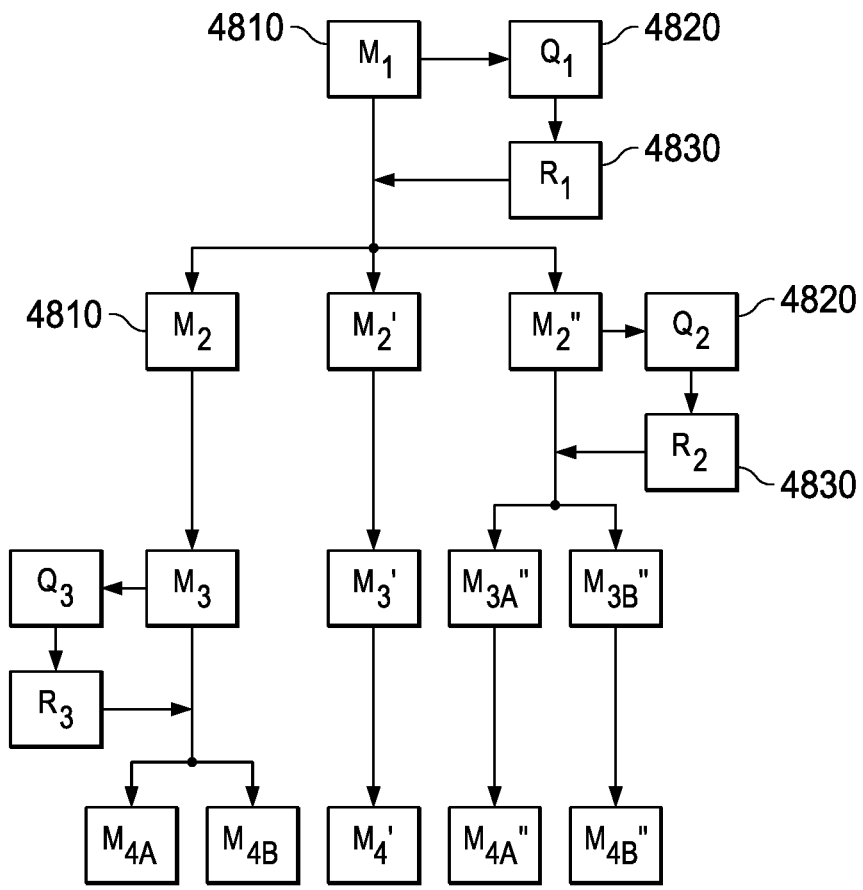
FIG. 48 illustrates a branching decision tree of queries and media messages.

Referring now to FIG. 48, there is illustrated a diagram of the way in which an embodiment of the system uses queries and responses to determine which media message to present next. Illustrated in the diagram are several media messages 4810. In some embodiments, these messages are in video form, while in other embodiments, the messages are in audio form. Also illustrated are several queries 4820, which are also either audio or video in form. Finally, sets 4830 of responses to queries 4820 are illustrated. These sets 4830 of responses are responses from event attendees and are inputs into MUs 110. The system starts by presenting media message M1. After media message M1 is presented, query Q1 is presented to the event attendees, prompting the attendees to input a response into their MUs 110. After receiving the responses that make up the set R1 of responses, the system analyzes R1. Next, a second media message 4810 is presented. The media message will be M2, M2', or M2". Which media message is presented is based at least in part on the analysis of R1. After the second media message is presented, the system presents third media message, or if M2" was the second media message presented, presents query Q2 to the event attendees, prompting responses that will form set R2. The third media message will be M3 (if M2 was previously presented), M3' (if M2' was previously presented), or either M3A" or M3B" (if M2" was previously presented). If M2" had been the second message presented, then the analysis of R2, the set of responses to query Q2, will be a factor in determining which one of M3A" and M3B" is presented. Finally, a last media message will be presented. If M3' was previously presented, M4' will be presented. If M3A" was presented, M4A" will be presented, and if M3B" was previously presented, M4B" will be presented. If, however, M3 was the previously presented message, then either M4A or M4B will be the next message. After M3 is presented, query Q3 will be presented to the event attendees, prompting responses that will form set R3 of responses. The analysis of R3 by the system will factor into which one of M4A or M4B will be presented to the audience.

The example embodiment shown in FIG. 48 illustrate the aspect of the disclosure whereby the messages being presented to event attendees can "branch" onto different possible paths based on user responses to queries. This branching can allow for a "story" to be told through the messages, with the direction of the "story" being at least partially controlled by the event attendees (or the statistics associated therewith) as they respond to the various queries. In some embodiments, the "story" is an entertaining narrative, while in other embodiments, it is a series of related advertisements. In some embodiments, the event attendees are informed that their query responses affect which messages will be presented next, while in other embodiments, the event attendees are not informed of this. The specific number of media messages presented, as well as the number of queries will vary in different embodiments. Some embodiments have a query and a response analysis after every message. Other embodiments only have queries presented after certain messages. In some embodiments, the selection of a post-query message will be based solely on the statistical information from the responses. In other embodiments, the post-query message will also be based on other previously gathered statistical data about the UIDs.

Figure 49:
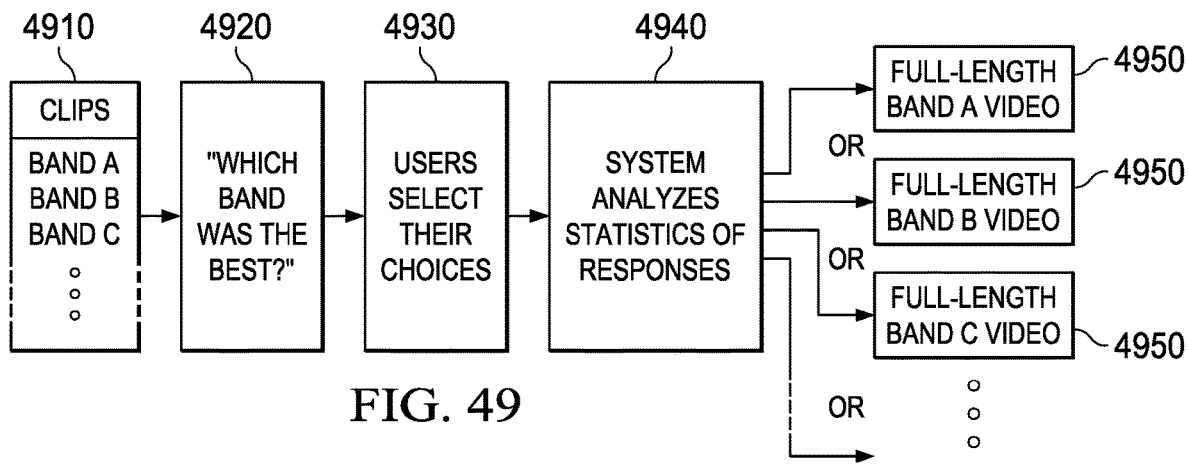
FIG. 49 illustrates the selection of a full-length music video based on selection from short video clips.

Referring to FIG. 49, there is illustrated an embodiment whereby the event attendees influence the choice of a music video to be presented. In this embodiment, a media message represented by block 4910 in the form of short video clips is presented to the audience. The message comprises of short clips of music videos, each clip being of a song performed by a different band or group. Next, a query 4920 is presented to the event attendees prompting them to select which band or group they thought was the best or the most entertaining. At block 4930, the event attendees user their MUs 110 to select their choice for which band or group performed the best. Next, at block 4940, the system compiles and analyzes the responses of the attendees and generates statistical information about the responses. In some embodiments, this information will include previously obtained demographic data about the responding UIDs. Following analysis of the responses, a media message in the form of the full-length version 4950 of one of the music video clips will be presented to the attendees. Which full-length version 4950 will be presented is at least partially influenced by the statistics of the responses to the query 4920. In some embodiments, the video clip that received the most "votes" from responding attendees will have its full-length version presented as the post-query media message. In other embodiments, the choice of which full-length video to present will be determined by which clip receives the most "votes" from a specific demographic, such as a particular gender, age group, nationality, or income level.

Figure 50:
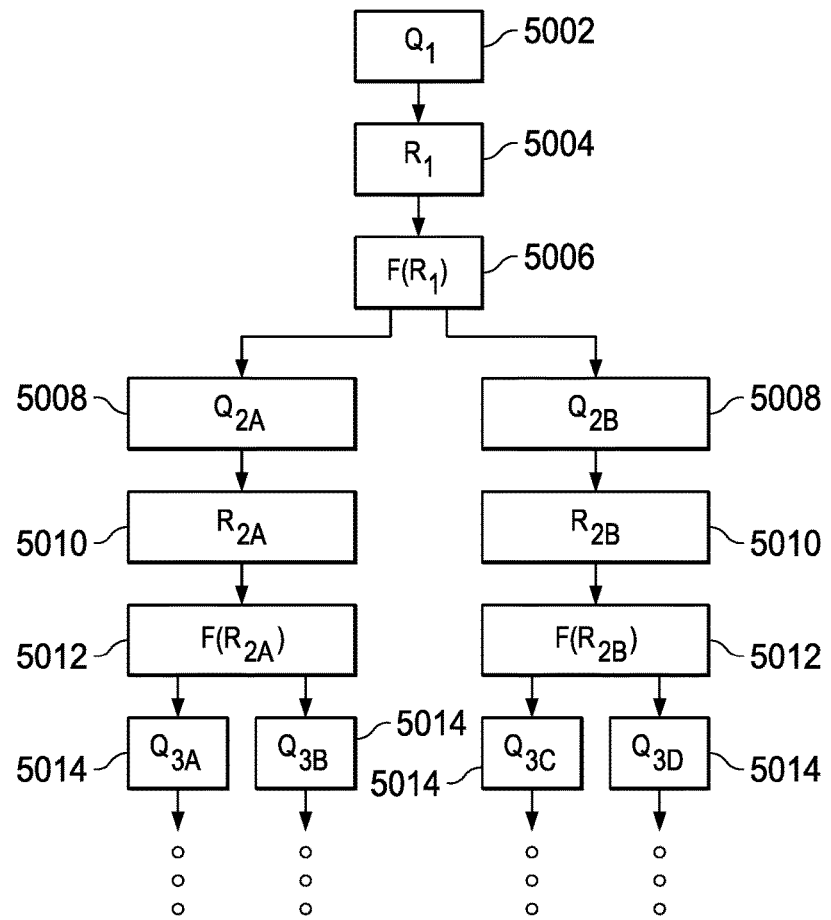
FIG. 50 illustrates how the analysis of queries responses are used to select the next query.

In some embodiments, responses to queries will affect the choice of subsequent queries to present to event attendees. Turning to FIG. 50, there is illustrated a diagram showing how the available queries to be presented are organized into selection "trees." Query 5002 (Q1) represents the first query in the query tree to be presented to the event attendees. After attendees submit responses making up response set 5004 (R1), the system analyzed the responses to R1 using an algorithm tailored for analyzing responses to Q1. The results 5006 of this algorithm are a function of R1 (represented by F(R1)). The next query presented to the event attendees will be one of the queries 5008, either Q2A or Q3A. The selection of which of these queries will be presented, and which "branch" of the query "tree" to travel, is at least in part determined by F(R1). The process continues again, where either Q2A or Q2B is presented to the audience. Q2A or Q2B will then be followed by one of the responses 5010 R2A or R2B, respectively. The response set that is obtained will then be analyzed by another function, with the results of this function represented by blocks 5012. The process continues, branching into different paths to one of queries 5014 as the queries and responses help determine which subsequent queries to present. In some embodiments, there will be multiple queries at every "level" of the tree. In some embodiments, not every query will have the ability to branch off to multiple subsequent query paths. In some embodiments, one or more of the queries will have more than two possible paths to branch to, while in other embodiments, queries with multiple paths will only have two possible paths.

Figure 51:
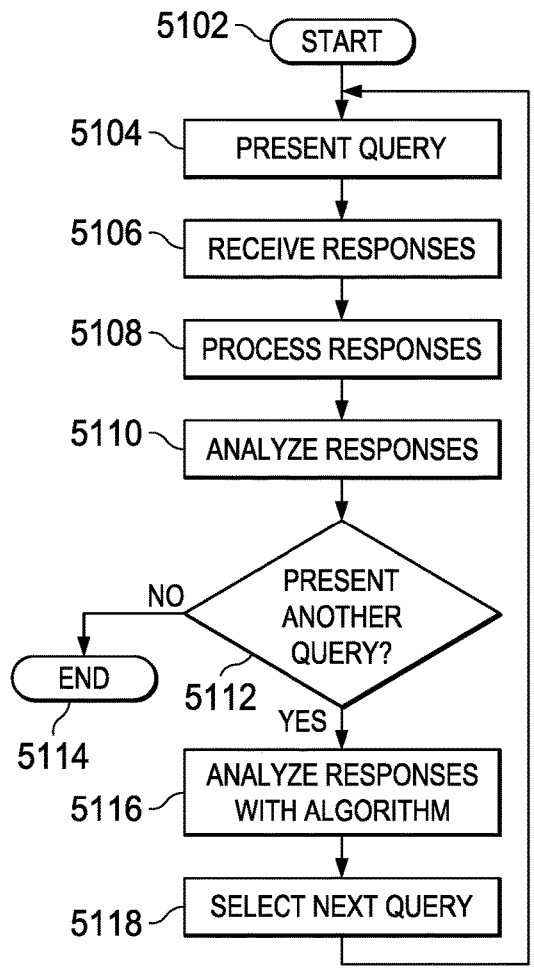
FIG. 51 illustrates a flowchart showing the process by which a query is selected.

Turning to FIG. 51, there is illustrated a flowchart showing the process of using the analysis of query responses to select the next query to be presented. The process starts with Start block 5102 and flows to function block 5104, where a query is presented to the event attendees, prompting a response. The process moves to block 5106, where the attendee responses are received by the system, then to block 5108, where the responses are processed and stored by the system. Next, at block 5110, the responses are analyzed for statistical information. Next, at decision block 5112, if there are no more queries to be presented, the process ends at End block 5114. If, however, more queries are to be presented, the process moves to block 5116, where the responses to the previous query are analyzed with an algorithm tailored to that query. Next, the process flows to block 5118, where the results of the analysis from block 5116 are used to select the next query to be presented. Finally, the process closes the loop to 5104 and presents the newly selected query.

Figure 52:
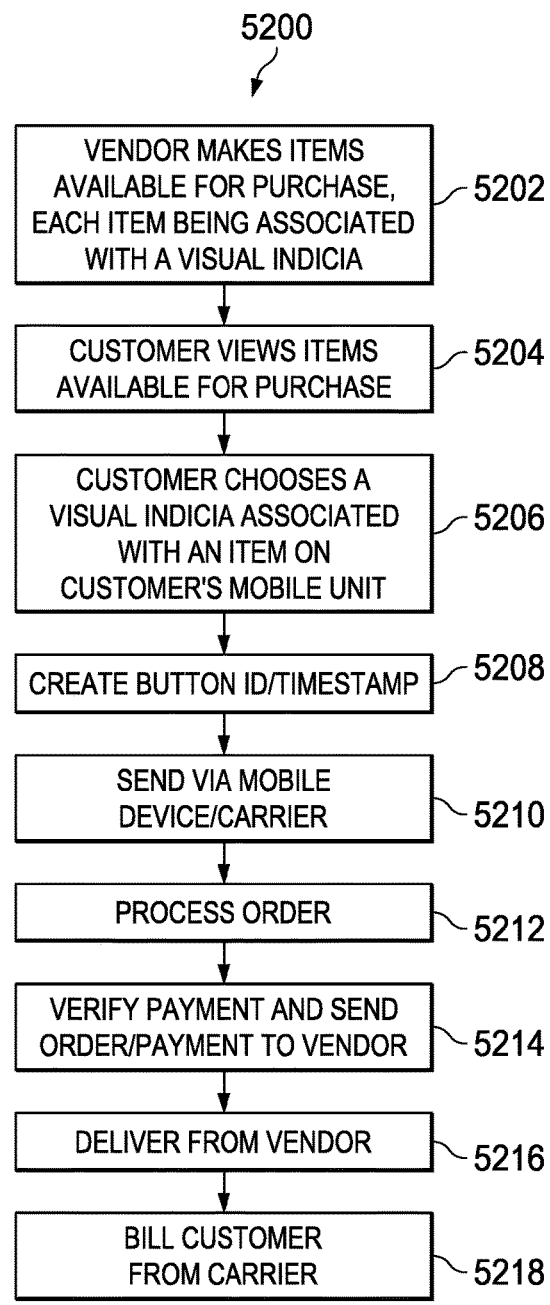
FIG. 52 illustrates a flowchart depicting another embodiment for an operation of a merchandising feature area.

Referring now to FIG. 52, there is illustrated a flowchart depicting another embodiment for the operation of the merchandising feature area method 5200. The method 5200 begins at step S202 where a vendor makes items available for purchase, the items being associated with visual indicia. For instance, one item might be associated with the letter "A," one item might be associated with the number "5," one item might be associated with a triangle symbol, and so on. It will be understood that the vendor could be any type of vendor that sells goods, such as retail stores, direct sales salesmen, vendors that sell items on the internet, vendors that sell items on television, or any other type of vendor. At step S204, a customer views the available items. At step S206, the customer chooses one of the items to purchase by selecting on the customer's mobile unit the specific visual indicia among the displayed group of visual indicia associated with the item the customer wishes to purchase.

At this point, a button ID with a timestamp is created. It is provided in order to encode within the button ID the information about the button unique to the application, i.e., a unique button code. This is then combined with a timestamp and sent via the overriding offer application, which is associated with the screen 2308, to the provider 2306 in order to interface with the vendor 2312 or to just send the information to vendor 2312. This is indicated at a block 5208. The program then flows to block 5210, wherein this is sent via the MU 110 to the carrier and then to the vendor 2312. At step S212, the overall order is processed. This process includes verifying payment and then sending order/payment to the vendor, as indicated by block 5214. The vendor will then deliver the product as indicated by block 5216, and the customer is billed by the provider, as indicated by block 5218.

Figure 53:
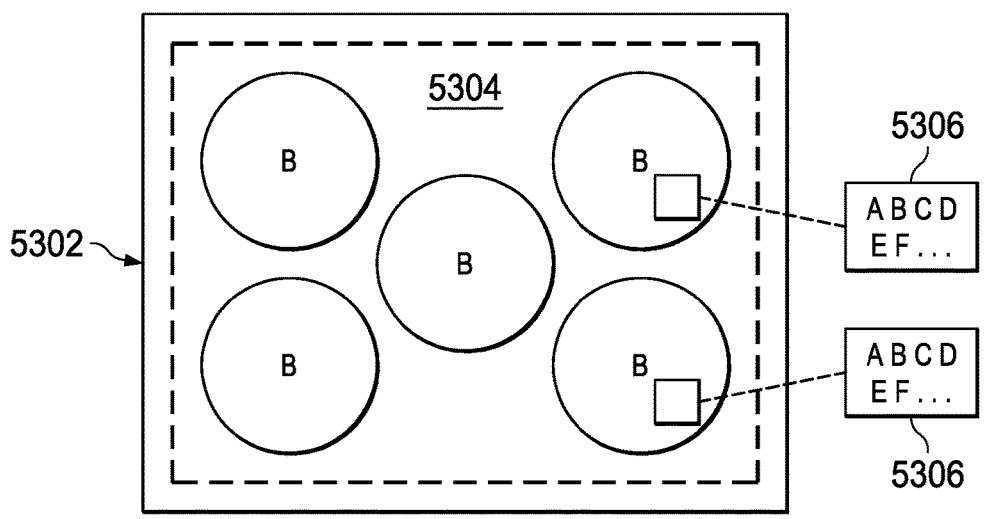
FIG. 53 illustrates a diagrammatic view of one embodiment of a system for providing items to be sold based on visual indicia within the range of a beacon.

Referring now to FIG. 53, there is illustrated a diagrammatic view of one embodiment of a system for providing items to be sold based on visual indicia within the range of a beacon. There is shown a sales area 5302. This may be the confines of a retail location, the confines of a home where direct sales are taking place, or any other location where goods may be sold. Within the sales area 5302, there are a plurality of beacon areas 5304. The plurality of beacon areas 5304 may be achieved using various forms of wireless networks or other configurations. For example, the plurality of beacon areas 5304 may be WIFI networks, Bluetooth networks, BLE networks, Zigbee networks, Thread networks, wireless mesh networks, achieved with geo-fencing, or any other method of creating a beacon area that a customer may use to connect to all of these non-overlapping networks. Within the plurality of beacon areas 5304 may be a plurality of items for sale 5306. Each item of the plurality of items for sale 5306 is marked with a particular visual indicia that is unique from the visual indicia used to mark the other items within the plurality of items 5306. For example, if a t-shirt is marked with the visual indicia of "A" within one beacon area, there would be no other item within that same beacon area marked with the visual indicia of "A." However, another item within a different beacon area may be marked with the same visual indicia. For example, if a t-shirt is marked with the visual indicia of "A" within one beacon area, a pair of shoes that is within another beacon area may also be marked with the visual indicia of "A." Thus, the beacon area represents proximity to the goods.

Figure 54:
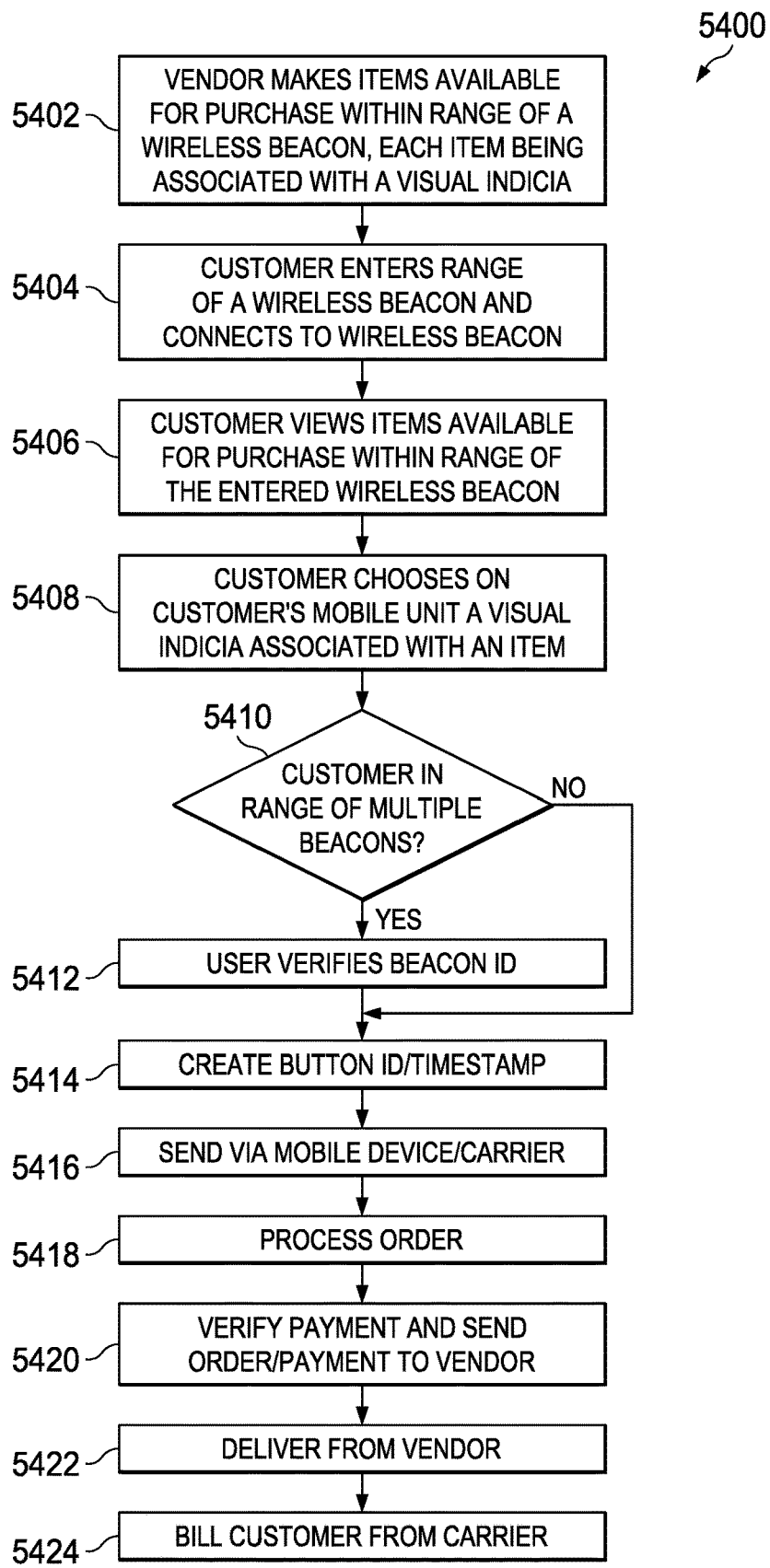
FIG. 54 illustrates a flowchart depicting one embodiment of a method for purchasing items to be sold based on visual indicia within the range of a beacon.

Referring now to FIG. 54, there is illustrated a flowchart depicting one embodiment of a method 5400 for purchasing items to be sold based on visual indicia within the range of a beacon. The method 5400 begins at step S402 where a vendor makes items available for purchase, with the items being within a range of a wireless beacon and the items being associated with visual indicia. For instance, one item might be associated with the letter "A," one item might be associated with the number "5," one item might be associated with a triangle symbol, and so on. It will be understood that the vendor could be any type of vendor that sells goods, such as retail stores, direct sales salesmen, vendors that sell items on the internet, vendors that sell items on television, or any other type of vendor. At step S404, a customer enters the range of a wireless beacon and connects to the wireless beacon in the manner appropriate for the particular beacon type or just receives a signal from the beacon. This connection may be achieved automatically, or the customer may have to manually connect to the beacon. At step S406, a customer views the available items. At step S408, the customer chooses one of the items to purchase by selecting on the customer's mobile unit the visual indicia associated with the item the customer wishes to purchase. At decision block 5410, the system determines if the customer is within range of multiple beacons. This may occur if there are overlapping beacon areas. If so, the process moves to step S412 where the user is prompted to verify his beacon ID. The customer may know which beacon he is connected to based on the name of the organization he is shopping with, or if the organization has multiple beacon areas, the particular physical area within the beacon area may have signage that is marked with the beacon ID so that the customer knows which beacon area he currently is within. The process then moves to step S414. If at decision block 5410 it is established that the customer is not within range of multiple beacon areas, the process also moves to step S414.

At this point, a button ID with a timestamp is created. It is provided in order to encode within the button ID the information about the button unique to the application. This is then combined with a timestamp and sent via the overriding offer application to a service provider/mobile carrier in order to interface with the vendor selling the items to be sold or to just send the information to vendor. This is indicated at step S414. The program then flows to block 5416, wherein this is sent via the MU 110 to the carrier and then to the vendor. At step S418, the overall order is processed. This process includes verifying payment and then sending order/payment to the vendor, as indicated by block 5420. The vendor will then deliver the product as indicated by block 5422, and the customer is billed by the provider, as indicated by block 5424. The product may be shipped to the customer, or the vendor may simply hand the item to the customer if the customer is at a vendor location, to satisfy step S422.

Overall, the use of a beacon for determining proximity to a particular location can be achieved by disposing a very small device such as BLE device or a Zigbee device proximate to the appropriate goods. This can be a very low powered beacon that just emits, in one embodiment, and identifying a signal which is basically a wireless broadcast containing the unique ID of the particular beacon. This beacon could be more powerful which would allow it to transmit not only its unique ID but also information associated with that unique ID. Thus, when a user with a portable device running proprietary application comes into proximity to the beacon, i.e., the transmit range of beacon, it will have an appropriate radio associated with that beacon contained internal thereto. This radio will constantly scan the area for signals associated with a particular type of beacon. However, other types of devices might use the same technology and transmit their IDs. Thus, when a scan is complete and, for example, multiple unique IDs are retrieved, it may be possible that additional information associated with the ID can allow one to distinguish this particular beacon as being associated with the operation of the application. Alternatively, a lookup table can be provided for determining if a particular unique ID is associated with the application.

When a match is found, this indicates that the beacon is associated with the goods. All that is required is for the mobile unit to transmit information regarding the unique ID associated with the button pressed and the beacon ID (or information associated with the beacon) back to a central office for processing. As described hereinabove, that processing can be performed at the mobile carrier or at a separate site. It is important, however, that the mobile carrier is accessed because the mobile carrier contains the billing information and the mobile carrier is the vehicle by which the billing is carried out. Thus, the information could be sent to the mobile carrier which is then relayed to the store associated with that unique ID and then the vendor confirms the existence of the product that is ready for shipping and coordinates with the carrier to confirm that the carrier will bill the customer for the goods, at which time the confirmation by the carrier of the billing will result in the vendor being authorized to send the goods to the customer via a mailing address associated with customer account number or, alternatively, the vendor could be authorized to actually transfer possession of the goods at the location.

An alternate operation, the entire operation could be triggered by the mobile unit coming into proximity with the beacon. When the beacon is standing and a recognition of the unique ID indicates that it is associated with the application, the full application is launched and the above process carried out.

Figure 55:
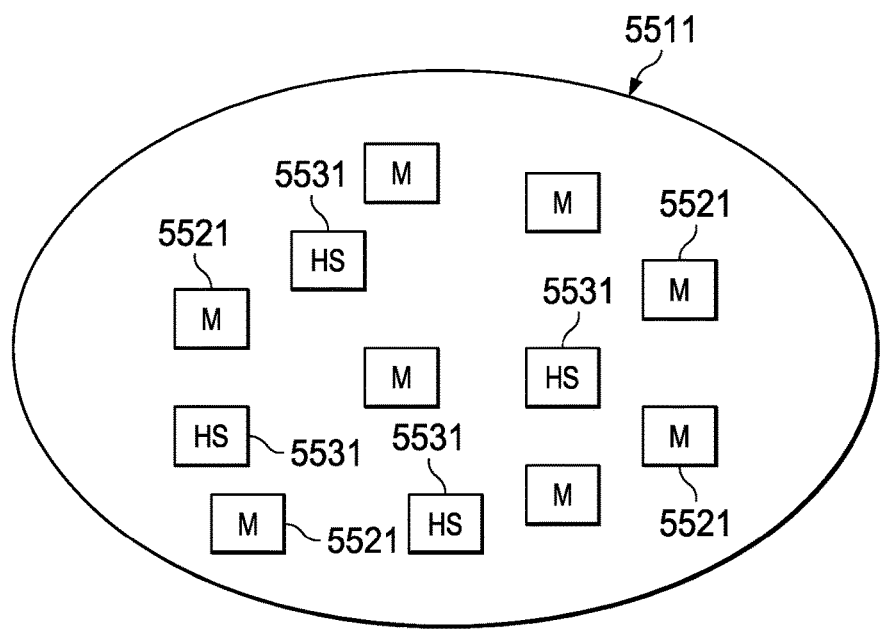
FIG. 55 illustrates a stadium with several mesh networks.

In some embodiments, the mobile units 110 are part of and transmit their responses through one or more mesh networks. Referring now to FIG. 55, there is illustrated an overhead view of venue in the form of a stadium 5511. In some embodiments, the venue is instead a theater, while in others the venue is a concert hall. Inside the stadium 5511 are a plurality of mesh networks 5521. The mobile units within the stadium connect to and join one of the mesh networks 5521. Since the coverage area of each of the mesh networks is limited, several mesh networks are present in the stadium to ensure that no matter where a mobile unit is in the stadium, there is a high likelihood that a mesh network will be available and in range so that the mobile unit can connect to it. Each mesh network is connected to external networks via hotspots 5531. The hotspots 5531 facilitate communication between each mesh network 5521 and whichever external networks the hotspots are connected to, including the LCO 120 and any intermediary networks between the LCO and the hotspots.

Figure 56:
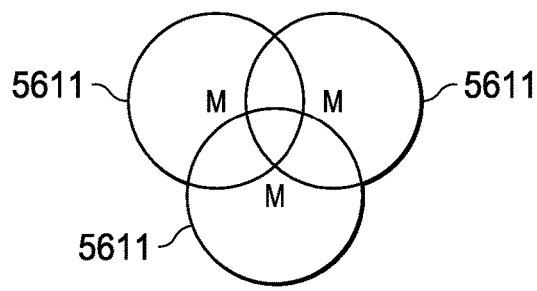
FIG. 56 illustrates several overlapping mesh networks.

Referring now to FIG. 56, there is illustrated a plurality of mesh networks 5611 within the stadium 5511 illustrated in FIG. 55. To maximize the chance that any given mobile unit will be in range of and will be able to connect to a mesh network, the mesh networks will have coverage areas that overlap with each other as shown FIG. 56. Ideally, any time a mobile unit exits the coverage area of one mesh network, it will already have entered the coverage area of another mesh network. That way, when a mobile unit moves outside the range of the mesh network it is a part of and leaves that network, it will simply join a mesh network with a coverage area that overlapped the mesh network it left. This will maximize the ability of mobile units to stay connected to mesh networks and minimize the areas of the stadium 5511 where mobile units will not be able to connect to any mesh network.

Figure 57:
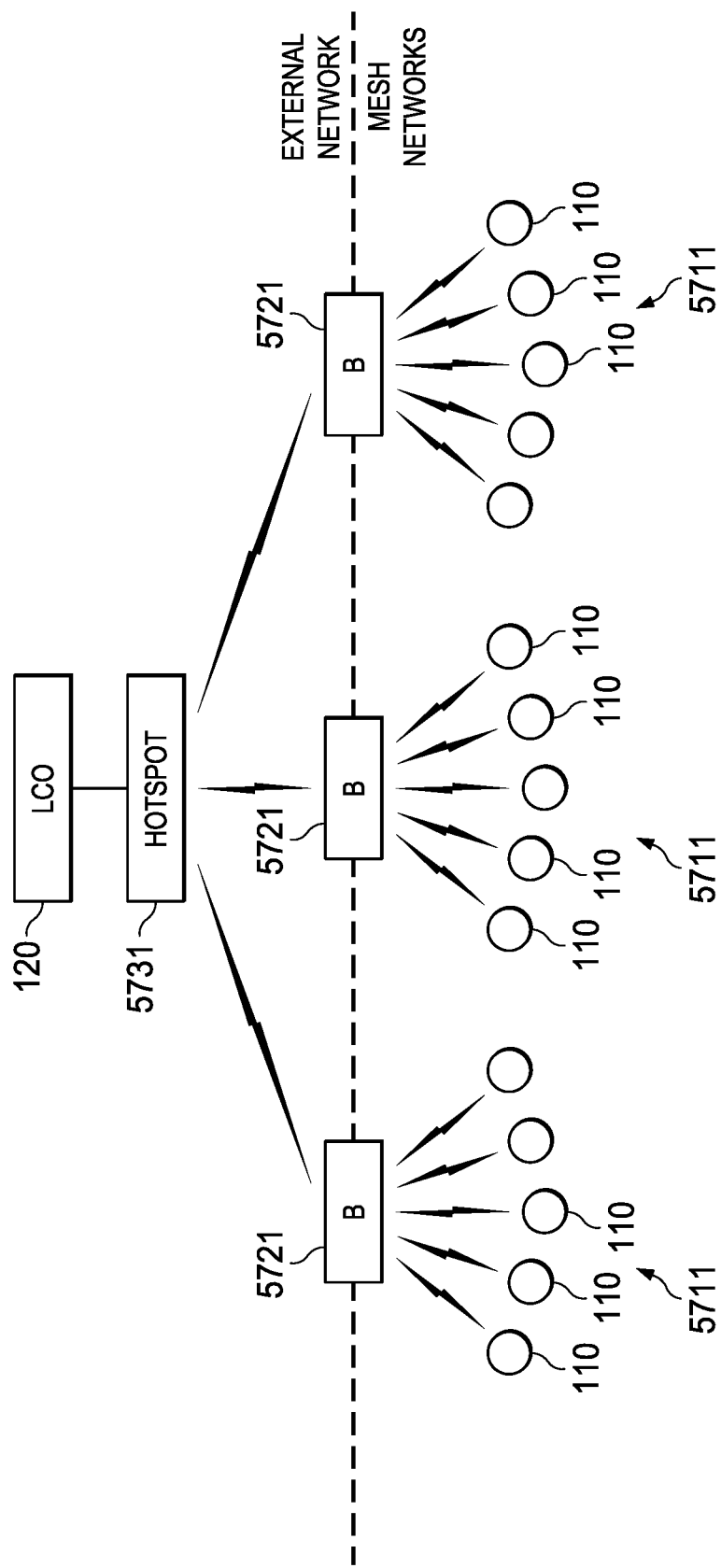
FIG. 57 illustrates several mesh networks connected to external networks via a hotspot.

Referring now to FIG. 57, there is illustrated a more detailed diagram of several mesh networks and a hotspot as would exist in the stadium 5511 in FIG. 55. Each mesh network 5711 is comprised of multiple mobile units 110 and a bridge device 5721. The mobile units 110 are connected to the bridge device 5721 either directly or via other devices in the mesh network. The function of the bridge devices 5721 is to connect each mesh network, and the devices on each mesh network, to external networks. In some embodiments, the bridge device is connected to external networks wirelessly, while in some embodiments, the bridge device is connected via Ethernet or another wired connection. In the embodiment illustrated in FIG. 57, all of the bridge devices are connected to at least one associated hotspot 5731, there being a plurality of hotspots 5731 disposed throughout the venue. The hotspot 5731 is, in turn, connected to LCO 120 and any intermediary networks between LCO 120 and the hotspot 5731.

As a user walks around the venue, the may leave the receive range of the bridge device 5731 it is associated with. This will require entering a new mesh network when it is within range of a bridge device 5731 for that network. Since only about 256 devices can be on a mesh network, the device will have to find a network with a free spot with its locale.

Figure 58:
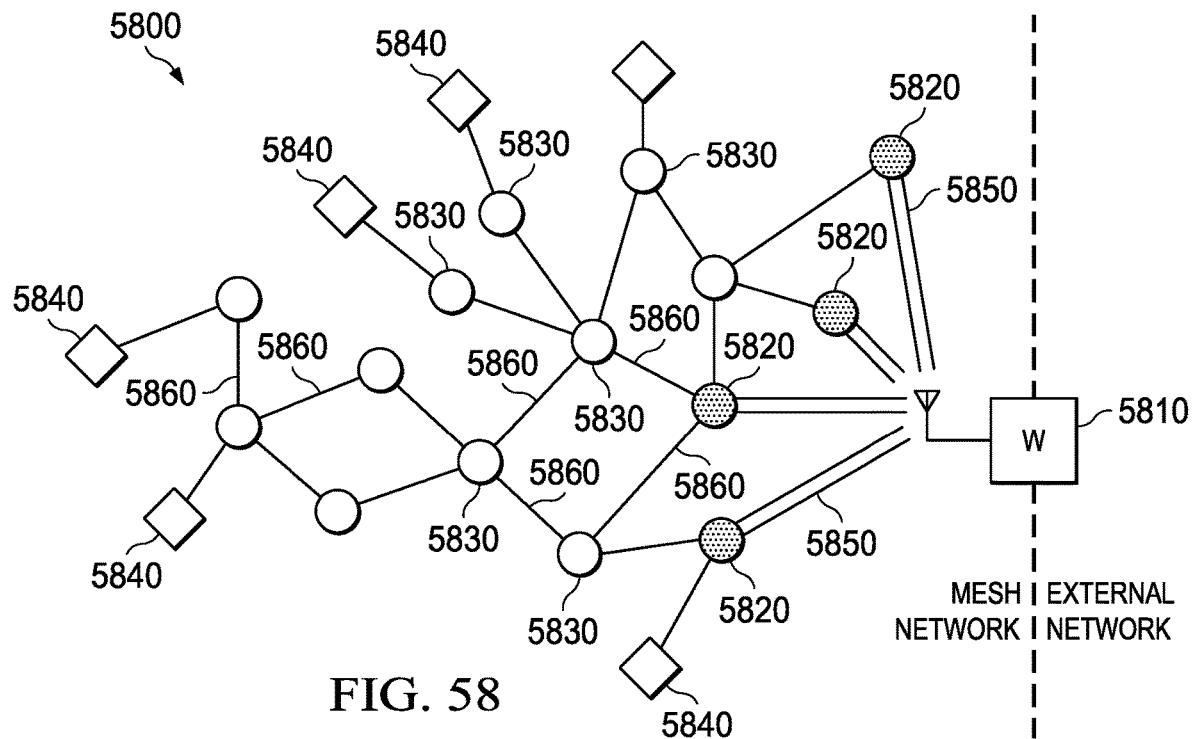
FIG. 58 illustrates an embodiment using a mesh network.

Referring now to FIG. 58, there is illustrated a diagram of an embodiment of the disclosure which uses a mesh network 5800—for example, Thread or Zigbee—to connect the mobile units to bridge devices which receives query responses from the mobile units. These bridge devices then forward the mobile unit responses out of the mesh network to external networks. One or more bridge device 5810 is directly connected (wirelessly) to a certain mobile unit or mobile units near the bridge device 5810. The bridge device 5810 is also connected to an external network and acts as a bridge between the mesh network and the external network. In some embodiments, the bridge device or devices are connected directly to local central office (LCO) 120. In other embodiments, however, there is another device which relays information from the bridge device 5810 to the LCO 120. The mobile units connected directly to the bridge device are represented as mobile units 5820. Double lines represent direct connections 5850 between mobile units 5820 and bridge device 5810. The mobile units 5820 maintain wireless connections 5850 with the bridge device(s) 5810. Mobile units 5820 transmit information to bridge device 5810, but also receive information from other mobile units in the network and relay that information to bridge device 5810. Some mobile units are not connected to bridge device 5810, but are instead connected to other mobile units, including mobile units 5820 that are themselves connected to bridge device 5810. These are mobile units 5830. Mobile-units-to-mobile-unit network connections 5860 are represented by single lines connecting mobile units. Mobile units 5830 not only transmit information to receive information from other mobile units and transmit information to other mobile units. Finally, some mobile units are only connected to other mobile units in the network and only transmit information to other mobile units. These are mobile units 5840. The mesh network 5800 is comprised of the mobile units and the bridge device(s) 5810. The mesh network 5800 allows multiple mobile units to create a network among themselves which includes the bridge device 5810. Not all mobile units need to be connected directly to or transmitting information directly to the bridge device 5810. Instead, the mobile units 5820, 5830, 5840 form a "mesh" of connections which link all of the mobile units together within a single mesh network that is defined by a finite limited number of network members. As long as each mobile unit is within communication range with at least one other mobile unit in its network, or anything else on the mesh network, each mobile unit can transmit information to another mobile unit or device on the network, which will then transmit the information to another mobile unit or device on the network. The information is transmitted from unit to unit until the information is received by a mobile unit or device on the network that is directly connected to the bridge device. That mobile unit then transmits the information to the bridge device 5510, which then transmits the information out of the mesh network to an external network.

Also, mobile units can be connected to multiple other mobile units within the mesh network. Consequently, if for some reason a mobile unit leaves the network (the mobile unit is turned off, turns off the application, etc.) any mobile units connected to it can still maintain communication with bridge device 5810 via the other mobile units within the network to which they are connected. Mobile units can enter or leave the mesh network at any time. Mobile units can also change what function they serve within the mobile network. For example, a mobile unit might start out connected directly to bridge device 5810 as a mobile unit 5820. If, however, the mobile unit moves far enough away from the bridge device 5810, or for any other reason the connection between the mobile unit and the bridge device 5810 degrades, the mobile unit might disconnect from the bridge device 5810 and become a mobile unit 5830 within the mesh network. Similarly, a mobile unit 5840 might pick up new connections to mobile units entering the mesh network, making the former mobile unit 5840 (which only transmitted information) a mobile unit 5830 (which receives information from some mobile units and transmits information to other unit). The ability of the mobile units to change roles within the network at any time adds to the network's robustness.

Figure 59:
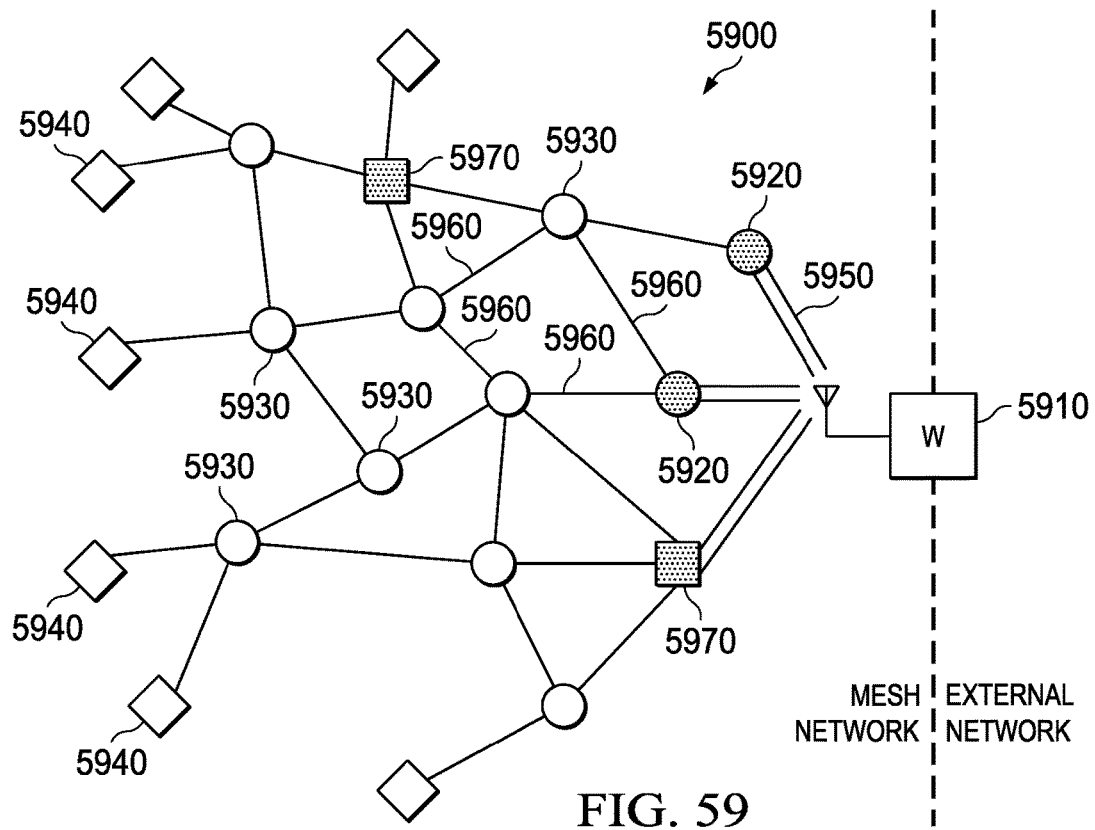
FIG. 59 illustrates another embodiment using a mesh network.

Turning to FIG. 59, there is illustrated another embodiment using a mesh network. In this embodiment, like that shown in FIG. 59, the mesh network 5900 includes at least one bridge device 5910 (in some embodiments, connected directly to LCO 120, in others connected to LCO 120 via another device), mobile units 5920 connected directly to bridge device 5910 (via connections 5950), mobile units 5930 which receive and transmit information to and from other mobile units within the network (via connections 5960), and mobile units 5940 which only transmit information to other mobile units. This embodiment, however, also includes wireless relay stations 5970. The wireless relay stations 5970 are part of the mesh network 5970 and fill in any "gaps" in the network that might be caused by the absence of a mobile unit in the area. A relay station 5970 is a member of the network 5970 and can be connected to the bridge device 5910, to nearby mobile units 5920, 5930, 5940, to other relay stations 5970, or to any combination of the three. The relay stations 5970 do not act as mobile units by providing responses to queries, rather, they simply relay information from mobile units through the network until the information reaches the bridge device 5910. In this way, the mesh network 5900 will not be adversely affected by a lack of mobile units in a particular physical location within the event venue. Even if a particular mobile unit is not within communication range of either the bridge device 5910 or another mobile unit in the network, the mobile unit can still communicate with the network if it is within communication range of a relay station 5970 that is part of the network.

The devices on each embodiment of a mesh network presented communicate via radio frequency using the IEEE 802.15.4 communication standard. The mesh networks use internet protocol version 6 (IPv6) for routing device-to-device communication. Therefore, the mobile units and wireless relay stations each have unique IPv6 addresses, enabling the routers within the mesh network to route information between the devices. The mesh network is comprised of devices acting in four different roles: routers, router-eligible end devices (REEDs), border routers, and end devices. Routers provide routing services to network devices. Routers both receive and transmit information to and from other devices on the mesh network. They also allow (or deny) new devices to join the mesh network. End devices communicate with the network through network routers, but do not forward messages from other devices. Router-eligible end devices (REEDs) are devices which have the ability to act as network routers if needed, but generally act as end devices. Finally, border routers are provide all of the functionality of normal routers, but they also provide connectivity from the 802.15.4 mesh network to another network, such as a Wi-Fi network or an Ethernet network. Each mesh network disclosed has devices serving as border routers and either end devices or REEDs. Some mesh network embodiments will also comprise devises filing the roles of normal routers, end devices, or both.

In the embodiment shown in FIG. 58, mobile units 5820, 5830, 5840 all act as REEDs. This is because they can perform routing services and forward messages within the mesh network if needed, but typically will only transmit messages to other routing devices. In some embodiments, bridge device 5810 acts as a border router, as it performs routing services within the network, but also routs messages, usually in the form of query responses, from the mesh network to the local central office 120, either directly or via external intermediary networks. The wireless relay stations 5970 shown in FIG. 59 act as routers within the mesh network, since they do not generate their own response messages, but function only to forward response messages from mobile units in the network through the network on to the wireless receiving station 5910.

For a mobile unit to participate in the mesh network, it must first join the mesh network by proceeding through either two or three phases: discovery (not always required), commissioning, and attaching. During the first phase, discovery, the mobile unit (the joining device) discovers the mesh network and establishes contact with a device within the mesh network acting as a router (or border router or REED). To do this, the mobile unit scans for network channels and sends out a beacon request on each channel. The mesh network, when it is accepting new devices into the network, will respond with a beacon message comprising the network Service Set Identifier (SSID) and a permit joining beacon. The mobile unit, upon receiving the permit joining beacon, has now discovered the mesh network. The mobile unit then uses Message Link Establishment (MLE) messages to detect, establish communication, and configure a secure radio link with a nearby router with which it can perform the next step, commissioning. The mesh networks in the embodiments presented herein are secure networks. Because of this, new devices cannot join the network until they are granted access by the mesh network in the phase called "commissioning." It should be noted that if a mobile unit already has commissioning information, it does not have to go through the discovery phase. Commissioning can be accomplished on the mesh network via two different methods. With the first method, the out-of-band method, commissioning information is configured on the mobile unit directly. This allows the mobile unit to join the mesh network as soon as it is introduced to the network. With the second method, a commissioning session set up between the mobile unit and an application on another device securely delivers commissioning information to the mobile unit, at which point the mobile unit is allowed to join the mesh network. In some embodiments, the mobile unit will be required deliver a passcode to the mesh network (or an external device controlling which devices may join the network) before commissioning information will be furnished to the mobile unit. In some embodiments, this passcode will be furnished to the event attendees by the event venue. The final phase of joining the mesh network is "attaching." During "attaching," a mobile unit which has commissioning information contacts a router already on the mesh network, exchanges link configuration information, and finally joins the mesh network.

As described above herein, the network containing the mobile units can be a mesh network. In these embodiments, devices on the network can forward messages for other devices. In some embodiments, mobile units can forward messages to other devices on the network, including other mobile units. In other embodiments, only dedicated relay stations can forward messages from other devices on the mesh network. If the connection between devices acting as routers or between a mobile unit sending a message to a router becomes unreliable, then the mesh network will forward the message through another router in the network. A device routing table is maintained by one of the routers on the mesh network to make sure that all routers have up-to-date information on possible message paths for the other routers in the network. Included in the information regarding message paths is the "cost" of routing information from each router device to every other router device in the network. The better the quality of the link between a device on the network and a neighboring device is (measured by Received Signal Strength Indicator, or RSSI), the lower the "cost" of transferring messages one way or the other between the devices is. Each routing device calculates the "cost" of messages to and from its neighbor and provides this information to the mesh network. The cost of sending a message from one router to another in the network is therefore the sum of the costs of sending a message over each link on the path from one router to the other router. The costs of delivering messages within the network are updated on a regular basis, so the devices within the network always have up-to-date information on which path is the most efficient path on which to send a message.

Figure 60:
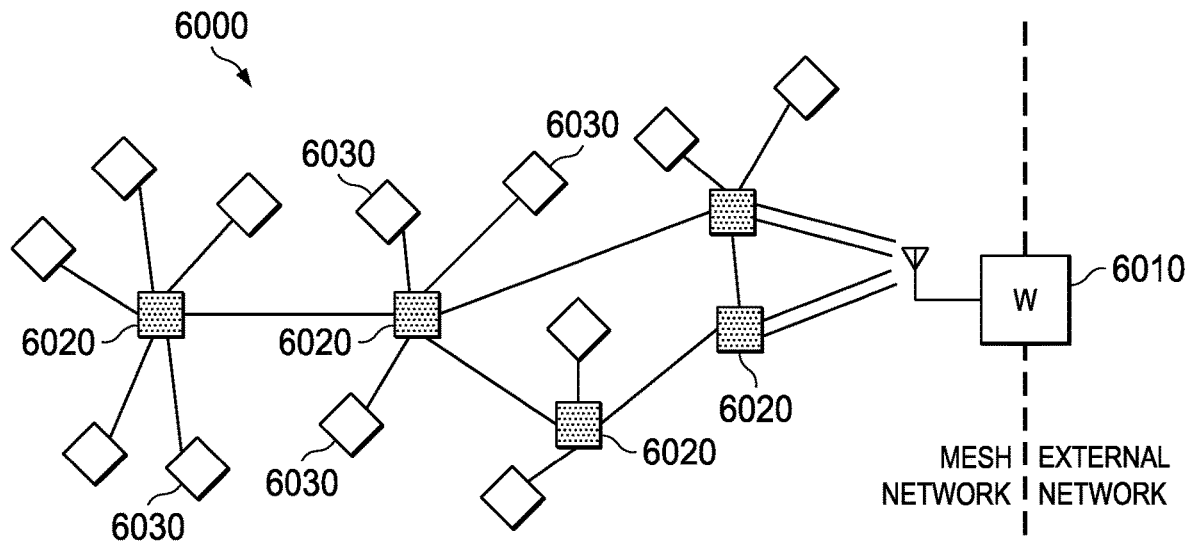
FIG. 60 illustrates yet another embodiment using a mesh network.

FIG. 60 illustrates another embodiment using a mesh network 6000. In this embodiment, the mesh network comprises a bridge device 6010, network relay stations 6020, and mobile units 6030. In this embodiment, mobile units 6030 act only as end units within the mesh network 6000. They do not forward messages from other devices on the mesh network. Rather, they only send response messages to relay stations 6020. In this embodiment, the relay stations 6020 act as routers and within the network. Their function is to forward messages from mobile units 6030 on the network to other relay stations 6020 on their way to the bridge device 6010. They can also facilitate the joining of new mobile units to the mesh network. The mobile units 6030 are connected to the relay stations 6020 within the network, which are then connected to other relay stations within the network. Some relay stations 6020 are connected directly to bridge device 6010. The bridge device 6010 functions as a border router, connecting directly to networks external to mesh network 6000.

In some embodiments, the event venue will have multiple mesh networks active simultaneously in different areas of the venue. In these embodiments, the coverage areas of at least some of the mesh networks will overlap with each other. If a mobile unit moves out of range of one network, the mobile unit will be able to automatically join a different mesh network.

Figure 61:
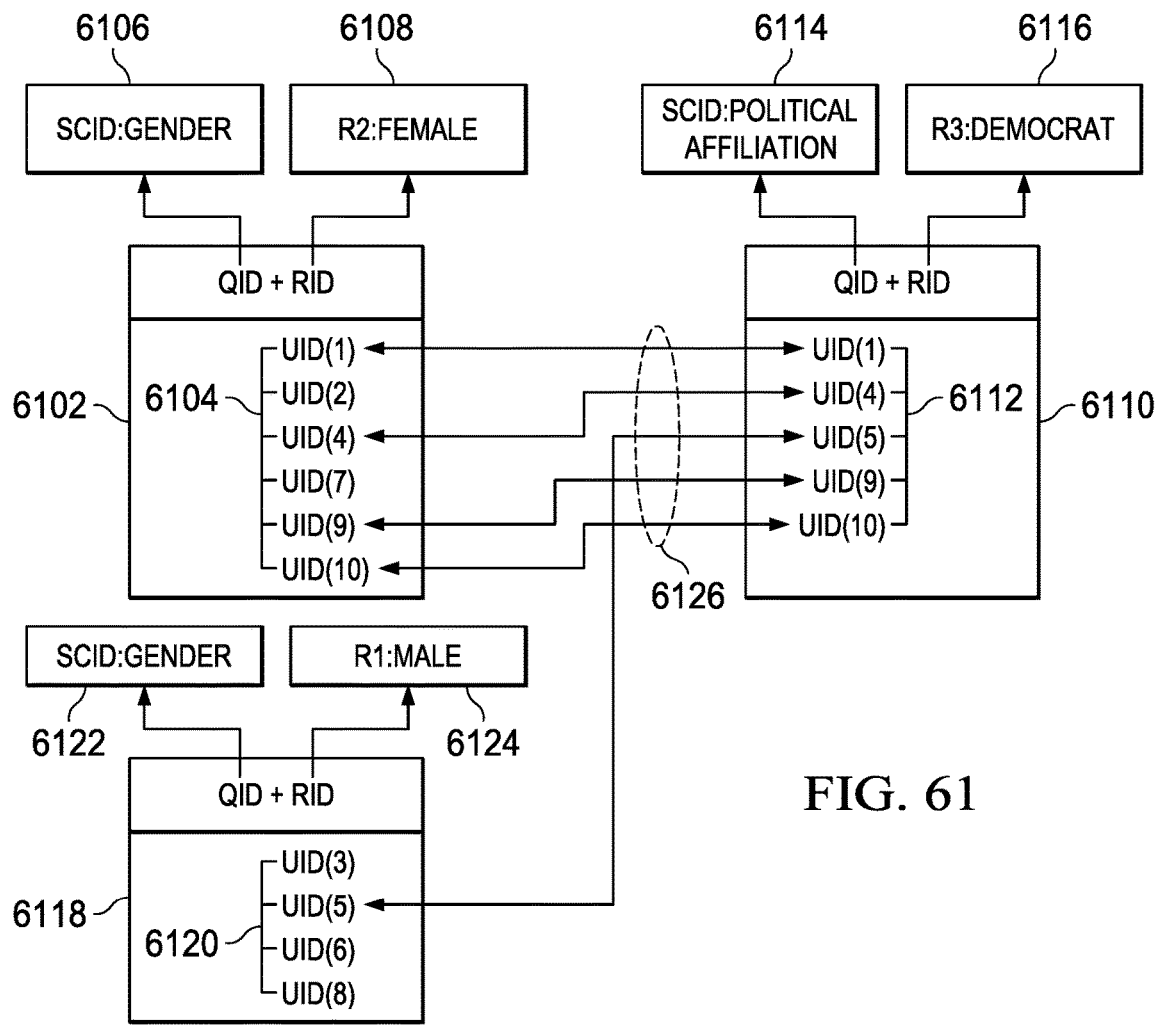
FIG. 61 illustrates a diagrammatic view of one embodiment a relational database trending determination model.

Referring now to FIG. 61, there is illustrated a diagrammatic view of one embodiment a relational database trending determination model. There is illustrated a first QID+RID record 6102 containing a first plurality of UIDs 6104. Each of the first plurality of UIDs 6104 is a UID identifying a particular individual who answered the question and provided the response associated with the first QID+RID record 6102. This is illustrated by showing a link to an SCID 6106 associated with the question, linked from the QID of the first QID+RID record 6102. Similarly, the response associated with the question is shown by a link to the answer 6108 associated with the RID of the first QID+RID record 6102. With respect to the first QID+RID record 6102, the associated SCID 2806 is "Gender," denoting that the question is one asking for the gender of the responders. The associated answer 6108 is "R2:Female," which denotes that the associated answer 6108 is the second answer choice for the associated question, with that answer choice being the "female" option.

There is further illustrated a second QID+RID record 6110 containing a second plurality of UIDs 6112. Each of the second plurality of UIDs 6112 is a UID identifying a particular individual who answered the question and provided the response associated with the second QID+RID record 6110. This is illustrated by showing a link to an SCID 6114 associated with the question, linked from the QID of the second QID+RID record 6110. Similarly, the response associated with the question is shown by a link to the answer 6116 associated with the RID of the second QID+RID record 6110. With respect to the second QID+RID record 6110, the associated SCID 6114 is "Political Affiliation," denoting that the question is one asking for the political affiliation of the responders. The associated answer 6116 is "R3:Democrat," which denotes that the associated answer 6116 is the third answer choice for the associated question, with that answer choice being the "democrat" option.

There is further illustrated a third QID+RID record 6118 containing a third plurality of UIDs 6120. Each of the third plurality of UIDs 6120 is a UID identifying a particular individual who answered the question and provided the response associated with the third QID+RID record 6118. This is illustrated by showing a link to an SCID 6122 associated with the question, linked from the QID of the third QID+RID record 6118. Similarly, the response associated with the question is shown by a link to the answer 6124 associated with the RID of the third QID+RID record 6118. With respect to the third QID+RID record 6118, the associated SCID 6122 is "Gender," denoting that the question is one asking for the gender of the responders. The associated answer 6124 is "R1:Male," which denotes that the associated answer 6124 is the first answer choice for the associated question, with that answer choice being the "male" option.

There is further illustrated in FIG. 61 a plurality of associations 6126 between UIDs and the QID+RID records. There is shown that UID(1), UID(4), UID(9), and UID(10) are each within both the first QID+RID record 6102 and the second QID+RID record 6110. This means that the individuals represented by UID(1), UID(4), UID(9), and UID (10) answered a gender query as "female" and also answered a political affiliation query as "democrat." Further, it can be seen that UID(5) answered the gender question as "male" and the political affiliation question as "democrat." This arrangement allows for analytics to be run on particular groups, thus forming a social measurement matrix. For example, the illustration in FIG. 61 shows that, out of the six respondents who answered "female" for the gender question, four of them also stated that they affiliate themselves with the democratic party. This means that approximately 67% of the female respondents identify with the democratic party. It can also be seen that, of those who responded "democrat," 80% were female. It can also be seen that only one out of 4 males answered the political affiliation question as "democrat," meaning that only 25% of the male respondents identify with the democratic party.

It will be understood that some female or male respondents may not have answered, but the analytics or queries used to pull the stored data from the database may be tailored to check whether UIDs that answered the first question chose one of the responses for the political affiliation question. For example, the first QID+RID record 6102 consisting of female respondents has UID(1), UID(2), UID (4), UID(7), UID(9), and UID(10) answering as being "female." However, UID(2) and UID (7) are not shown as answering "democrat" for the second QID+RID record 6110. If UID(2) did not answer this particular question at all, while UID(7) chose the "republican" option, this could be taken into account when determining the results. For example, the results could instead state that 80% of the females identified as "democrat," be simply removing UID (2) from the pool and relying on a total female population of five instead of six. Alternatively, the results could read as 67% of the females identified as "democrat," 16.5% identified as "republican," and 16.5% as "undecided" to account for the one female who did not respond. It will be understood that these percentages are approximations and are merely illustrative. They do not represent definitely how the system would round the percentages. It will also be understood that the database may be configured in any way to allow for these association or similar associations. It will further be understood that these concepts could be applied to any demographic group and any form of question, as well as multiple demographics groups and multiple questions. It will also be appreciated that the numbers used in FIG. 61 are small numbers for demonstration purposes. The number of respondents could be an unlimited number.

Referring now to FIG. 62, there is illustrated one embodiment of an example database report 6202 retrieved from the database in which query and response data is stored. There is shown a title bar 6204 stating a given name of the report. This name may be auto-generated or manually entered by the person running the report. There is further shown a plurality of query parameter columns 6206, labeled as "Query P1," "Query P2," and "Query P3" for this example. In the last column is a results row 6208. Each of the plurality of query parameter fields 6206 lists various query parameters that were run against the database, with each row of the report representing one full search.

For instance, a first row 6210 shown in FIG. 62 shows that a QID+RID for a gender questions with the answer of "female" was searched as parameter 1, a QID+RID for a political affiliation question with the answer of "democrat" was searched as parameter 2, and a timestamp was searched as parameter 3. The "xx:xx" of the timestamp designates a wildcard, meaning any time of day is acceptable. Thus, the timestamp searched in this example limits the search to a particular day, but not a particular time. It will be understood that the system could use any other method of introducing wildcard characters. This provided a result of 67%, meaning 67% of female respondents also responded with "democrat." A second row 6212 shows a similar query where the search provides the percentage of respondents that affiliate with democrat who also are female, on a particular date (2015-10-30), with the result being 80%. A third row 6214 provides yet another example where the search consists of a asking for the percentage of females who answered democrat, but without limiting the search by a timestamp, resulting in a result of 75%. A final example is shown in a fourth row 6216, where the search is for females who chose Pepsi as their soft drink of choice, with a result of 14.5%. Thus, this system allow for social measurements to be taken, as well as statistical extrapolation performed, as desired by the users of the system. It will be understood that the example report shown in FIG. 62 is but one example. Other formats may be achieved depending on the format of the report desired. Additionally, results may be in multiple forms other than a percentage, such as raw numbers of respondents.

Referring now to FIG. 63, there is illustrated a flowchart depicting one embodiment of a report generation method 6300. The method 6300 begins at step 6302 where an individual authorized to use the system runs a query or a series of queries against the database. These queries may have multiple parameters to allow the results to be narrowly tailored to the data the authorized individual desires. At step 6304, the database performs the entered query or series of queries. At step 6306, the system outputs a report listing the results of the query or series of queries. The report may be similar to that shown in FIG. 62, or may be in other formats as well, as desired.

Figures 64, 65:
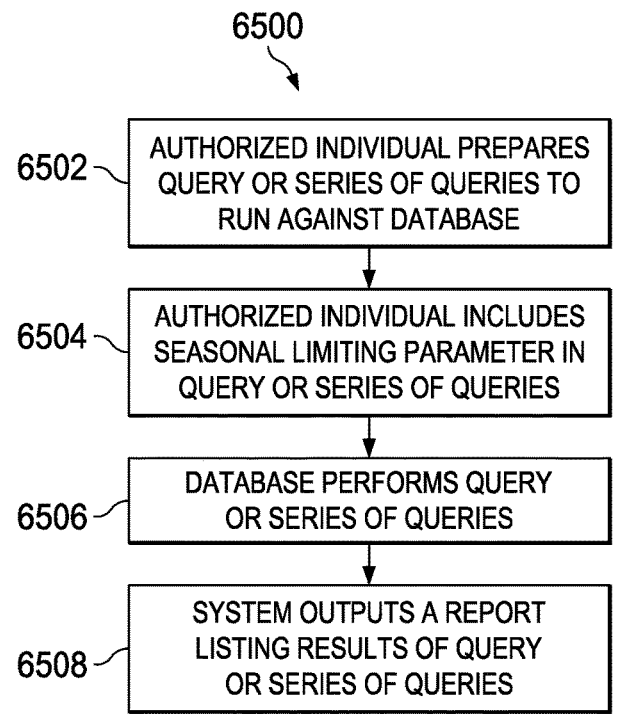
FIG. 64 illustrates one embodiment of an example seasonal database report retrieved from a database in which query and response data is stored.
FIG. 65 illustrates a flowchart depicting one embodiment of a seasonal report generation method.

Referring now to FIG. 64, there is illustrated one embodiment of an example seasonal database report 6402 retrieved from the database in which query and response data is stored. There is shown a title bar 6404 stating a given name of the report. This name may be auto-generated or manually entered by the person running the report. There is further shown a plurality of query parameter columns 6406, labeled as "Query P1," "Query P2," and "Query P3" for this example. In the last column is a results column 3108. Each of the plurality of query parameter fields 6406 lists various query parameters that were run against the database, with each row of the report representing one full search.

For instance, a first row 6410 shown in FIG. 64 shows that a QID+RID for a gender question with the answer of "male" was searched as parameter 1, a QID+RID for a political affiliation question with the answer of "republican" was searched as parameter 2, and a seasonal timestamp range was searched as parameter 3. The seasonal timestamp range shown in the first row 6410 is 2015-04-05 to 2015-11-02 (Apr. 5, 2015 to Nov. 2, 2015). This particular timestamp range corresponds to the major league baseball (MLB) season in 2015. This provided a result of 65%, meaning 65% of male respondents also responded with "republican" during the 2015 MLB season. A second row 6412 shows a similar query where the search provides the percentage of respondents that affiliate with republican who also are male. The seasonal timestamp range for the second row 6412 is listed as "2015 MLB Season." This demonstrates that particular seasons may be designated as with unique identifiers which can be entered instead of requiring the user to know and enter a specific date range for a particular season. The result of this query is shown to be 78%. A final example is shown in a third row 6414 provides yet another example where the search is for males who chose Coca Cola as their soft drink of choice, by using the seasonal timestamp range of "2015 MLB Regular Season," resulting in a result of 45%. This means that the timestamp range is that of the MLB regular season, not including any postseason dates.

Thus, this system allow for social measurements to be taken based on seasons, as well as statistical extrapolation performed, as desired by the users of the system. It will be understood that the example report shown in FIG. 64 is but one example. Other formats may be achieved depending on the format of the report desired. Additionally, results may be in multiple forms other than a percentage, such as raw numbers of respondents. Further, the seasonal reporting could be applied to any type of season, such as weather seasons, football, basketball, hockey, or other sports seasons, band touring seasons, Broadway musical seasons, or any other defined season.

Referring now to FIG. 65, there is illustrated a flowchart depicting one embodiment of a seasonal report generation method 6500. The method 6500 begins at step 6502 where an individual authorized to use the system prepares a query or a series of queries to run against the database. These queries may have multiple parameters to allow the results to be narrowly tailored to the data the authorized individual desires. At step 6504, the authorized individual enters in season or seasons, such as those described above, in order to limit the returned results to responses submitted during the particular season or seasons. At step 6506, the database performs the entered query or series of queries. At step 6508, the system outputs a report listing the results of the query or series of queries. The report may be similar to that shown in FIGS. 62 and 64, or may be in other formats as well, as desired.

In the overall operation, a particular venue is initiated with a group of attendees, of which a portion of those attendees may participate in answering queries. Initially, the only knowledge that can be determined is that there are a number of potential respondents. When the first query is posed, this can provide some information as to the makeup of respondents and, subsequently, the attendees in the venue. As more questions are asked, more information can be determined about the group as a whole with respect to the makeup thereof. This is to be compared with a polling system, wherein questions are asked of a random group or a group with a known makeup and it is the answers to these questions that provide a general trend. However, the makeup is fixed, i.e., for example, the group may be known to the 50% associated with one political party and 50% associated with a second political party and the responses of the specific affiliates or any political party are analyzed against each other. By comparison, the analysis of the group or the trend that the group may have, i.e., political leanings, is a function of the makeup of that group, which is defined by the responses to a particular query. As questions are asked, it can be determined what type of trend is present within a particular group of individuals. For example, a number of conservative questions could be posed to the group and a response analyzed to determine whether that group trends toward the conservative or the liberal side. Another group of questions could be posed to the group and a determination made as to whether that particular group trended to high income tastes or to low income tastes. Thus, the trends of the group are a function of the responses of the group to a particular set of queries and, as these queries are made, the trends will change, and because the particular makeup of the group will change. This change in the makeup of the group is due to the number of responses that are provided, which is a direct function of the number of "eyeballs" that are glued to the communication medium through which the queries are made. The responses are a direct indication of how many people are actually listing to the queries. As more and more people are listening to the queries, the trends will be seen to change, due to the fact that the makeup has changed. It is important to note that the "makeup" is associated with the portion of the overall attendees that are actually responding.

Figure 66:
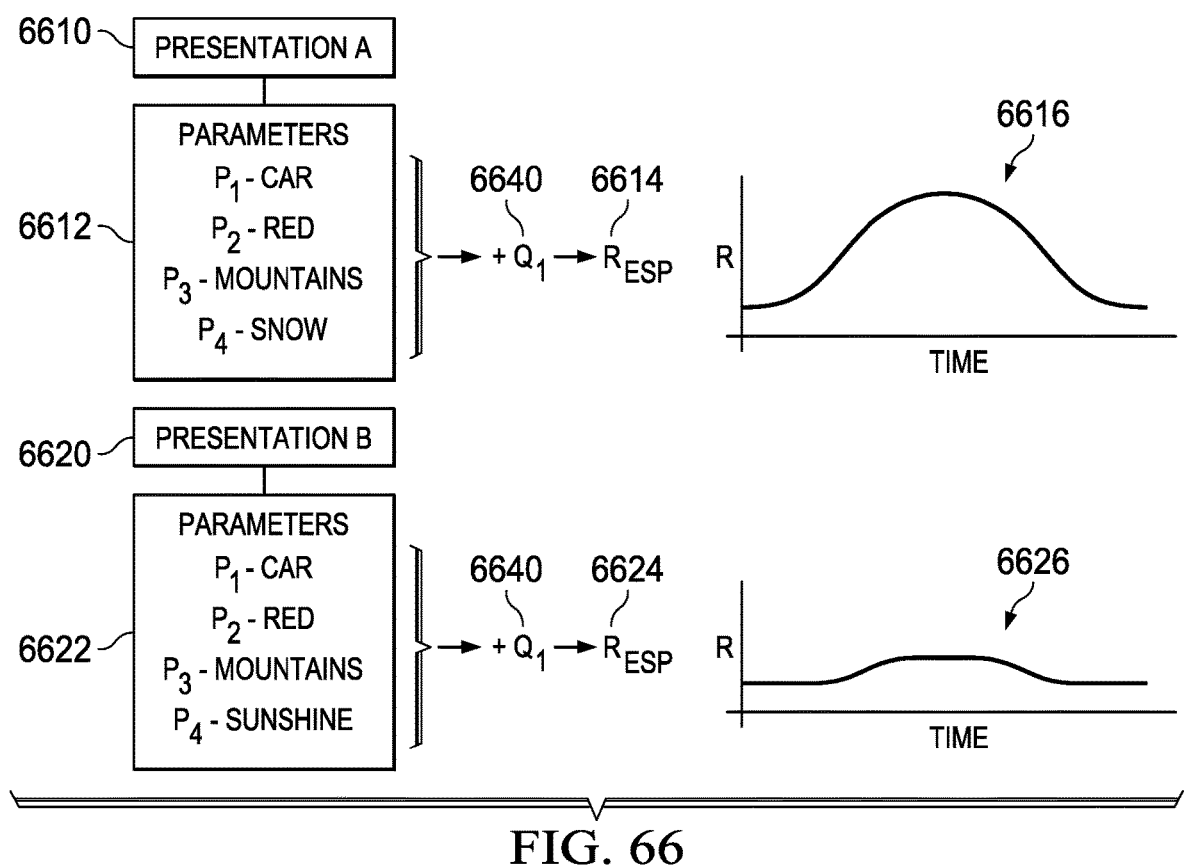
FIG. 66 illustrates representations of multiple presentations and the responses received from post-presentation queries.

In some embodiments, analysis of responses to queries is used to determine which query or media message characteristics are more likely to trigger responses from event attendees. Turning to FIG. 66, there are illustrated representations of two presentations, presentation 6610 (Presentation A) and presentation 6620 (Presentation B). In this example, both presentations are video advertisements for motor vehicles. Each presentation is characterized by a set of parameters (6612 for Presentation A, 6622 for Presentation B) which describe details of the presentation. Each set of parameters indicates the type of motor vehicle in the presentation, the color of the motor vehicle, the environment the vehicle is in, and the weather portrayed in the presentation. Of course, each presentation can be parametized by any number of parameters as elements. The presence or absence of fireworks, for example, could be distinguish one presentation from another. Each presentation is associated with a query 6640 which be presented to the event attendees following the presentation. Query 6640 is the same query for Presentation A and Presentation B. Each presentation also has a response set (6614 for Presentation A and 6624 for Presentation B) comprising of the responses by mobile unit users to the queries associated with the respective presentations. Finally, response graphs 6616 and 6626 plot the magnitude of the number of responses in sets 6614 and 6624 respectively to the queries presented after their respective presentations over time. By analyzing the information regarding how changing the parameters affects the number of responses given by event attendees, it can be determined which characteristics of a presentation are most likely to encourage active responses from the attendees. The presentations could be presented at the same venue at different times or at different venues.

Figure 67:
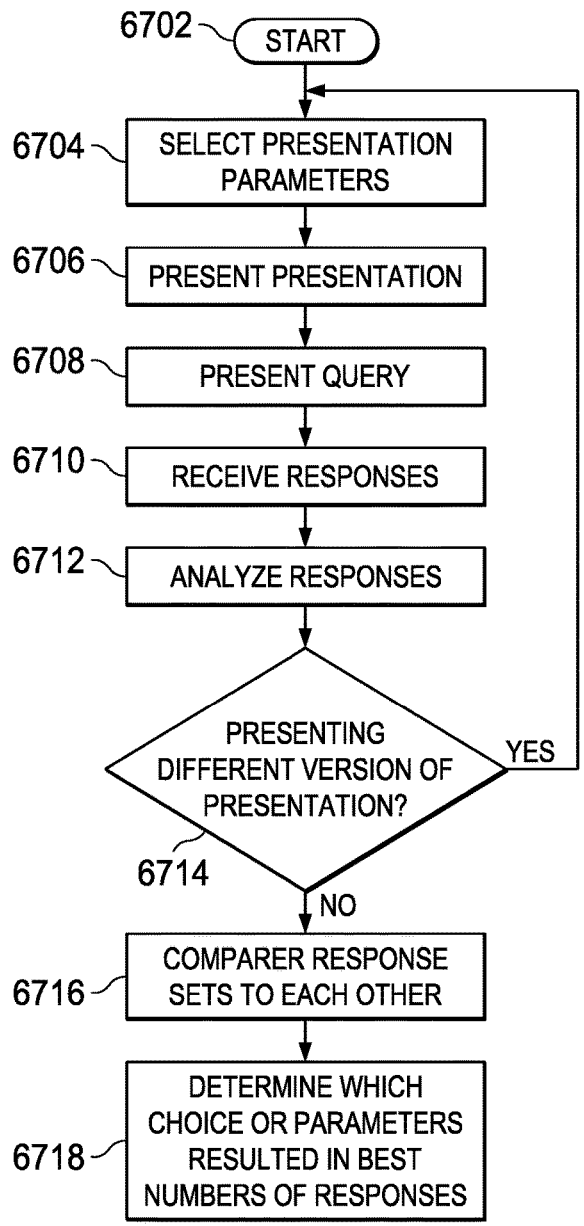
FIG. 67 illustrates a flowchart showing the process of determining lifestyle triggers for presentations.

Turning to FIG. 67, there is illustrated a flow chart showing the process by which parameters are analyzed to determine the best lifestyle triggers. The process starts with Start block 6702 and moves to function block 6704. At this point, the parameters for a presentation to be presented are chosen. One or more of these parameters will be varied in the future, or if the process has already occurred, is varied as compared to a previous time the presentation was shown. Next, the process moves to function block 6706, where the presentation is presented to the event attendees. The process flows to function block 6708, where a query prompting a response is presented to the audience. Next, the process moves to block 6710, where query responses are received by the system. At block 6712, the responses are analyzed, with particular focus on the magnitude of the number of responses at a given point in real time for the presentation most previously shown. At this point, the process moves to decision block 6714. Here, a decision is made as to whether or not another presentation will be shown. If so, the process loops back to block 6704, where parameters are again selected, this time varying at least one of the parameters as compared to the most recent presentation shown. If no more presentations are to be presented, then the process moves from block 6714 to block 6716, where the responses to queries presented after each presentation are compared to each other, with a particular focus on the number of responses received after each post-presentation query. Finally, the process moves to block 6718, there the results of block 6716 are analyzed to determine which parameter choices result in the highest magnitude of query responses and are therefore the best lifestyle triggers for event attendees.

Some embodiments of the disclosure will vary only one parameter, while other embodiments will vary multiple parameters. In some embodiments, one of the parameters varied is the time at which the presentation is presented to the event audience. In some embodiments, the presentation will be an advertisement. In other embodiments, the presentation will be an informative message. In other embodiments, the presentation will be an entertaining interlude. In some embodiments, the query presented will be in the form of a question. In some embodiments, the query will prompt attendees to vote for their preferred choice of something. In some embodiments, a parameter changed will be the music accompanying the presentation. In other embodiments, a parameter changed will be the length of the presentation or even the tempo thereof (slow or fast). In some embodiments, a parameter changed will be the age of an actor or actress in the presentation. In some embodiments, a parameter changed will be the ethnicity of an actor or actress in the presentation. In some embodiments, a parameter changed will be the gender of an actor or actress in the presentation. In some embodiments, parameters will be changed multiple times during a single event and presented to the same event audience.

Figure 68:
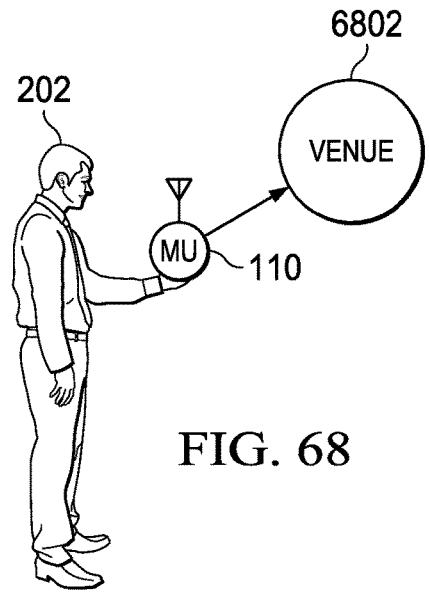
FIG. 68 illustrates a diagrammatic view of one embodiment of recognizing an individual entering a geo-fenced venue.

Referring now to FIG. 68, there is illustrated a diagrammatic view of one embodiment of recognizing an individual 202 entering a geo-fenced venue. There is shown an individual 202 in possession of a mobile unit 110. The venue has a geofence 6802 established that has a defined radius around the venue. Preferably, the radius of the geofence would not exceed the physical boundaries of the venue by much, if at all, so that individuals who are close enough to the venue, but still outside the venue, are not recognized as entering the venue. The precise GPS coordinates defining the geofence may be established ahead of time. A mobile application saved on the mobile unit 110, such as the mobile application described hereinabove, may have saved within the application a series of geofence boundary coordinates, enabling the mobile application to recognize when it has entered into such a boundary. As the individual 202 passes over the geofence boundary, the mobile unit 110 searches for its current GPS location. The mobile application on the mobile unit 110 then recognizes it is within the geofence for the particular venue, triggering the application to activate. Upon activation of the mobile application, the individual 202 can be presented with a screen to begin the rest of the processes described hereinabove.

Figure 69:
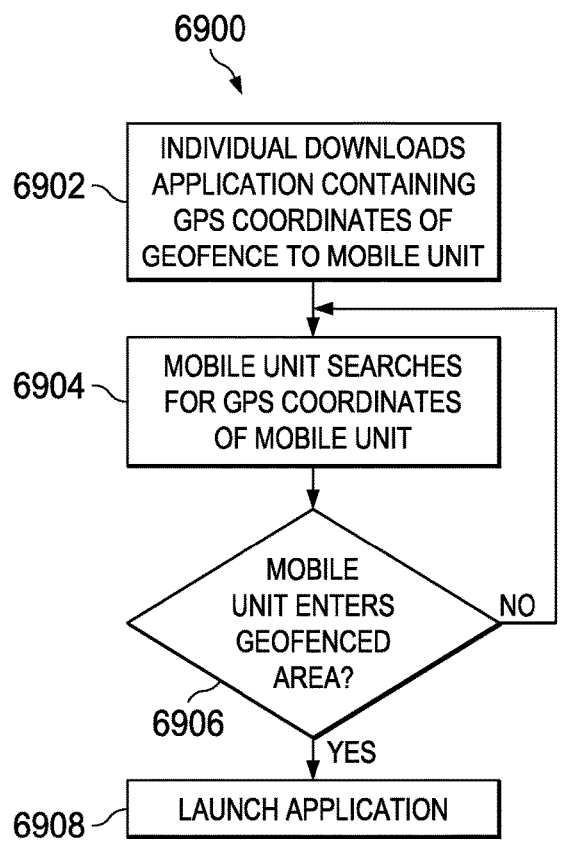
FIG. 69 illustrates a flowchart depicting one embodiment of a geo-fencing application trigger process.

Referring now to FIG. 69, there is illustrated a flowchart depicting one embodiment of a geo-fencing application trigger process 6900. The process 6900 begins at step 6902, where an individual downloads a mobile application containing the GPS coordinates defining a geofence or multiple geofences. At step 6904, the mobile unit searches for the current GPS coordinates of the mobile unit. At decision block 6906, it is determining if the mobile unit is within the geo-fenced area defined by the downloaded GPS coordinates of the geofence. If the mobile unit is not within the geo-fenced area, the process moves back to step 6904 to search again for the coordinates of the mobile unit. If, at decision block 6906, the mobile unit is determined to be within the geo-fenced area, the process moves to step 6908. At step 6908, the mobile application is launched. Once the mobile application is launched, the individual can be presented with a screen to begin the rest of the processes described hereinabove.

In general, a geo-fenced area can be defined by a fixed set of coordinates that define the boundary or by a single central GPS coordinate that just defines the venue. In the first example, this would require the mobile unit to compare its GPS coordinates with the set of boundary coordinates to determine if it is within that boundary. However, since user must answer the ticket number as part of the process, all that is required is to launch the application and know the general area and this can be achieved by using the latter example with a single GPS coordinate. Thus, when the mobile unit of the user is within a predetermined range of any of a group of defined single GPS coordinates, each associated with a different venue, then the application will be launched. This additional information can, in an alternative embodiment, be utilized to augment the unique code that is generated. The unique code, as described above, was defined as being a combination of the information from the ticket, i.e., the seat location and the timestamp, but this also could include the central GPS coordinate for that venue, thus defining the venue in the unique code associated with that particular mobile unit.

In some embodiments, the venue at which the collection of statistical data occurs is the Super Bowl. The Super Bowl is the annual championship game of the National Football League (NFL), a professional American football league. Being the championship for one of the most popular professional sports leagues in the United States, the Super Bowl regularly enjoys exceptionally high television ratings when compared to most other programs and sporting events. Since the Super Bowl is the championship game of the NFL, attending the Super Bowl in person can be very expensive. It is reported that the highest face value ticket for the 2015 Super Bowl was approximately $1,900. In fact, it is reported that, for the 2015 Super Bowl, the average price for a ticket on the second-hand market was reportedly over $4,000.

Because of the high price of tickets to attend the Super Bowl as compared to tickets for other sports or entertainment events, the demographics of the attendees most Super Bowl games are different than the demographics of attendees to regular-season NLF games, or even other post-season NFL games. Super Bowl attendees tend to be wealthier and better educated than the attendees of regular-season NFL games. For the Super Bowl game that took place in 2007, the average visitor had a household income of over $200,000 per year. Wealthy individuals are a highly coveted target of advertisements, political messages, and other types of media messages. Because of this, any audience with a high concentration of high-income individuals is an audience that advertisers and other parties wishing to deliver messages will want to reach.

Advertisers not only desire to deliver their messages to high-income audiences, they often desire information about the individuals in these audiences, including their buying habits, political preferences, gender make-up, ethnic make-up, ages, hobbies and even other sports interests. This means that such statistical information gathered from a high-income audience like the Super Bowl is very valuable. Thus, in some embodiments, the statistical information gathering will take place at a venue in which an American football game event is being played, and where the average household income of the event attendees is over $200,000 per year. In general, a particular venue for a particular event will have associated therewith a particular set of demographics and attendee profiles, and these will be duplicative between events.

In one Super Bowl, the ethnic make-up of the attendees was as follows: 73.7% white, 13.5% black, 8.5% Hispanic, 3.7% Asian, and 0.5% other. Most Super Bowl games will likely have a similar ethnic make-up. Whites will likely make up 70%-80% of the attendees, blacks will likely make up 10%-20% of the attendees, Hispanics will likely make up 5%-15% of the attendees, and Asians will likely make up 2%-10% of the attendees. Attendees to the Super Bowl may also generally not live close to the venue the Super Bowl is being held. For example, in one Super Bowl, only about 25% of attendees lived near the venue, while around 75% of attendees did not, calculated from 799 valid cases.

TABLE 1

STATES OF RESIDENCE OF VISTORS TO A SUPER BOWL

| Maryland | 25-35% |
|---|---|
| California | 21-31% |
| Texas | 7.5-15% |
| Louisiana | 7-15% |
| Florida | 3-10% |
| Other | 30-40% |

TABLE 2

INTERNATIONAL VISITORS TO A SUPER BOWL

| Canada | 10-20 |
|---|---|
| Mexico | 10-20 |
| Australia | 1-10 |
| Brazil | 1-10 |
| England | 1-10 |
| Mexico | 1-10 |

TABLE 3

PERCENTAGE OF PEOPLE STAYING OVER NIGHT AT A SUPER BOWL

| Yes | 70-80% |
|---|---|
| No | 25-35% |

TABLE 4

OVERNIGHT VS. DAYTRIPPER A SUPER BOWL

| Daytripper | Overnighter |
|---|---|
| 25%-35% | 65-75% |

TABLE 5

NUMBER OF NIGHTS STAYED IN VENUE'S CITY

| One Night | 3-10% |
|---|---|
| Two Night | 15-25% |
| Three Night | 25-35% |
| Four Night | 30-40% |
| Five Nights or More | 20-30% |
| Average # of Nights | 3.6 |
| Median # of Nights | 4.0 |

TABLE 6

TYPE OF LODGING USED BY VISTORS TO A SUPER BOWL

| Hotel | 70-80% |
|---|---|
| Friends or Relatives | 15-25% |
| Private Home Rental | 2-5% |
| RV | 2-5% |
| Bed and Breakfast | 1-5% |
| Other | 0.5-2% |

TABLE 7

NUMBER OF HOTEL ROOMS USED BY VISTORS TO A SUPER BOWL

| | |
|---|---|
| One Room | 75-85% |
| Two Rooms | 15-25% |
| Three Rooms | 3-8% |
| Four Rooms or More | 4-10% |
| Average # of Rooms | 1.7 |

TABLE 8

TRANSPORTATION USED BY VISITORS TO THE SUPER BOWL

| | |
|---|---|
| Airplane | 60-70% |
| Personal Vehicle | 30-40% |
| Other | 5-10% |

TABLE 9

PRIMARY PURPOSE OF VISIT TO VENUE LOCATION

| | |
|---|---|
| Super Bowl | 95-99% |
| Other Vacation/Pleasure | 1-5% |
| Business/Convention | 0.1-2% |
| Other | 1-3% |

TABLE 10

AVERAGE INDIVIDUAL DAILY EXPENDITURES OF SUPER BOWL VISITORS

| Overnight Visitor | Regular Day-Tripper | Other Day-Tripper | National Football League and its Entitties |
|---|---|---|---|
| $575 | $680 | $402 | $718 |

TABLE 11

PARTICIPATION BY ATTENDEES IN SUPER BOWL ACTIVITIES

| | |
|---|---|
| Sunday-Super Bowl Game | 70-80% |
| Saturday-NFL Experience | 30-40% |
| Saturday-Super Bowl Boulevard | 25-35% |
| Sunday-Super Bowl Boulevard | 18-25% |
| Friday-Super Bowl Boulevard | 15-25% |
| Thursday-NFL Experience | 12-20% |
| Friday-NFL Experience | 10-20% |
| Wednesday-NFL Experience | 10-20% |
| Thursday-Super Bowl Boulevard | 5-10% |
| Sunday-NFL Experience | 3-8% |
| Tuesday-Media Day | 2-6% |
| Saturday-Super Saturday of Service | 0.5%-2% |

TABLE 12

NUMBER OF PEOPLE IN PARTIES OF SUPER BOWL ATTENDEES

| | |
|---|---|
| One person | 0%-10% |
| Two people | 40%-60% |
| Three people | 10%-20% |
| Four people | 10%-20% |
| Five people | 5%-15% |

TABLE 12-continued

NUMBER OF PEOPLE IN PARTIES OF SUPER BOWL ATTENDEES

| | |
|---|---|
| Six people | 0%-10% |
| Seven people or more | 0%-10% |

TABLE 13

SUPER BOWL ATTENDEES WITH CHILDREN IN THEIR PARTIES

| | |
|---|---|
| No children | 55%-65% |
| One child | 15%-25% |
| Two children | 10%-20% |
| Three children | 0%-10% |
| Four children | 0%-10% |
| Five children or more | 0%-10% |

TABLE 14

ANNUAL INCOME OF SUPER BOWL ATTENDEES

| | |
|---|---|
| Less than $25,000 | 0%-10% |
| $25,000-$49,000 | 0%-10% |
| $50,000-$74,000 | 5%-15% |
| $75,000-$99,000 | 10%-20% |
| $100,000-$149,000 | 15%-25% |
| $150,000-$199,000 | 10%-20% |
| $200,000 and above | 15%-25% |

TABLE 15

ETHNICITY OF SUPER BOWL ATTENDEES

| | |
|---|---|
| White | 65%-80% |
| Black | 10%-20% |
| Hispanic | 5%-15% |
| Asian | 1%-10% |
| Other | 0%-10% |

TABLE 16

GENDER OF SUPER BOWL ATTENDEES

| | |
|---|---|
| Male | 60%-70% |
| Female | 30%-40% |

TABLE 17

AGE OF SUPER BOWL ATTENDEES

| | |
|---|---|
| 18-24 years old | 5%-10% |
| 25-34 years old | 20%-30% |
| 35-49 years old | 35%-45% |
| 50-64 years old | 20%-30% |
| Older than 65 years | 5%-10% |

Although the preferred embodiment has been described in detail, it should be understood that various changes, substitutions and alterations can be made therein without departing from the spirit and scope of the invention as defined by the appended claims.

What is claimed is:

1. A method for interacting with audience members in an event, wherein the event has a finite number of participating attendees selected from attendees of the event, comprising the steps of:

for each participating attendee, creating a unique combined ID (UID) on a mobile wireless device (MWD) by the steps of:
  detecting a presence of the MWD by a beacon device;
  generating by the beacon device a signal configured for detection by the MWD;
  launching an application stored on the MWD in response to a detection of the signal;
  inputting to the MWD an identifier;
  creating the combined UID by combining the input identifier with a UID timestamp corresponding to a time of creation of the UID, wherein the UID comprises an identifier portion that includes the input identifier and a UID timestamp portion so as to distinguish two different UIDs having a duplicate identifier portion; and
  accepting and storing the combined UID in a database;
receiving with a server, on a wireless channel, communications from the MWD of each participating attendee; and
registering the combined UID of each participating attendee at a venue of the event.

2. The method of claim 1, wherein the identifier is a fixed location associated with the venue.

3. The method of claim 2, wherein the fixed location is a defined seat in the venue having a seat identifier as the fixed location.

4. The method of claim 2, wherein registering each respective combined UID comprises recognizing each respective MWD at the respective fixed location within the venue.

5. The method of claim 4, wherein recognizing each respective MWD comprises a scan of the MWD in a vicinity of the respective fixed location.

6. The method of claim 1, wherein registering each respective combined UID comprises responding to a request for registration by transmitting the respective combined UID to the server over the wireless channel.

7. The method of claim 1, further comprising:
generating at the server a visual query;
displaying on a physical display at the event the visual query, wherein the visual query relates to a plurality of visual messages;
displaying on the MWD of each participating attendee response indicators;
receiving at the server from each participating attendee a response, each response resulting from one of the participating attendees selecting one of the response indicators, to the visual query over the wireless channel;
storing in the database on the server the received responses in association with the displayed visual query;
associating the respective received responses with the respective combined UIDs;
creating a query ID (QID) associated with the displayed visual query; and
creating respective response time stamps indicating respective times at which the respective received responses were received by the server.

8. The method of claim 7, further comprising:
creating a combined UID data record for each combined UID, each combined UID data record including:
  the respective UID,
  the QID,
  the respective received response, and
  the respective response time stamp.

9. The method of claim 8, further comprising:
creating a QID data record for the QID, the QID data record including:
  the QID;
  each of the respective received responses,
  each respective UID, and
  each respective response time stamp;
performing statistical analysis on the QID data record;
selecting, based on the statistical analysis of the QID record, one of the visual messages from the plurality of visual messages; and
displaying on the physical display at the event the selected visual message.

10. The method of claim 9, further comprising associating each respective received response with statistical information related to an attendee classification.

11. The method of claim 9, further comprising assigning each respective combined UID to a statistical category based on the respective received response and the displayed query.

12. The method of claim 9, wherein the combined UID data record also includes statistical information that is related to an attendee classification and that is based on the received response.

13. The method of claim 7, wherein the response indicators comprise at least one of:
  alphabetic symbols;
  numeric symbols; and
  symbols of differing colors.

14. The method of claim 7, wherein receiving at the server the responses includes receiving the responses within a defined time window.

* * * * *

UNITED STATES PATENT AND TRADEMARK OFFICE
CERTIFICATE OF CORRECTION

PATENT NO. : 12,256,282 B2
APPLICATION NO. : 17/139114
DATED : March 18, 2025
INVENTOR(S) : Jovan Hutton Pulitzer Page 1 of 1

It is certified that error appears in the above-identified patent and that said Letters Patent is hereby corrected as shown below:

On the Title Page

On page 2, left column, item (63) under Related U.S. Application Data, please insert --U.S. Provisional Application No. 62/258,997, filed on November 23, 2015--.

Signed and Sealed this
Fifteenth Day of April, 2025

Coke Morgan Stewart
*Acting Director of the United States Patent and Trademark Office*